US008081653B2

(12) United States Patent
Ikeda

(10) Patent No.: US 8,081,653 B2
(45) Date of Patent: Dec. 20, 2011

(54) COMMUNICATION APPARATUS AND CONTROL METHOD THEREOF

(75) Inventor: Nobuhiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 314 days.

(21) Appl. No.: 11/742,767

(22) Filed: May 1, 2007

(65) Prior Publication Data

US 2007/0258367 A1   Nov. 8, 2007

(30) Foreign Application Priority Data

May 2, 2006  (JP) ................................. 2006-128578

(51) Int. Cl.
  *H04J 3/16*  (2006.01)
  *H04J 3/22*  (2006.01)
  *G06F 15/16*  (2006.01)

(52) U.S. Cl. ........ 370/465; 370/468; 370/469; 709/228; 709/230

(58) Field of Classification Search .................. 370/465, 370/466, 469; 709/228, 230
  See application file for complete search history.

(56) References Cited

U.S. PATENT DOCUMENTS

| | | | | |
|---|---|---|---|---|
| 6,560,242 | B1 * | 5/2003 | Hamedani et al. | 370/467 |
| 7,136,358 | B2 * | 11/2006 | Kunito et al. | 370/238 |
| 7,158,491 | B1 * | 1/2007 | Le | 370/328 |
| 7,315,553 | B2 * | 1/2008 | Keller-Tuberg et al. | 370/463 |
| 7,571,249 | B2 * | 8/2009 | Wu | 709/238 |
| 2003/0219007 | A1 * | 11/2003 | Barrack et al. | 370/352 |
| 2004/0042462 | A1 * | 3/2004 | O'Neill et al. | 370/395.5 |
| 2004/0116140 | A1 * | 6/2004 | Babbar et al. | 455/517 |
| 2004/0246988 | A1 * | 12/2004 | Bruckner et al. | 370/465 |
| 2005/0037779 | A1 * | 2/2005 | Ma et al. | 455/456.6 |
| 2005/0047345 | A1 * | 3/2005 | Suh | 370/235 |
| 2005/0071427 | A1 * | 3/2005 | Dorner et al. | 709/204 |
| 2005/0124306 | A1 * | 6/2005 | Cheng | 455/158.4 |
| 2007/0178901 | A1 * | 8/2007 | Williams | 455/439 |

FOREIGN PATENT DOCUMENTS

| | | |
|---|---|---|
| JP | 2001-186193 A | 7/2001 |
| JP | 2001-320413 | 11/2001 |

* cited by examiner

Primary Examiner — Xavier Szewai Wong

(57) ABSTRACT

In a communication apparatus which can directly wirelessly communicate with another communicate apparatus, whether or not a terminal connected to the communication apparatus supports a real-time transmission protocol is checked. As a result of checking, if it is determined that the terminal does not support the real-time transmission protocol, communication data to be exchanged with that terminal is converted.

13 Claims, 59 Drawing Sheets

FIG. 15

| No. | INPUT-SIDE DEVICE | | RADIO DATA FORMAT | OUTPUT-SIDE DEVICE | |
|---|---|---|---|---|---|
| | RTP FUNCTION TUNER107 | RTP HEADER PROCESSING STA101 | | RTP HEADER PROCESSING STA104 | RTP FUNCTION DISP110 |
| 1 | NONE | ADD | (RTP)+ [DV DATA] | DELETE | NONE |
| 2 | IMPLEMENTED | — | [RTP+ DV DATA] | — | IMPLEMENTED |
| 3 | NONE | ADD | (RTP)+ [DV DATA] | — | IMPLEMENTED |
| 4 | IMPLEMENTED | — | (RTP)+ [DV DATA] | DELETE | NONE |

| ADAPTER ID | DEVICE | I/F | TRANSFER MODE | QoS (RTP) SUPPORT | |
|---|---|---|---|---|---|
| STA101 | TUNER | IEEE1394 | ISOCHRONOUS | ○ | ~1601 |
| STA102 | HDR | ETHER | 802.1p COMPATIBLE | × | ~1602 |
| STA103 | DVC | USB | ISOCHRONOUS | ○ | ~1603 |
| STA104 | DISP | IEEE1394 | ISOCHRONOUS | ○ | ~1604 |
| STA105 | PC | ETHER | 802.1p COMPATIBLE | × | ~1605 |
| — | — | — | — | × | |

FIG. 17

| No. | SPECIFICATION OF INPUT-SIDE DEVIC | | TOP-LEVEL PROTOCOL | SPECIFICATION OF OUTPUT-SIDE DEVICE | |
|---|---|---|---|---|---|
| | I/F TYPE | DEVICE-ADAPTER TRANSFER MODE | | DEVICE-ADAPTER TRANSFER MODE | I/F TYPE |
| 1 | USB | CONTROL | TCP / UDP | CONTROL | USB |
| 2 | USB | BULK | TCP / UDP | BULK | USB |
| 3 | USB | INTERRUPT | TCP / UDP | INTERRUPT | USB |
| 4 | USB | ISOCHRONOUS | RTP | ISOCHRONOUS | USB |
| 5 | USB | ISOCHRONOUS | RTP | ISOCHRONOUS | 1394 |
| 6 | 1394 | ASYNCHRONOUS | TCP / UDP | ASYNCHRONOUS | 1394 |
| 7 | 1394 | ISOCHRONOUS | RTP | ISOCHRONOUS | 1394 |
| 8 | 1394 | ISOCHRONOUS | RTP | ISOCHRONOUS | USB |
| 9 | ETHER | 802.1p COMPATIBLE | RTP | 802.1p COMPATIBLE | ETHER |
| 10 | ETHER | DiffServe | RTP | DiffServe | ETHER |
| 11 | ETHER | IntServ / RSVP | RTP | IntServ / RSVP | ETHER |
| 12 | ETHER | 802.1p COMPATIBLE | TCP / UDP | NON-802.1p COMPATIBLE | ETHER |
| 13 | ETHER | DiffServe | TCP / UDP | NON-DiffServ | ETHER |
| 14 | ETHER | IntServ/RSVP | TCP / UDP | NON-IntServ / RSVP | ETHER |
| 15 | ETHER | NON-802.1p COMPATIBLE | TCP / UDP | 802.1p COMPATIBLE | ETHER |
| 16 | ETHER | NON-DiffServ | TCP / UDP | DiffServe | ETHER |
| 17 | ETHER | NON-IntServ / RSVP | TCP / UDP | IntServ / RSVP | ETHER |
| 18 | ETHER | NONE | TCP / UDP | NONE | ETHER |

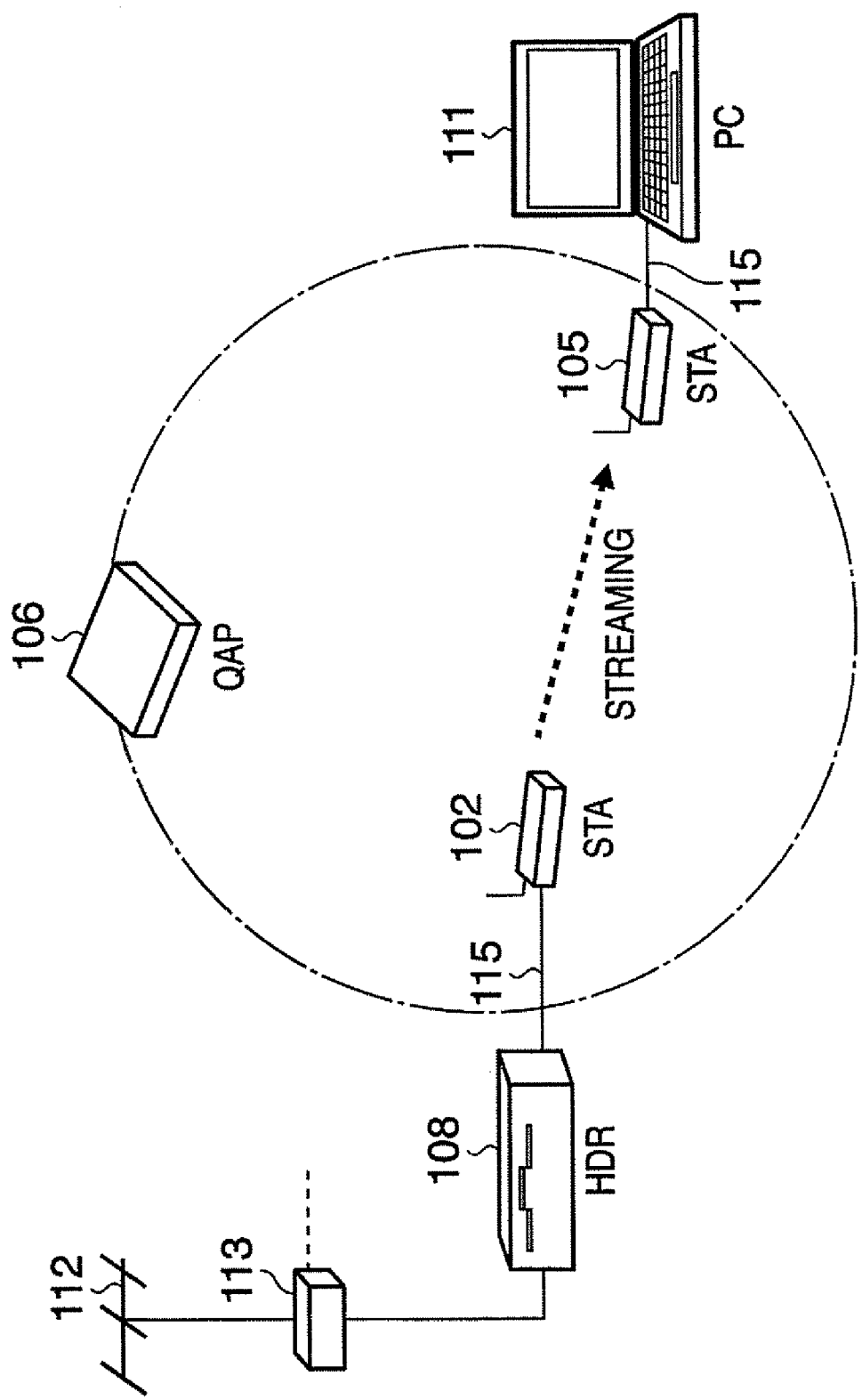

FIG. 28

| PROTOCOL PROCESSING | USER PRIORITY (UP802.1p / User Priority) | SYMBOL IN 802.1D | NAME OF SYMBOL |
|---|---|---|---|
| TCP / UDP | 1 | BK | BACKGROUND |
| TCP / UDP | 2 | — | RESERVE |
| TCP / UDP | 0 | BE | BEST EFFORT |
| TCP / UDP | 3 | EE | EXCELLENT EFFORT |
| TCP / UDP | 4 | CL | CONTROL |
| RTP | 5 | VI | VIDEO |
| RTP | 6 | VO | VOICE |
| TCP / UDP | 7 | NC | NETWORK CONTROL |

2801   2802   2803   2804

FIG. 29
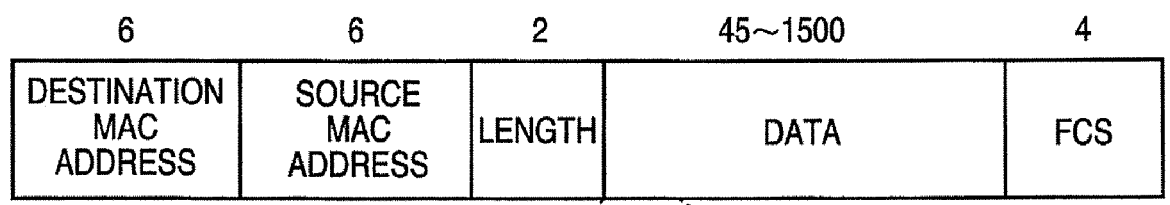
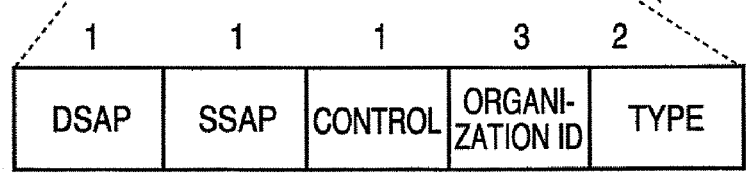

F I G. 30B
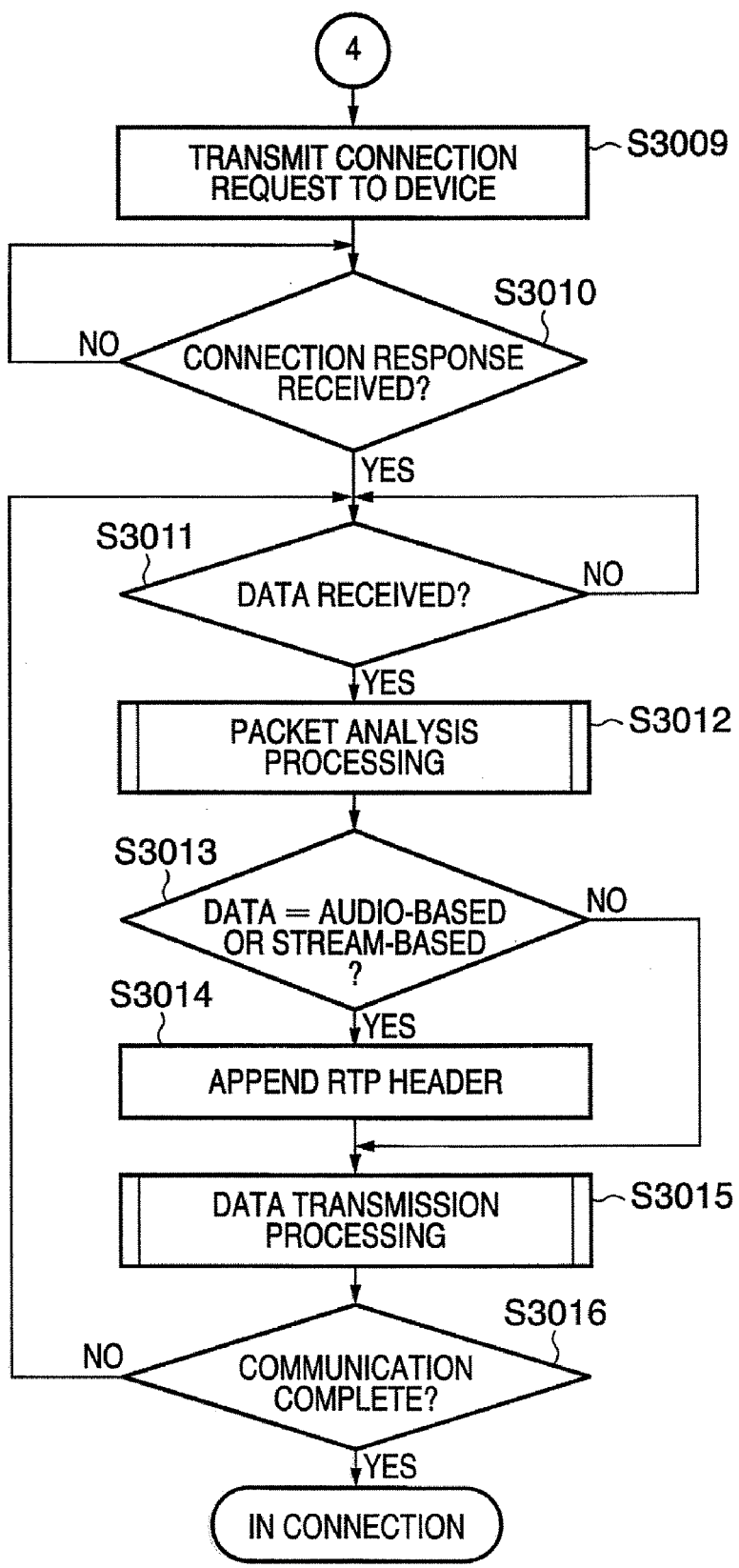

FIG. 32

| ENTRY NO. (ID) | APPLICATION | PROTOCOL PROCESSING |
|---|---|---|
| 1 | WEB BROWSER | TCP |
| 2 | MAIL | TCP |
| 3 | FILE TRANSFER | TCP |
| 4 | VIDEO STREAM | RTP / RTCP |
| 5 | MUSIC PLAYBACK SOFTWARE | RTP / RTCP |
| 6 | IP TELEPHONE (AUDIO DATA) | RTP / RTCP |
| 7 | MONITORING | UDP |

| BUS ID (4601) | NODE ID (4602) | USB ADDRESS (4603) | TRANSFER MODE (4604) | QoS (RTP) SUPPORT (4605) |
|---|---|---|---|---|
| #1 | #0 | — | ISOCHRONOUS | ○ |
| #1 | #5 | — | ASYNCHRONOUS | × |
| #1 | #8 | — | ISOCHRONOUS | ○ |
| — | — | US123B | BULK | × |
| | | US456B | ISOCHRONOUS | ○ |
| | | US789B | INTERRUPT | × |

F I G. 47
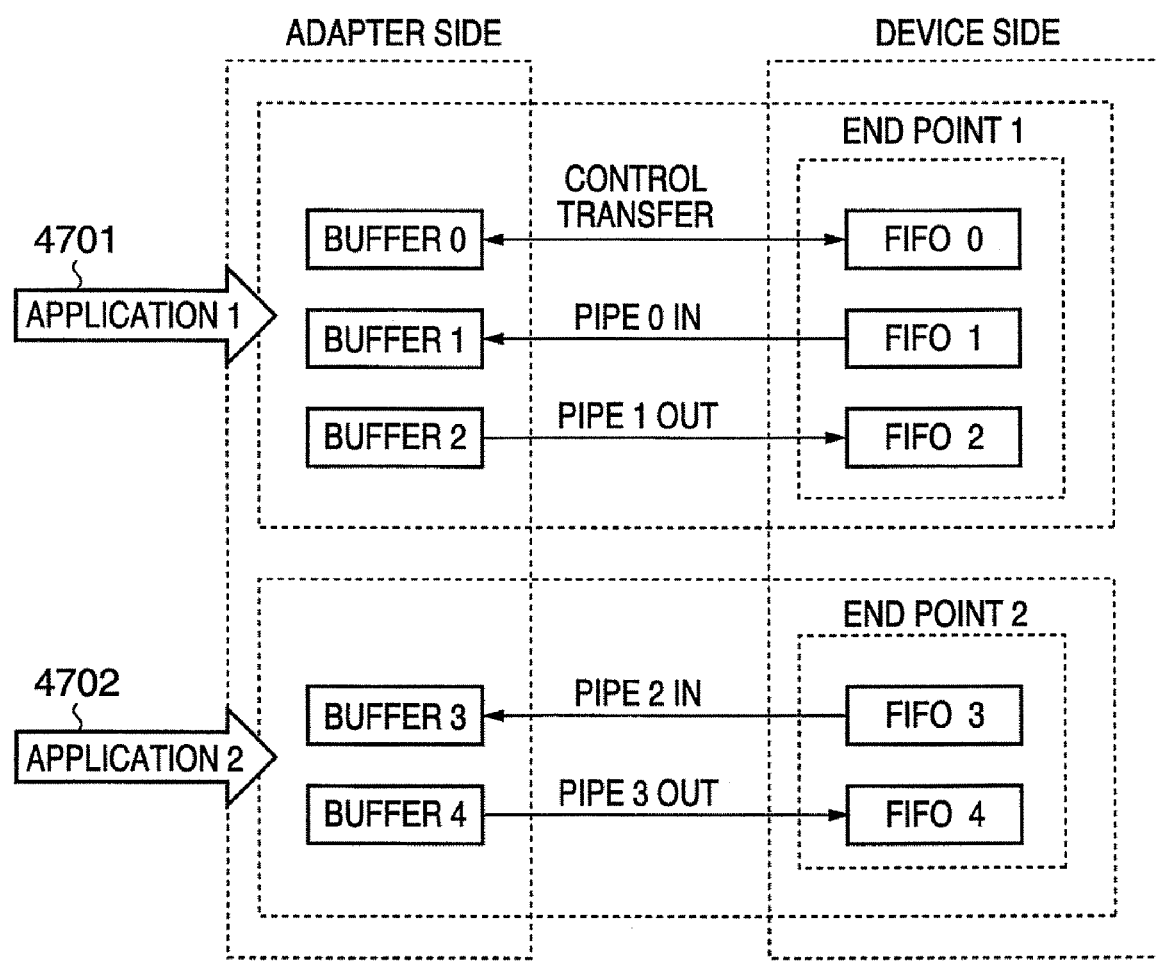

FIG. 48A

| ADAPTER ID | DEVICE ID | I/F | TRANSFER MODE | QoS (RTP) SUPPORT | |
|---|---|---|---|---|---|
| STA1 | TUNER | IEEE1394 | ISOCHRONOUS | ○ | |
| STA2 | HDR | ETHER | DiffServ | × | ~4801 |
| STA3 | DVC | USB | ISOCHRONOUS | ○ | |
| STA4 | DISP | IEEE1394 | IEEE1394 | ○ | |
| STA5 | PC | ETHER | DiffServ | × | ~4802 |
| | | | | | |
| | | | | | |
| | | | | | |
| | | | | | |

4700

F I G. 48B

| ADAPTER ID | DEVICE ID | I / F | TRANSFER MODE | QoS (RTP) SUPPORT | |
|---|---|---|---|---|---|
| STA1 | TUNER | IEEE1394 | ISOCHRONOUS | ○ | |
| STA2 | HDR | ETHER | IntServ / RSVP | × | ~4803 |
| STA3 | DVC | USB | ISOCHRONOUS | ○ | |
| STA4 | DISP | IEEE1394 | IEEE1394 | ○ | |
| STA5 | PC | ETHER | IntServ / RSVP | × | ~4804 |
| | | | | | |
| | | | | | |
| | | | | | |
| | | | | | |

| ADAPTER ID | DEVICE ID | I/F | TRANSFER MODE | QoS (RTP) SUPPORT |
|---|---|---|---|---|
| STA1 | TUNER | IEEE1394 | ISOCHRONOUS | ○ |
| STA2 | HDR | ETHER | 802.1p COMPATIBLE | × |
| STA3 | DVC | USB | ISOCHRONOUS | ○ |
| STA4 | DISP | IEEE1394 | ISOCHRONOUS | ○ |
| STA5 | PC | ETHER | 802.1p COMPATIBLE | × |
| STA6 | — | — | — | × |

 DIS-CONNECT

4700

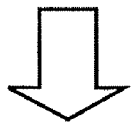

4902

| ADAPTER ID | DEVICE ID | I/F | TRANSFER MODE | QoS (RTP) SUPPORT |
|---|---|---|---|---|
| STA1 | TUNER | IEEE1394 | ISOCHRONOUS | ○ |
| STA2 | HDR | ETHER | 802.1p COMPATIBLE | × |
|  |  |  |  |  |
| STA4 | DISP | IEEE1394 | ISOCHRONOUS | ○ |
| STA5 | PC | ETHER | 802.1p COMPATIBLE | × |
| STA6 | — | — | — | × |

 DELETE

4700

COMMUNICATION APPARATUS AND CONTROL METHOD THEREOF

BACKGROUND OF THE INVENTION

1. Field of the Invention

The present invention relates to a communication apparatus that can directly communicate with another communication apparatus via a wireless communication, and a control method thereof.

2. Description of the Related Art

In recent years, streaming distribution systems such as video conferencing systems, Video on Demand (VoD) systems and the like using Internet Protocol (IP) networks are prevalent. In such streaming distribution systems, upon playing back, audio, video, and image data in real time, Transport Control Protocol (TCP), which executes re-send control upon discarding packets or occurrence of data errors, normally can hardly maintain real-time delivery.

Consequently, a system such as a video conferencing system, VoD system, and the like that assumes a plurality of communication nodes normally uses User Datagram Protocol (UDP) in place of TCP. However, since a UDP header does not have any field for storing sequence numbers that indicate the order of packets, unlike a TCP header, it is difficult to attain control for accurately re-arranging the changed order, if the order of packets has changed on the network.

In order to solve the problem, Real-time Transport Protocol (RTP) has been proposed as a transport protocol used to exchange audio and video data in real time on the IP network. Also, RTP Control Protocol (RTCP) has been proposed as a control program used to exchange audio and video data in real time.

Normally, the RTP is used on the UDP, and has many advantages: it allows order correction of packets on the data receiving side, can absorb delay fluctuations on the network, and so forth. For this reason, the RTP is popularly known as a technique for playing back audio, video, and image data in real time in a video conferencing system, VoD system, and the like.

As described above, RTP/RTCP is generally used as a technique for assuring quality of service (QoS) on layers higher than the transport layer.

RTP, as a technique for assuring QoS, can append RTP time stamps, which are accurately synchronized with time stamps (PCR) of TS packets used upon transferring video data of, e.g., MPEG-TS or the like; for example, see patent reference 1: Japanese Patent Laid-Open No. 2001-320413.

As approaches to QoS on the Internet, responding to the advent of stream-oriented applications, studies were first made in 1989, and the standardization of the following techniques has been underway since that time:

Integrated Service (IntServ): the Internet Engineering Task Force (IETF) working group, and a technique for making QoS control for respective application flows; and Resource reSerVation Protocol (RSVP): a technique for dynamically assuring resources on a communication channel as needed.

As QoS techniques different from IntServ, the following techniques are available:

Differentiated Service (DiffServ): a technique for classifying and grouping application packets, defining priority levels for the groups, and making data transfer in accordance with the priority levels; and a technique using a VLAN tag header based on a priority tag that is compliant with IEEE 802.1p. The tag header includes a 3-bit user priority field, and the priority level to be handled in the network is determined by the field value for each packet.

In order to transmit video stream data wirelessly, IEEE 802.11e has considered introducing a concept of "QoS" in a wireless transfer, and guaranteeing the priority order and communication bandwidth, depending on the data content and intended purposes thereof. The IEEE 802.11e protocol specifies the control method not only for communication between terminals via a wireless access point, but also for a direct communications link between the terminals for the purpose of effective use of bandwidth. Such direct communications are called Direct Link Setup (DLS).

However, an adapter device used to accommodate a device that comprises an input/output function of communication data, such as audio data and video data that require real-time delivery in the IP network environment, poses the following problem in terms of services:

Since the support status of a QoS protocol, e.g., RTP/RTCP, for data exchanged between devices cannot be recognized, an unwanted QoS-related protocol is unnecessarily appended to data. Upon requiring a QoS-related protocol, for example, when a device does not have any support function of the QoS protocol, it does not append any QoS-related protocol.

SUMMARY OF THE INVENTION

It is an object of the present invention to provide a technique which avoids redundancy of a real-time transfer protocol by checking if a terminal connected to a communication apparatus supports the real-time transfer protocol.

According to one aspect of the present invention, there is provided a method of controlling a communication apparatus, comprising:

checking whether or not a terminal connected to the communication apparatus supports a real-time transmission protocol; and converting communication data to be exchanged with the terminal in accordance with the checking result.

According to another aspect of the invention, there is provided a communication apparatus comprising:

a checking unit adapted to check whether or not a terminal connected to the communication apparatus supports a real-time transmission protocol; and a conversion unit adapted to convert communication data to be exchanged with the terminal in accordance with the checking result of the checking unit.

Further features of the present invention will become apparent from the following description of exemplary embodiments with reference to the attached drawings.

BRIEF DESCRIPTION OF THE DRAWINGS

FIG. 15 is a table showing the relationship between the implementation states of RTP processing and wireless data format according to the first embodiment;

FIG. 16 shows an example of the configuration of a device management table;

FIG. 17 is a relation table between the device transfer modes and the usage protocols;

FIG. 21 is a diagram showing a state upon directly streaming video data from an HDR 108 to a notebook type PC 111;

FIG. 28 is a management table showing the relationship between the UP and QoS protocol processing;

FIG. 29 shows the configuration of a wireless MAC transmission frame 802.3;

FIGS. 30A and 30B are flowcharts showing the processing of the transmitting STA 102 according to a third embodiment;

FIG. 32 shows the configuration of a correspondence table of application types and QoS protocol processing according to a fourth embodiment;

FIG. 46 is a correspondence table of identifiers for respective interfaces and transfer modes when an STA and arbitrary device are connected via an IEEE 1394 cable or a USB cable;

FIG. 47 is a diagram for identifying applications of a USB interface;

FIGS. 48A and 48B are tables showing the configuration of device management information in another embodiment; and FIG. 49 is a table for explaining erasure of device management information.

DESCRIPTION OF THE EMBODIMENTS

The best mode of carrying out the invention will be described in detail hereinafter, with reference to the accompanying drawings.

A wireless communication system which includes wireless adapter devices (STA) and wireless access point (QAP) will be described first. Note that the STA and QAP have a QoS function under discussion in IEEE 802.11e. Also, a wireless communication is implemented by adding the QoS function under discussion in IEEE 802.11e to an IEEE 802.11a/b/g wireless LAN.

First Embodiment

According to a first embodiment, setup messages exchanged between devices connected to STAs are analyzed to control processing of QoS-related protocols, according to the analysis result.

Figure 1:
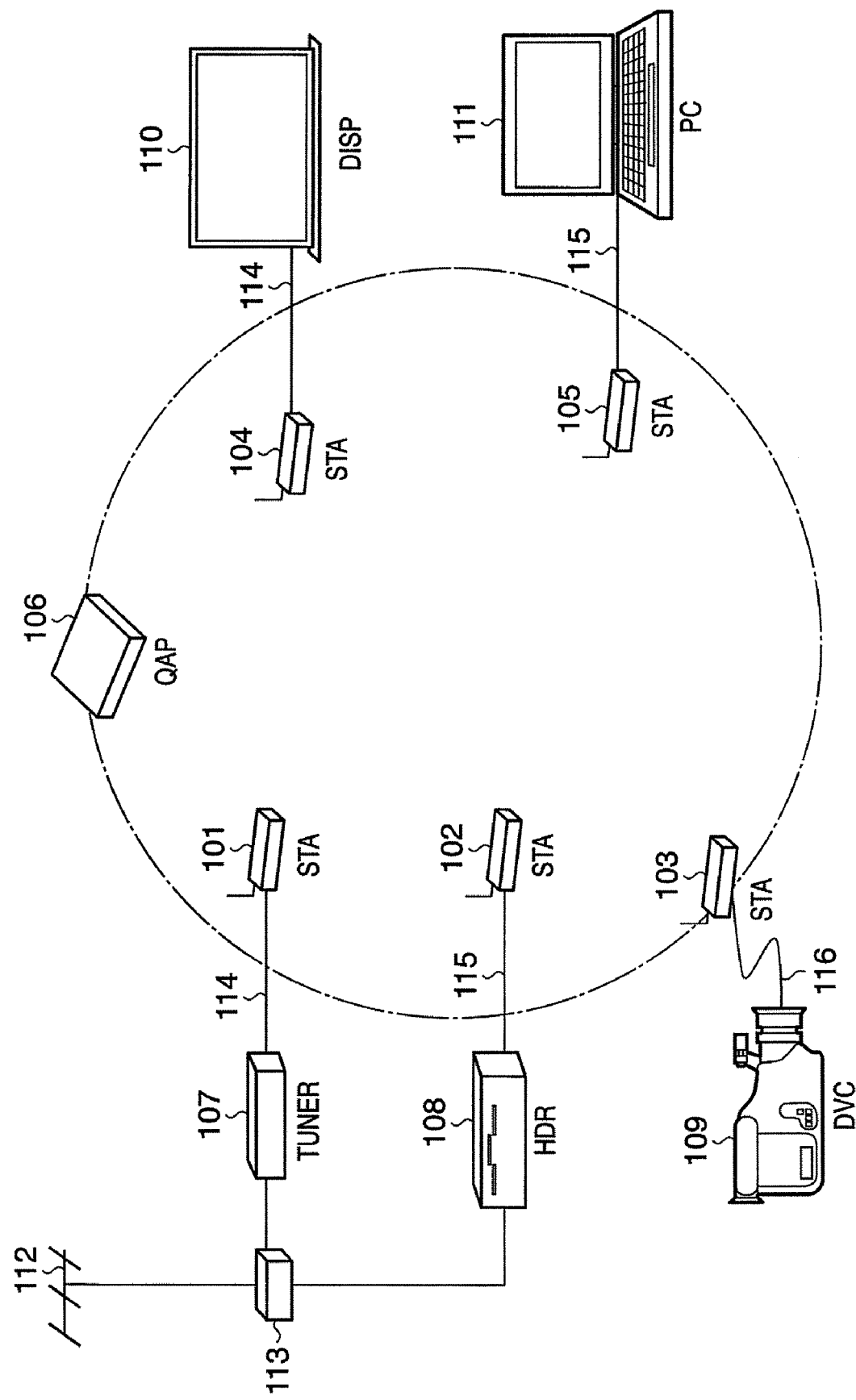
FIG. 1 is a diagram showing an example of the arrangement of a wireless communication system according to a first embodiment.

FIG. 1 shows an example of the arrangement of the wireless communication system according to the first embodiment. Referring to FIG. 1, reference numerals 101 to 105 respectively denote STAs, which can be connected to devices having input/output functions using IEEE 1394, USB, or wired LAN cables. Reference numeral 106 denotes a QAP, the global side of which is connected to a network such as the Internet, intranet, or the like, in order to accommodate the STAs 101 to 105 within a wireless service area.

Reference numeral 107 denotes a tuner, which is connected to the STA 101 using an IEEE 1394 cable 114. Reference numeral 108 denotes a hard disk recorder (HDR), which is connected to the STA 102 using a wired LAN cable 115. Reference numeral 109 denotes a digital video camera (DVC), which is connected to the STA 103 using a USB cable 116.

Reference numeral 110 denotes a liquid crystal television (DISP), which is connected to the STA 104 using the IEEE 1394 cable 114. Reference numeral 111 denotes a notebook type personal computer (PC), which is connected to the STA 105 using the wired LAN cable 115. Reference numeral 112 denotes a broadcast receiving antenna, which receives a broadcast signal. Reference numeral 113 denotes a branching filter, which distributes and sends a signal received by the broadcast receiving antenna 112 to the tuner 107 and HDR 108.

In the wireless communication system shown in FIG. 1, the QAP 106 has a function of executing scheduling associated with the assignment of transmission bandwidths, in consideration of QoS in the wireless service area, in response to a wireless transmission bandwidth assignment request from the STAs 101 to 105. Furthermore, upon reception of a direct wireless communication channel establishment request with a desired STA from the STAs 101 and 105, the QAP 106 has a function of executing a direct link service that establishes communication channels among the STAs 101 to 105.

Figure 2:
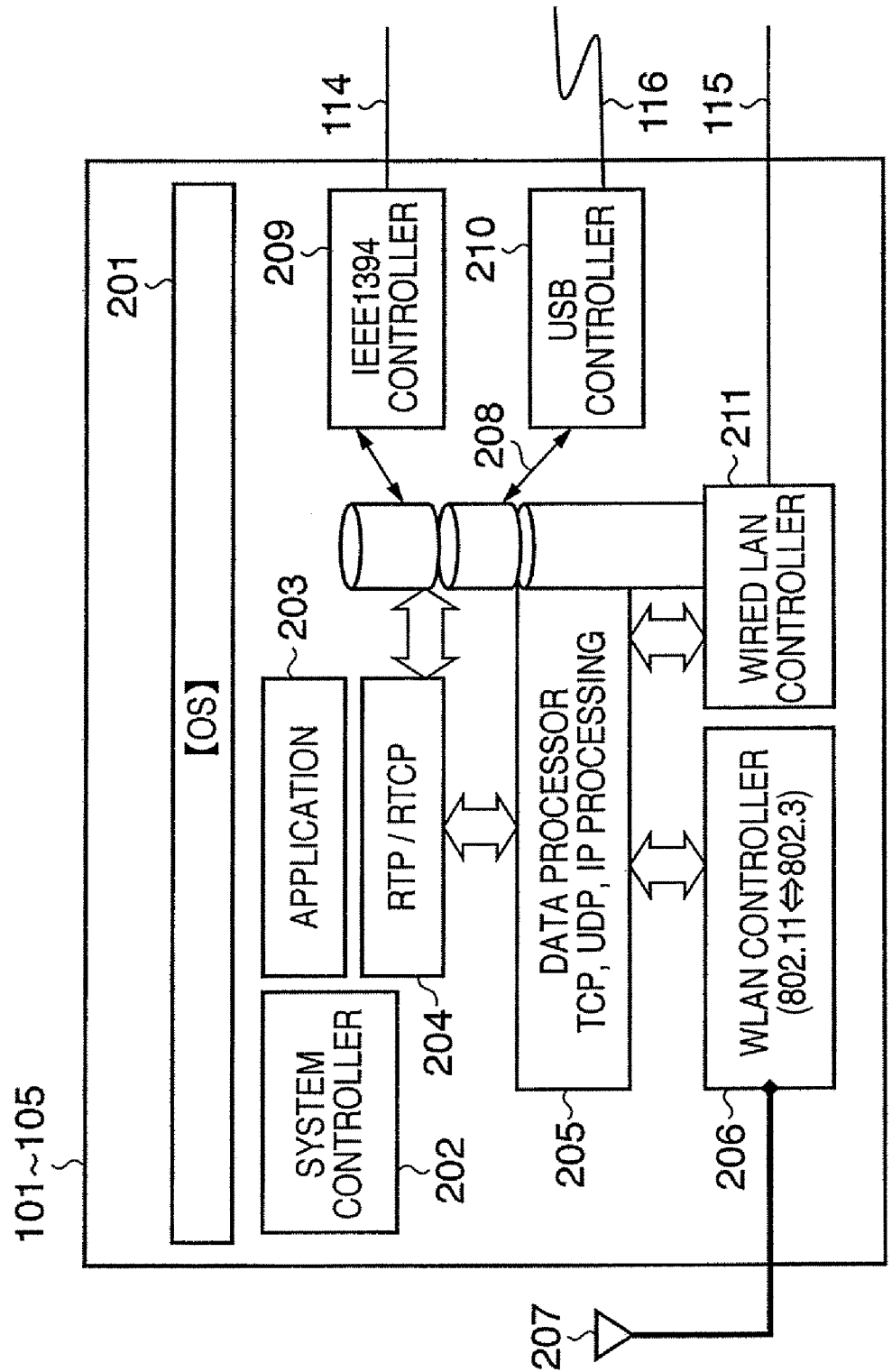
FIG. 2 is a block diagram showing the software configuration of a wireless adapter device according to the first embodiment.

FIG. 2 shows the software configuration of the STA according to the first embodiment. Referring to FIG. 2, reference numeral 202 denotes a system controller, which controls the overall STA. Reference numeral 203 denotes an application program, which is selectively used according to each individual device when the plurality of input/output devices 107 to 111 are connected. Reference numeral 204 denotes a QoS protocol processor, which is implemented by a session layer like RTP/RTCP. Reference numeral 205 denotes a data processor, which processes network protocols such as TCP/UDP/IP. Reference numeral 206 denotes a wireless LAN controller, i.e., a WLAN controller. Reference numeral 207 denotes an antenna, which is connected to the WLAN controller 206 and exchanges data with other STAs.

Reference numeral 209 denotes an IEEE 1394 controller, to which, for example, the tuner 107 or liquid crystal television 110 is connected via the IEEE 1394 cable 114. Reference numeral 210 denotes a USB controller, to which, for example, the DVC 109 is connected via the USB cable 116. Reference numeral 211 denotes a wired LAN controller, to which, for example, the HDR 108 or the notebook type PC 111 is connected via the wired LAN cable 115.

Reference numeral 208 denotes a storage area unit, which is used by the respective software functional blocks 202 to 206 and 209 to 211. When the system controller 202 controls the overall STA, the software functional blocks 202 to 206 and 209 to 211 are stored in a ROM as programs and parameters. In some cases, the ROM temporarily stores programs and data to be mapped in a RAM as the storage area unit 208. Reference numeral 201 denotes an operating system (OS), which manages the ROM, the RAM, and a CPU by software.

Processing executed upon streaming video data from the tuner 107 as a transmitting device to the liquid crystal television 110 as a receiving device via the STAs 101 and 104 under the control of DLS by the QAP 106 will be described below.

Figure 3:
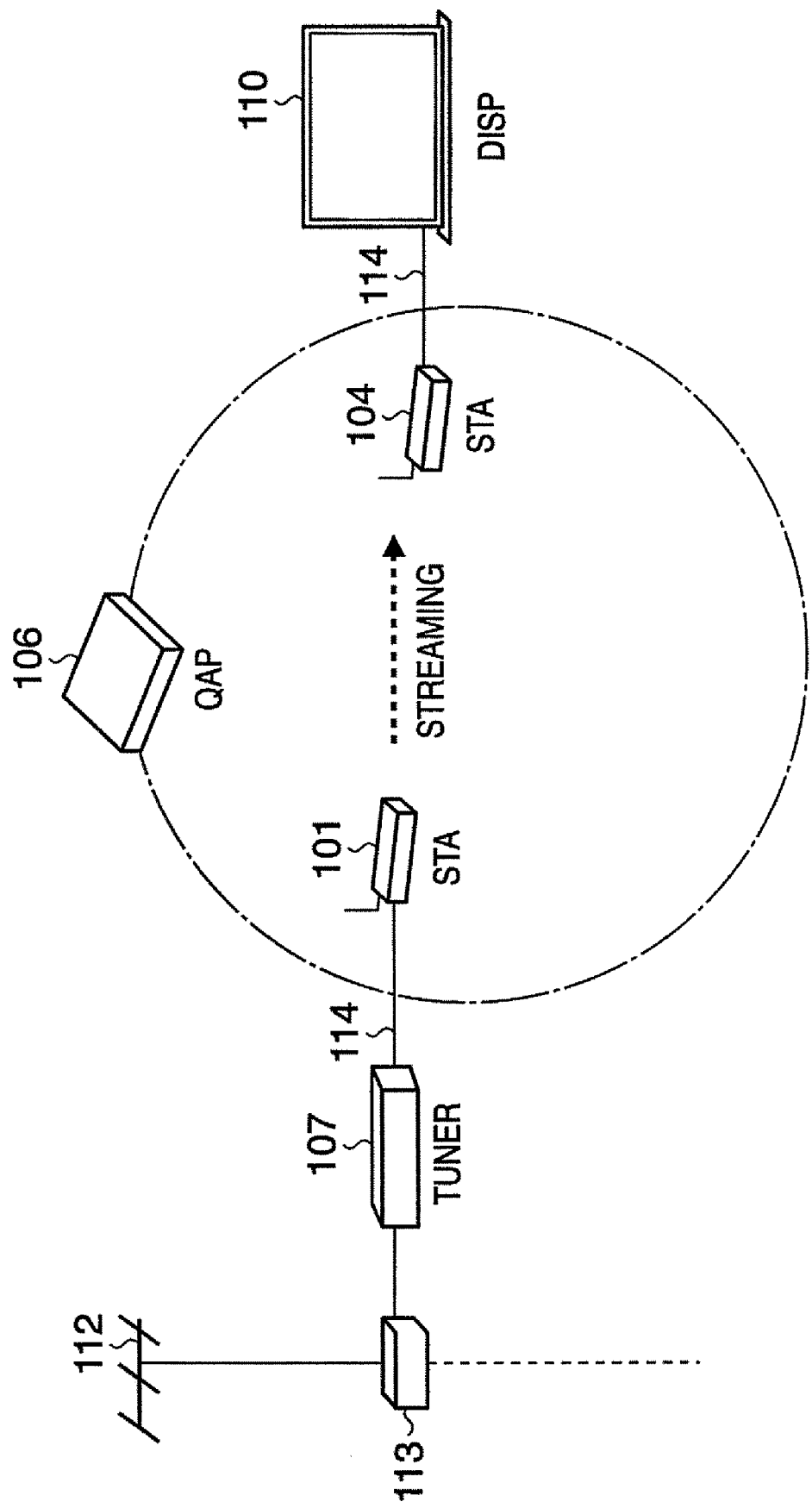
FIG. 3 is a diagram showing a state upon directly streaming video data from a tuner 107 to a liquid crystal television 110.

FIG. 3 is a diagram showing a state upon directly streaming video data from the tuner 107 to the liquid crystal television 110. As shown in FIG. 3, the tuner 107 is connected to the STA 101 via the IEEE 1394 cable 114, and the liquid crystal television 110 is connected to the STA 104 via the IEEE 1394 cable 114.

Figure 4:
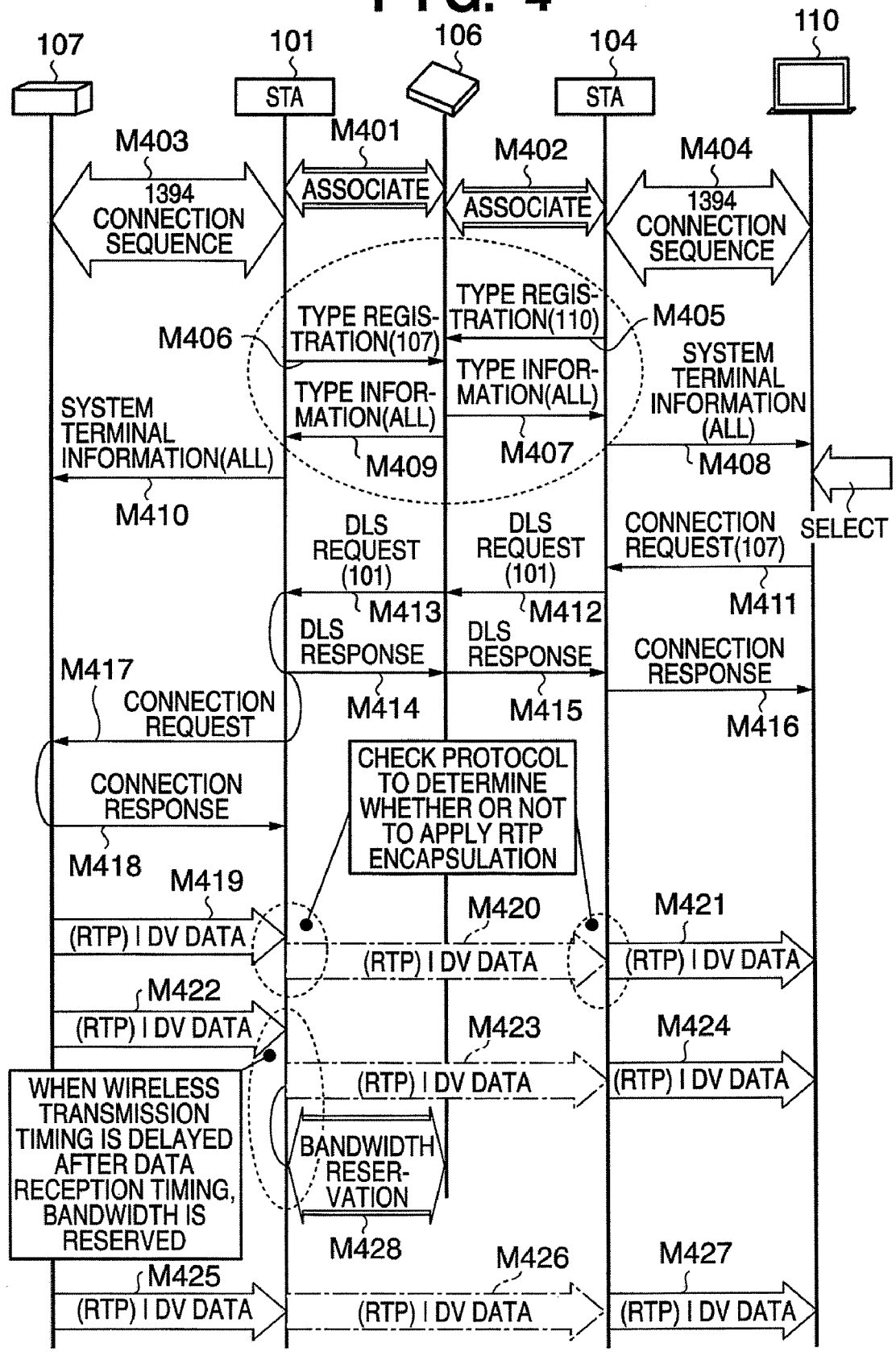
FIG. 4 is a chart showing the sequence of messages exchanged in streaming shown in FIG. 3.

FIG. 4 is a chart showing the sequence of messages exchanged in streaming shown in FIG. 3. The sequence shown in FIG. 4 specifies principal messages associated with the first embodiment, and some messages are omitted.

Figure 5:
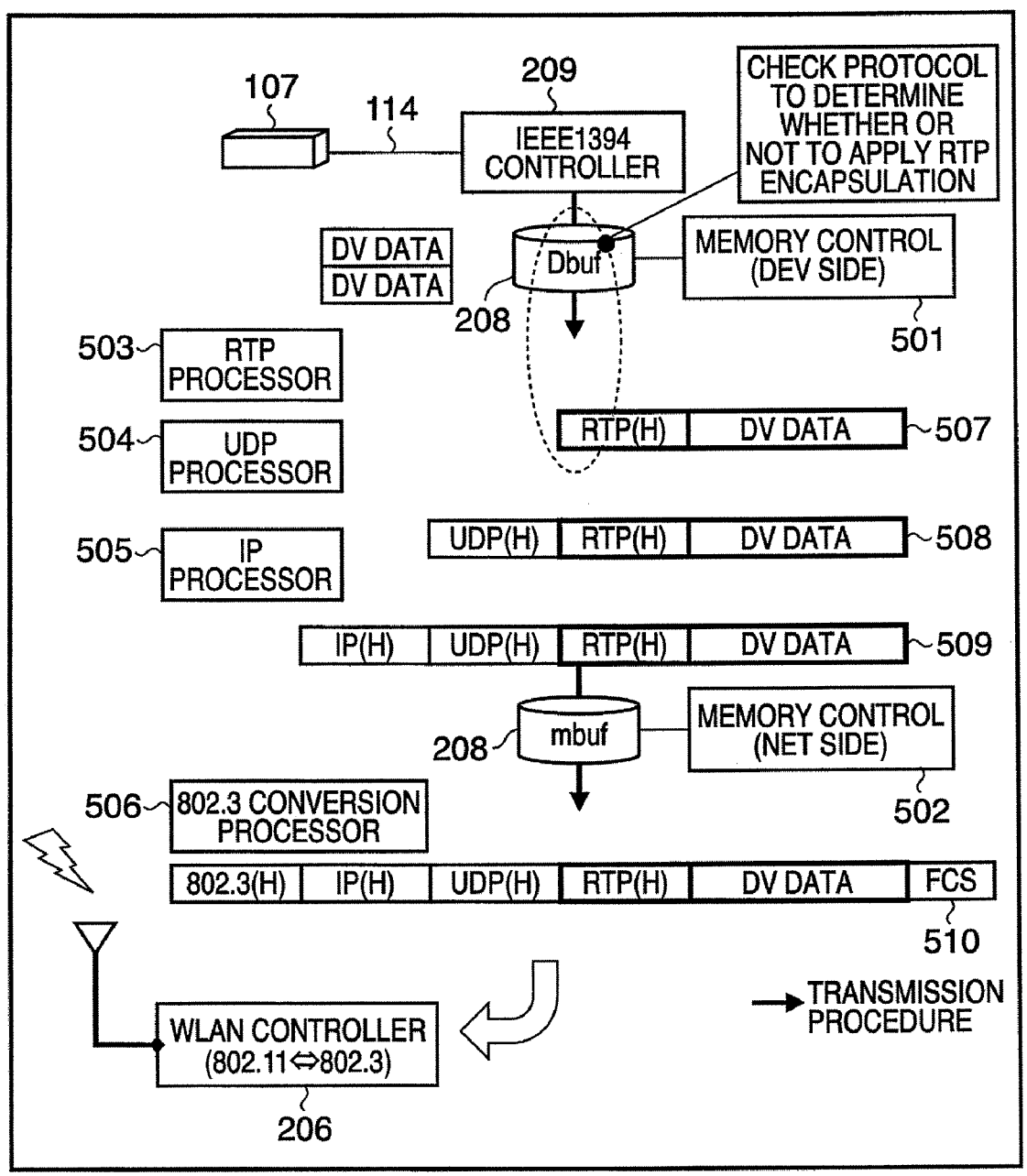
FIG. 5 is a chart showing the processing procedure of a transmission frame in a transmitting STA 101 shown in FIG. 4.

FIG. 5 is a chart showing the processing procedure of a transmission frame in the transmitting STA 101 shown in FIG. 4. An example shown in FIG. 5 corresponds to the case wherein the tuner 107 does not support any QoS protocol processing. Referring to FIG. 5, reference numeral 501 denotes memory control processing on the device side, which writes data received from the tuner 107 via the IEEE 1394 controller 209 in a decode buffer memory (Dbuf) of the storage area unit 208. Reference numeral 503 denotes an RTP processor, which appends an RTP header as a QoS protocol to the data written and stored in the storage area unit 208, when the tuner 107 does not support any RTP function. Note that a case wherein non-support is determined in advance in the setup sequence, and a case wherein the use of RTP as the QoS protocol of moving image data is detected and it is determined as a result of detection that the RTP is not used, are included. Reference numeral 504 denotes a UDP processor, which processes a transport layer protocol. Reference numeral 505 denotes an IP processor, which processes a network layer protocol.

Reference numeral 502 denotes memory control processing on the network side, which writes data that includes a header field appended via the RTP processor 503, UDP processor 504, and IP processor 505 in a transmission memory buffer (mbuf) of the storage area unit 208. Reference numeral 506 denotes an IEEE 802.3 conversion processor, which converts transmission data in the transmission memory buffer into data that can be transmitted by the WLAN controller 206.

Reference numeral 507 denotes an RTP transmission processing frame to which an RTP header is appended by the RTP processor 503. Reference numeral 508 denotes a UDP transmission frame, which is obtained by appending a UDP header to the RTP transmission processing frame 507 by the UDP processor 504. Reference numeral 509 denotes an IP transmission processing frame, which is obtained by appending an IP header to the UDP transmission processing frame 508 by the IP processor 505. Reference numeral 510 denotes an 802.3 transmission processing frame, which is obtained by appending an 802.3 header to the IP transmission processing frame 509 by the 802.3 conversion processor 506.

Figure 6:
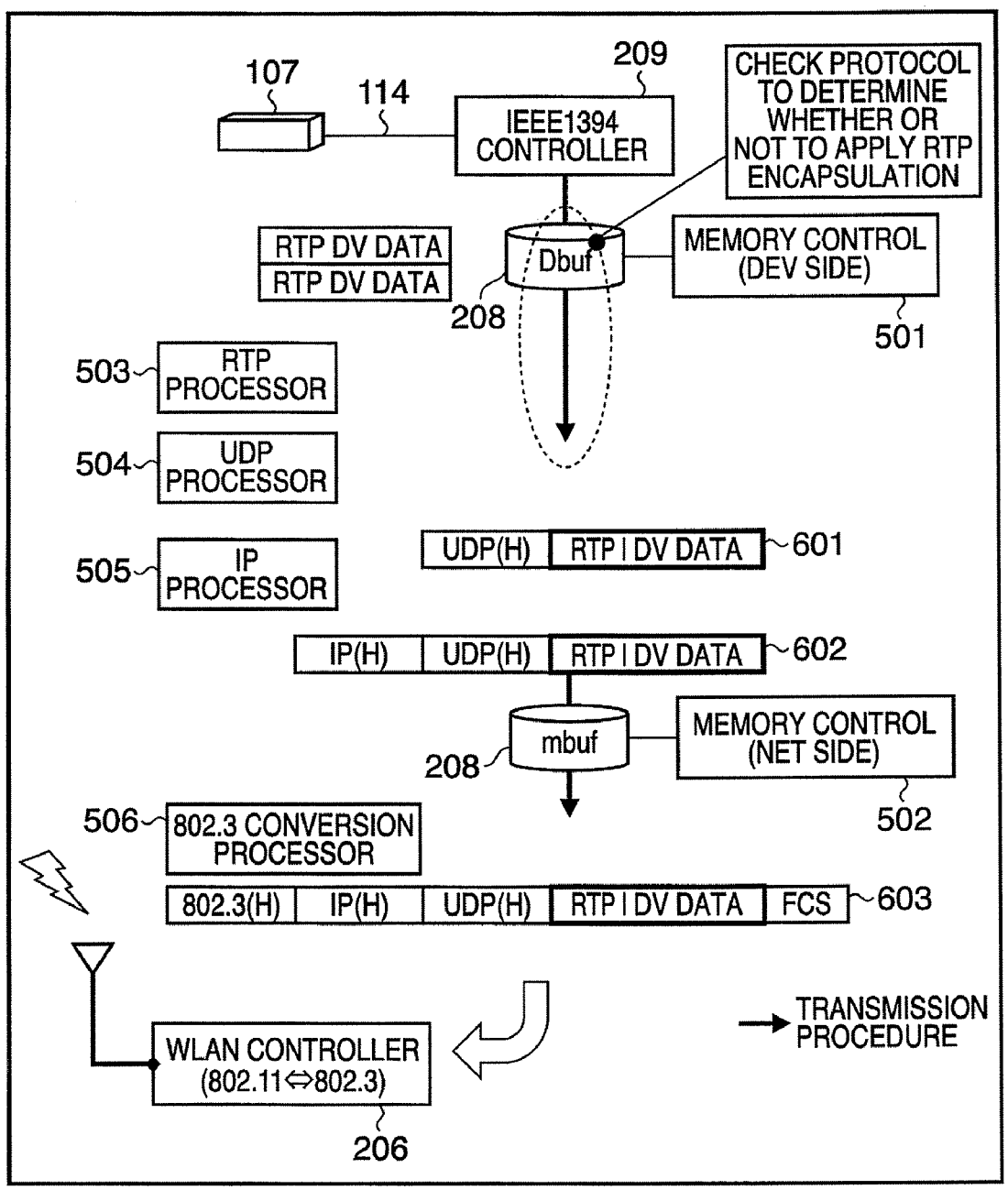
FIG. 6 is a chart showing the processing procedure of a transmission frame when the tuner 107 supports QoS protocol processing.

FIG. 6 is a chart showing the processing procedure of a transmission frame when the tuner 107 supports QoS protocol processing. Note that the same reference numerals denote the same components as in FIG. 5, and a description thereof will be omitted. Referring to FIG. 6, reference numeral 601 denotes a UDP transmission processing frame to which a UDP header is appended by the UDP processor 504 (a UDP payload includes an RTP protocol by the tuner 107). Reference numeral 602 denotes an IP transmission processing frame, which is obtained by appending an IP header to the UDP transmission processing frame 601 by the IP processor 505. Reference numeral 603 denotes an 802.3 transmission processing frame, which is obtained by appending an 802.3 header to the IP transmission processing frame 602 by the 802.3 conversion processor 506.

Figure 7:
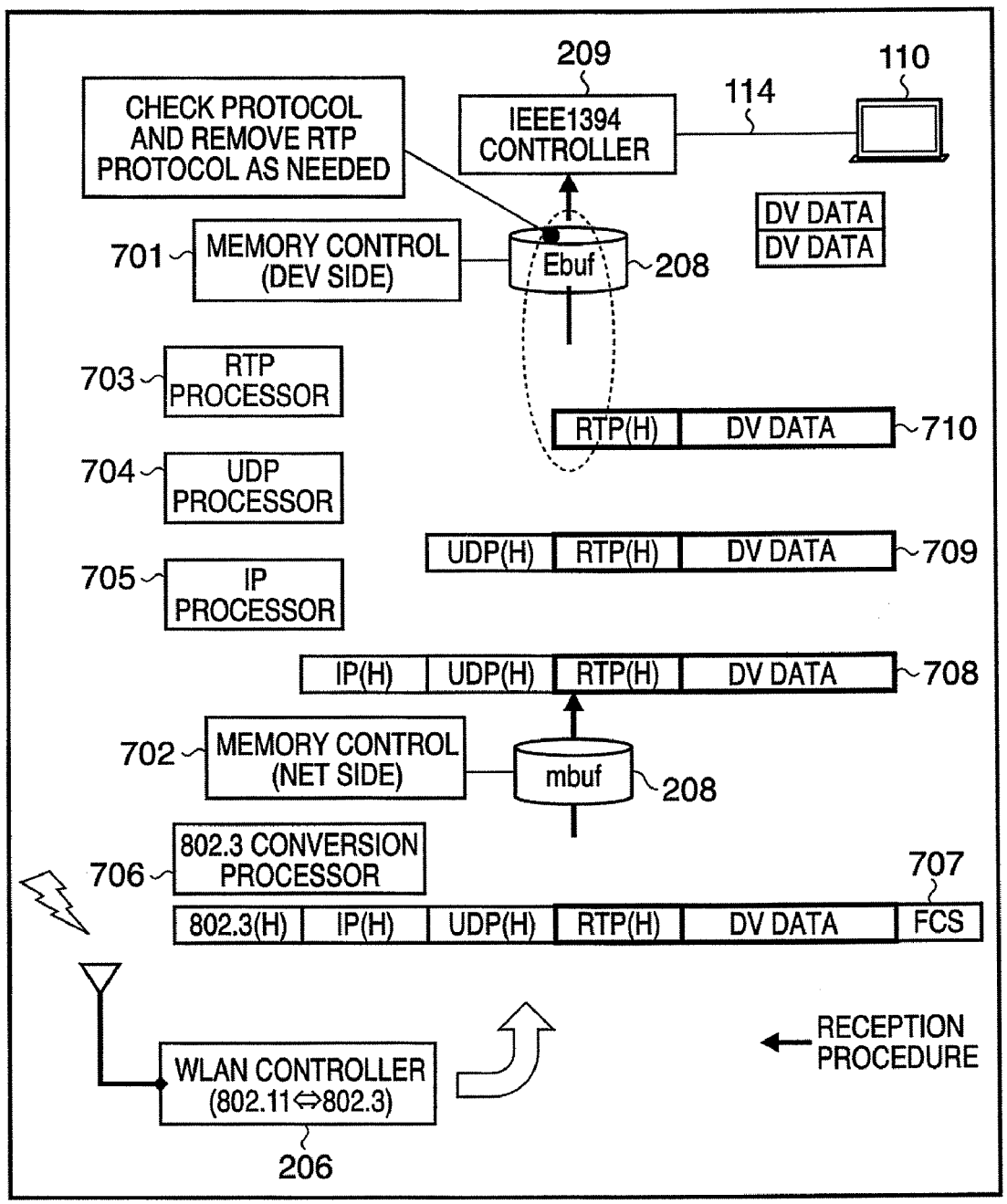
FIG. 7 is a chart showing the processing procedure of a reception frame in a receiving STA 104 shown in FIG. 4.

FIG. 7 is a chart showing the processing procedure of a reception frame in the receiving STA 104 shown in FIG. 4. An example shown in FIG. 7 corresponds to the case wherein the liquid crystal television 110 does not support any QoS protocol processing, and to the transmission frame shown in FIG. 5.

Referring to FIG. 7, reference numeral 707 denotes an 802.3 reception processing frame received from the WLAN controller 206. Reference numeral 706 denotes an 802.3 conversion processor, which removes the 802.3 header from the 802.3 reception processing frame 707. Reference numeral 702 denotes memory control processing on the network side, which writes the reception processing frame from which the 802.3 header has been removed in a reception buffer memory (mbuf) of the storage area unit 208. Reference numeral 708 denotes an IP reception processing frame which is written in the reception buffer memory. Reference numeral 709 denotes a UDP reception processing frame from which the IP header of the IP reception processing frame 708 is removed by an IP processor 705. Reference numeral 710 denotes an RTP reception processing frame from which the UDP header of the UDP reception processing frame 709 is removed by a UDP processor 704.

Note that memory control processing 701 on the device side writes the RTP reception processing frame in an encode buffer memory (Ebuf) in the storage unit area 208. In this processing, if the liquid crystal television 110 does not support any RTP function, an RTP processor 703 removes an RTP header as a QoS protocol from the data written and stored in the storage area unit 208. Note that a case wherein non-support is determined in advance in the setup sequence, and a case wherein the use of RTP as the QoS protocol of moving image data is detected and it is determined as a result of detection that the RTP is not used, are included.

Figure 8:
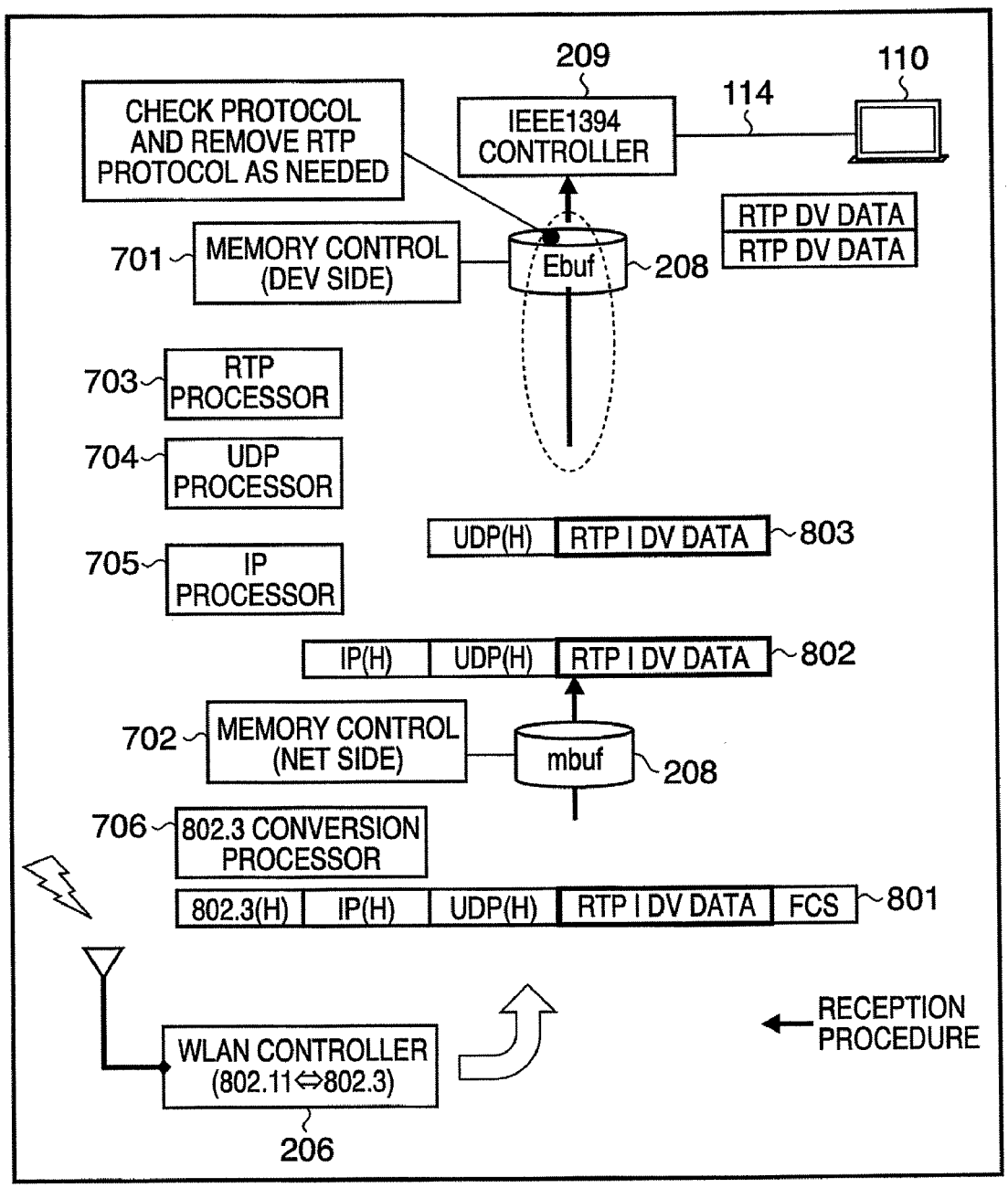
FIG. 8 is a chart showing the processing procedure of a reception frame when the liquid crystal television 110 supports QoS protocol processing.

FIG. 8 is a chart showing the processing procedure of a reception frame when the liquid crystal television 110 supports QoS protocol processing. Note that the same reference numerals in FIG. 8 denote the same components as in FIG. 7, and a description thereof will be omitted. Referring to FIG. 8, reference numeral 801 denotes an 802.3 reception processing frame received from the WLAN controller 206. Reference numeral 802 denotes an IP reception processing frame from which the 802.3 header of the 802.3 reception processing frame 801 in the reception buffer memory (mbuf) is removed by the 802.3 conversion processor 706. Reference numeral 803 denotes a UDP reception processing frame from which the IP header of the IP reception processing frame 802 is removed by the IP processor 705.

Note that the UDP reception processing frame 803 includes an RTP protocol by the device in its UDP payload, and is written in the encode buffer memory (Ebuf) in the storage area unit 208 by the memory control processing 701 on the device side. During the processing, if the liquid crystal television 110 supports the RTP function, the RTP processor 703 does not execute any QoS protocol-related processing to the data written and stored in the storage area unit 208. Note that a case wherein support is determined in advance in the setup sequence, and a case wherein the use of RTP as the QoS protocol is detected and it is determined as a result of detection that the RTP is in use by the device, are included.

Details of the processing for streaming a video according to the sequence shown in FIG. 4 will be described hereinafter, with reference to FIGS. 9 to 17.

Figure 9A:
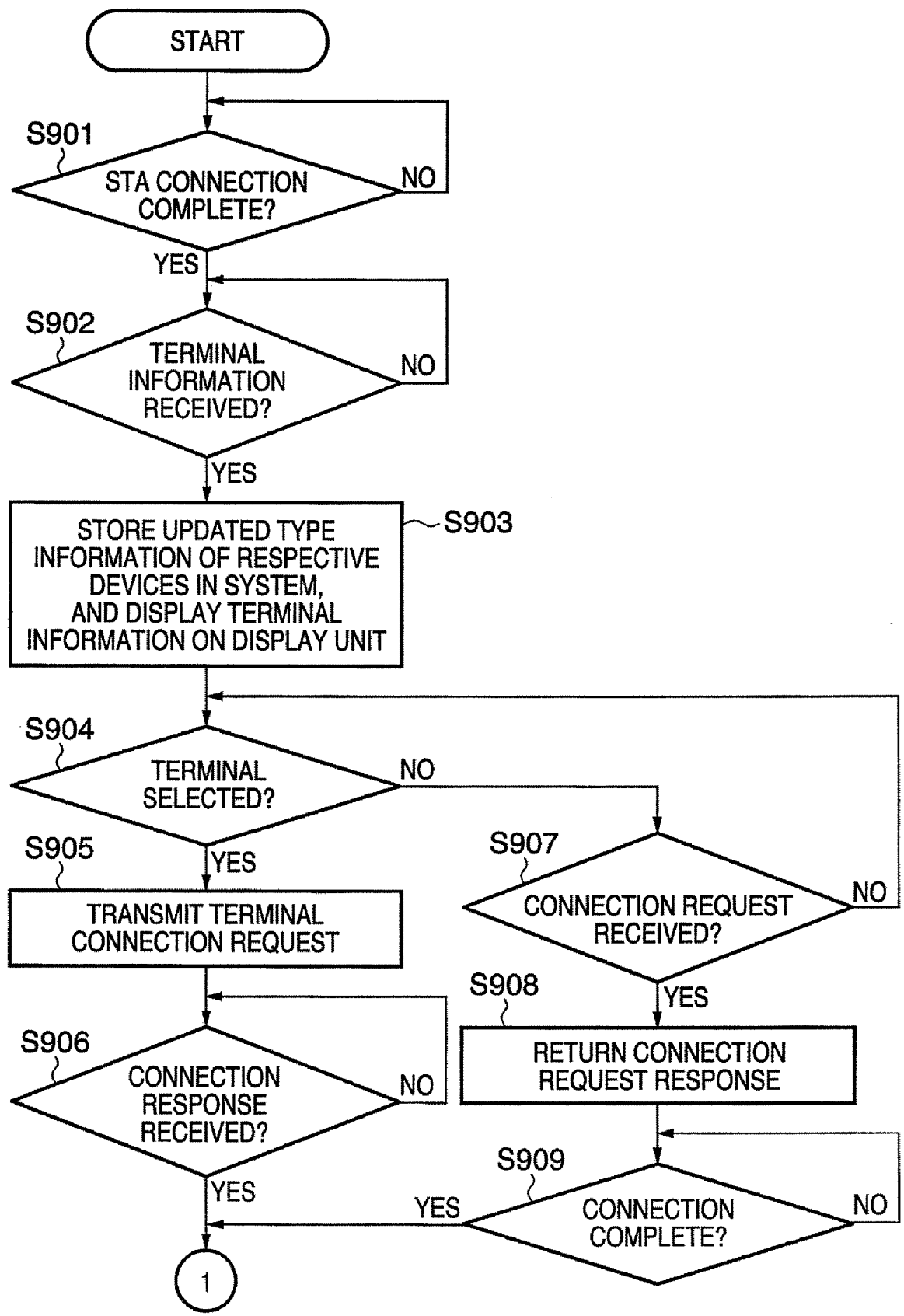
FIGS. 9A and 9B are flowcharts showing the processing of an input/output device according to the first embodiment.
Figure 9B:
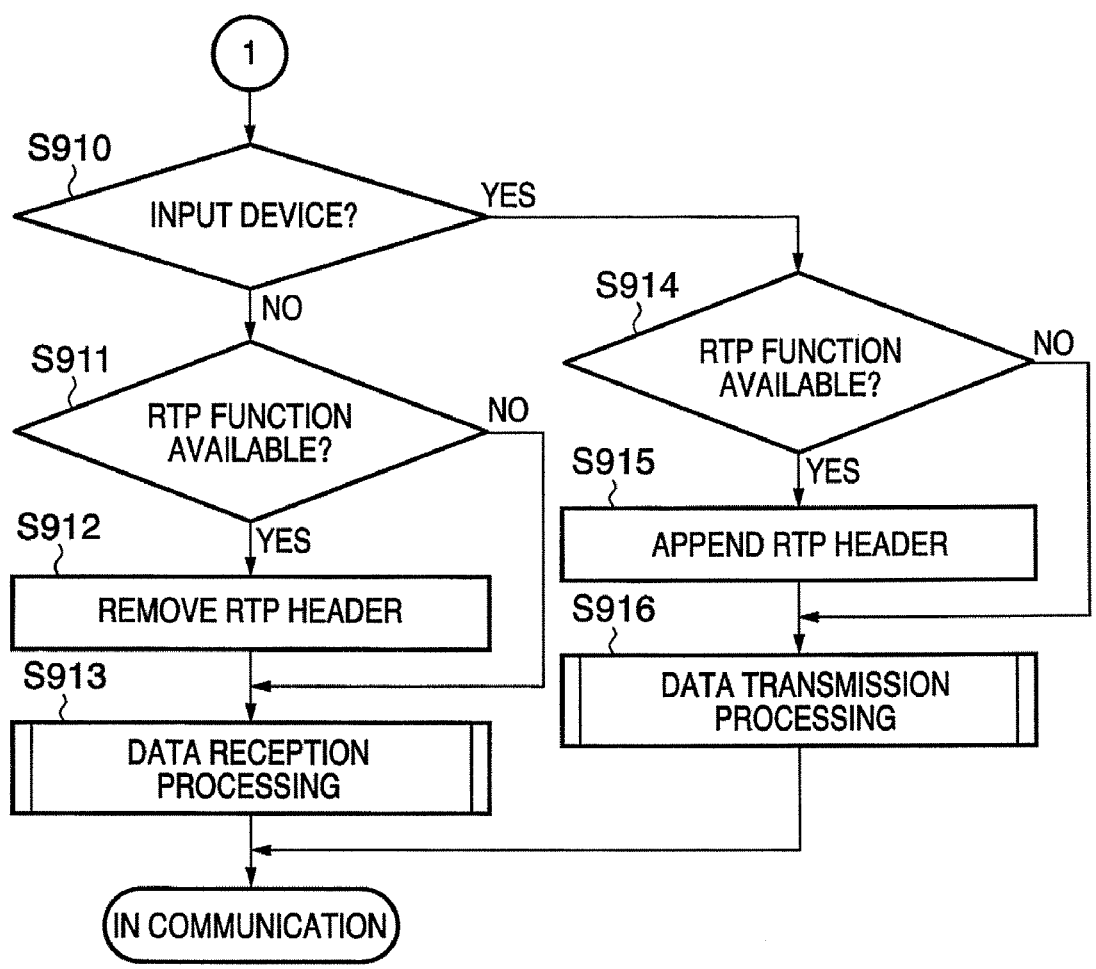
Figure 10:
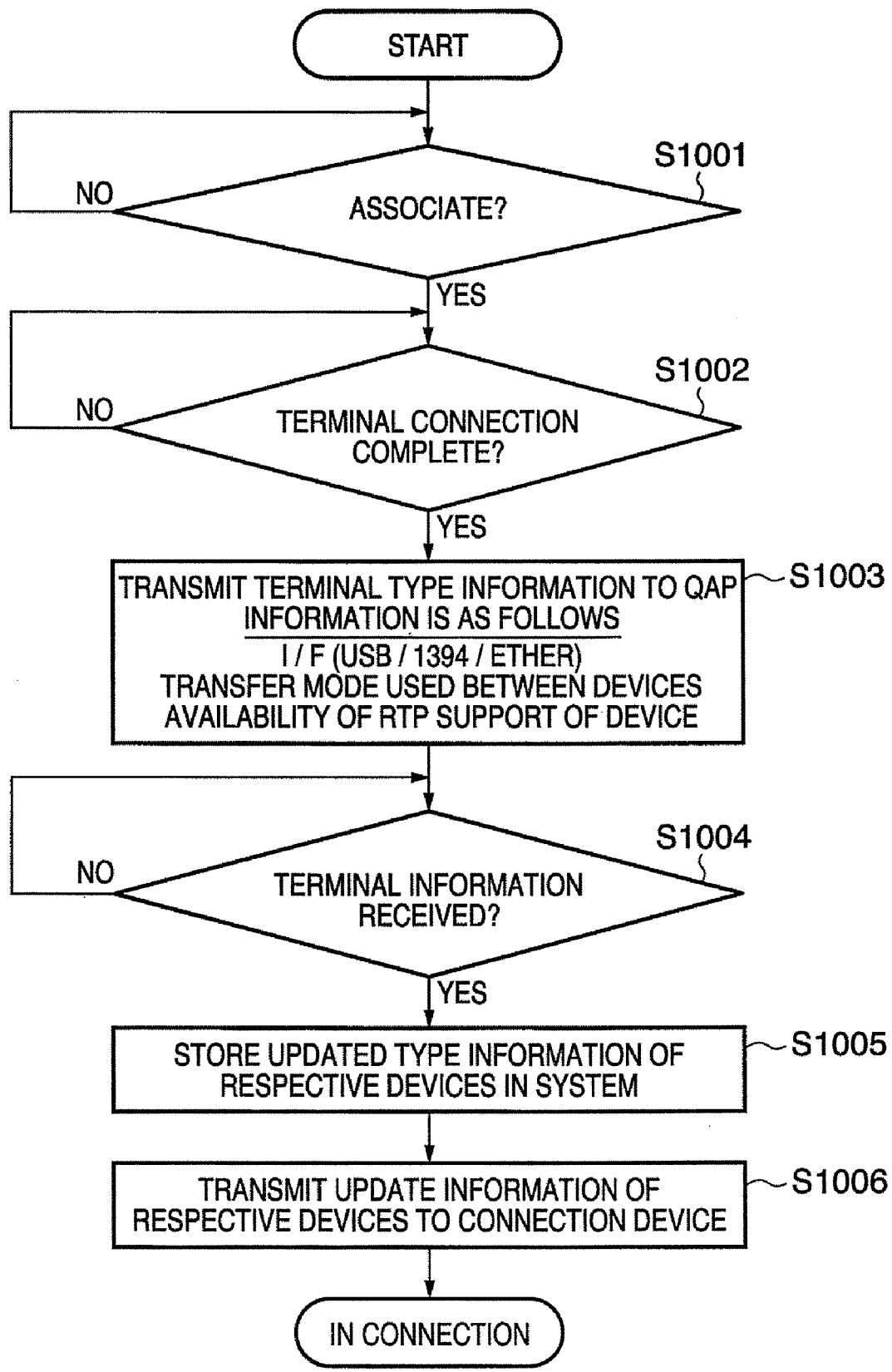
FIG. 10 is a flowchart showing the common processing to the wireless adapter devices according to the first embodiment.
Figure 11A:
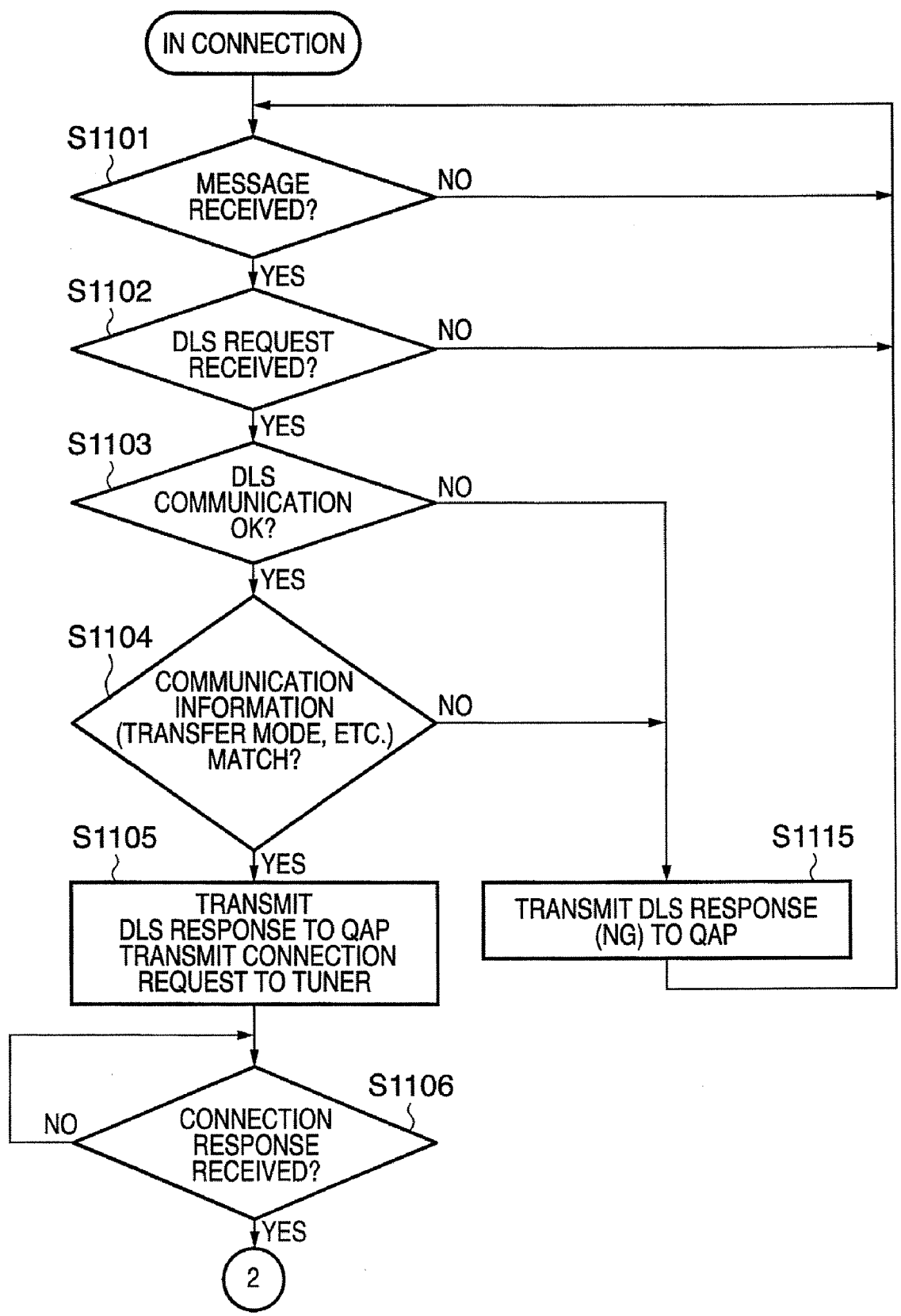
FIGS. 11A and 11B are flowcharts showing the processing of the transmitting STA 101 according to the first embodiment.
Figure 11B:
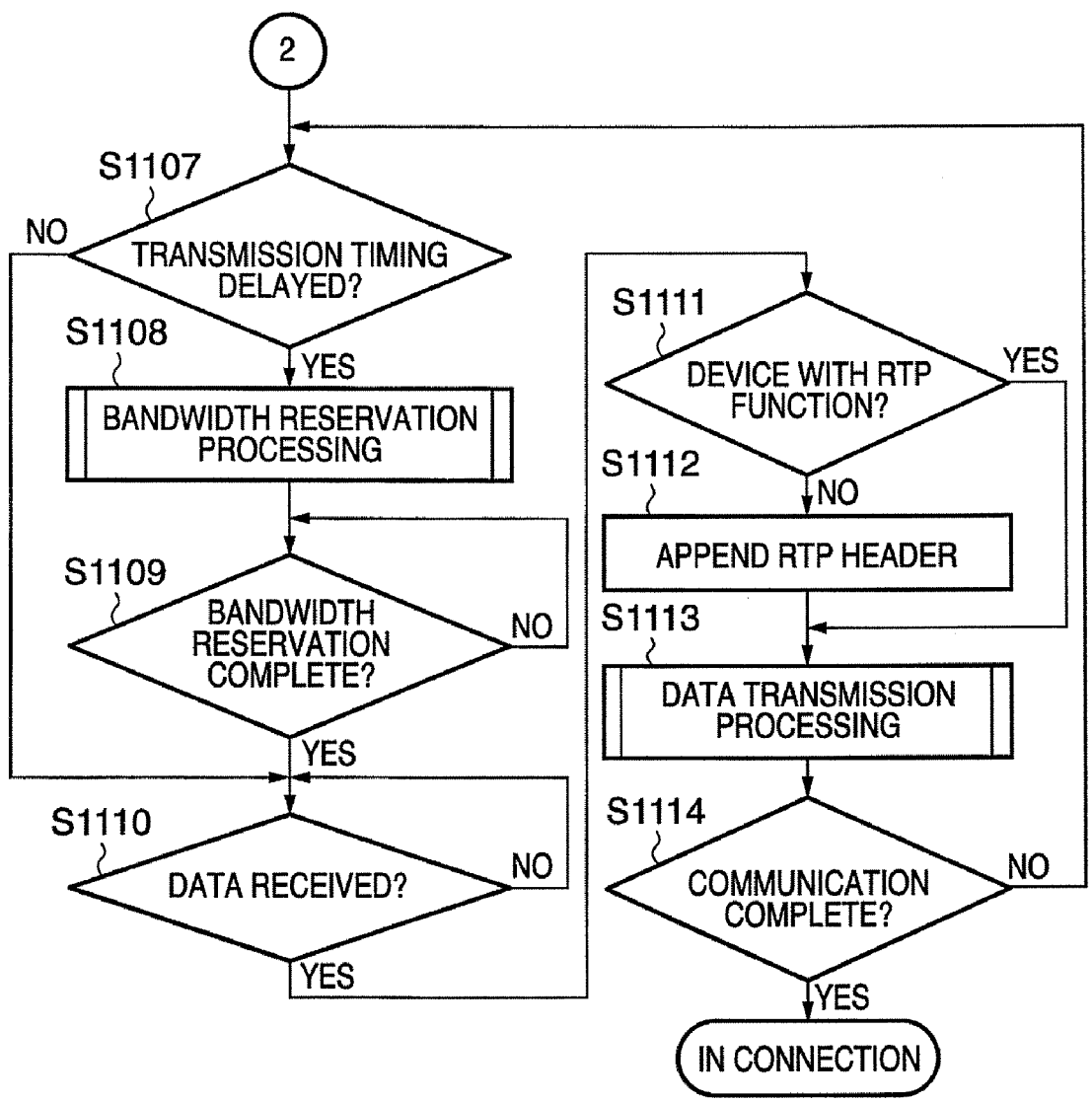
Figure 12:
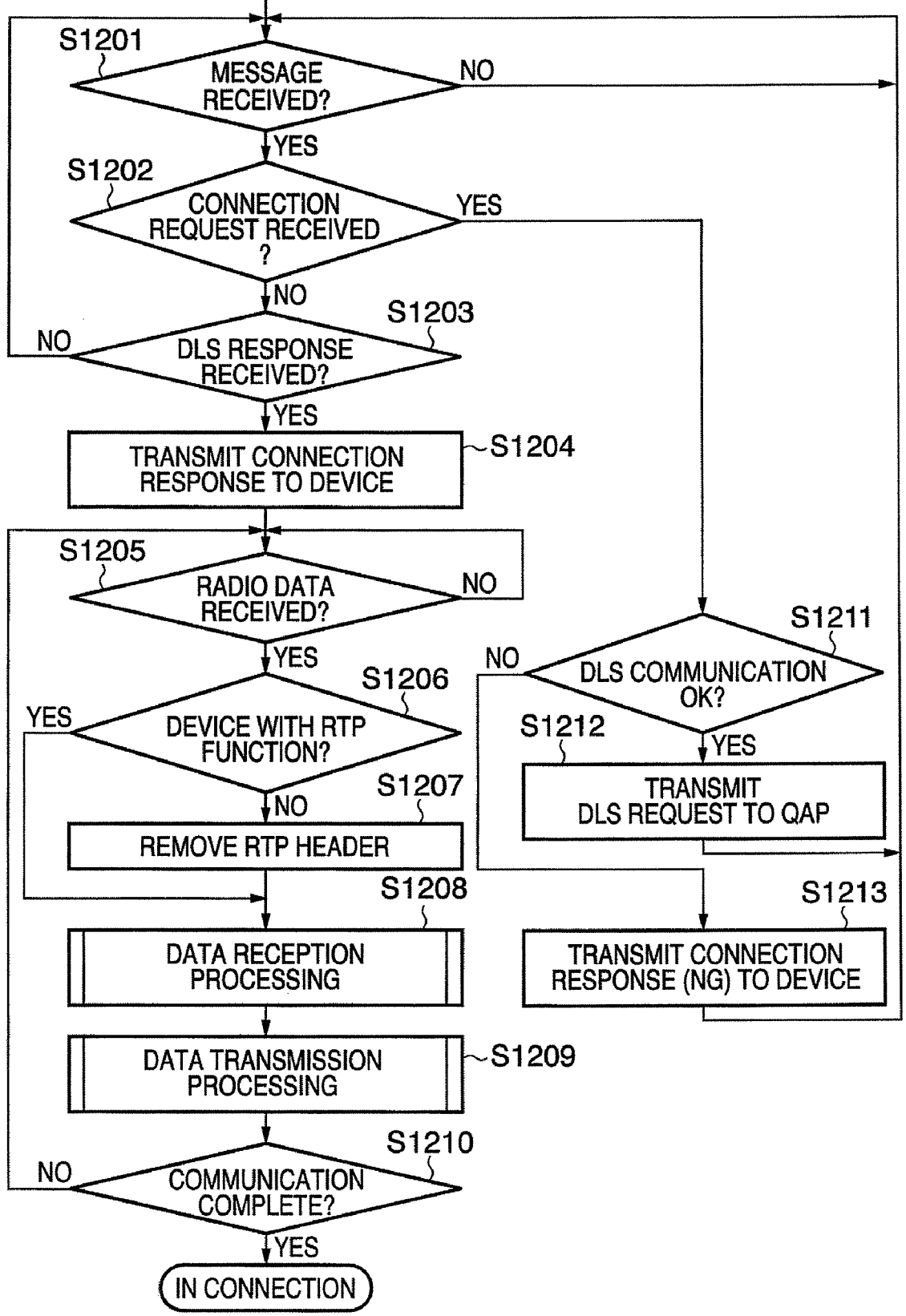
FIG. 12 is a flowchart showing the processing of the receiving STA 104 according to the first embodiment.
Figure 13:
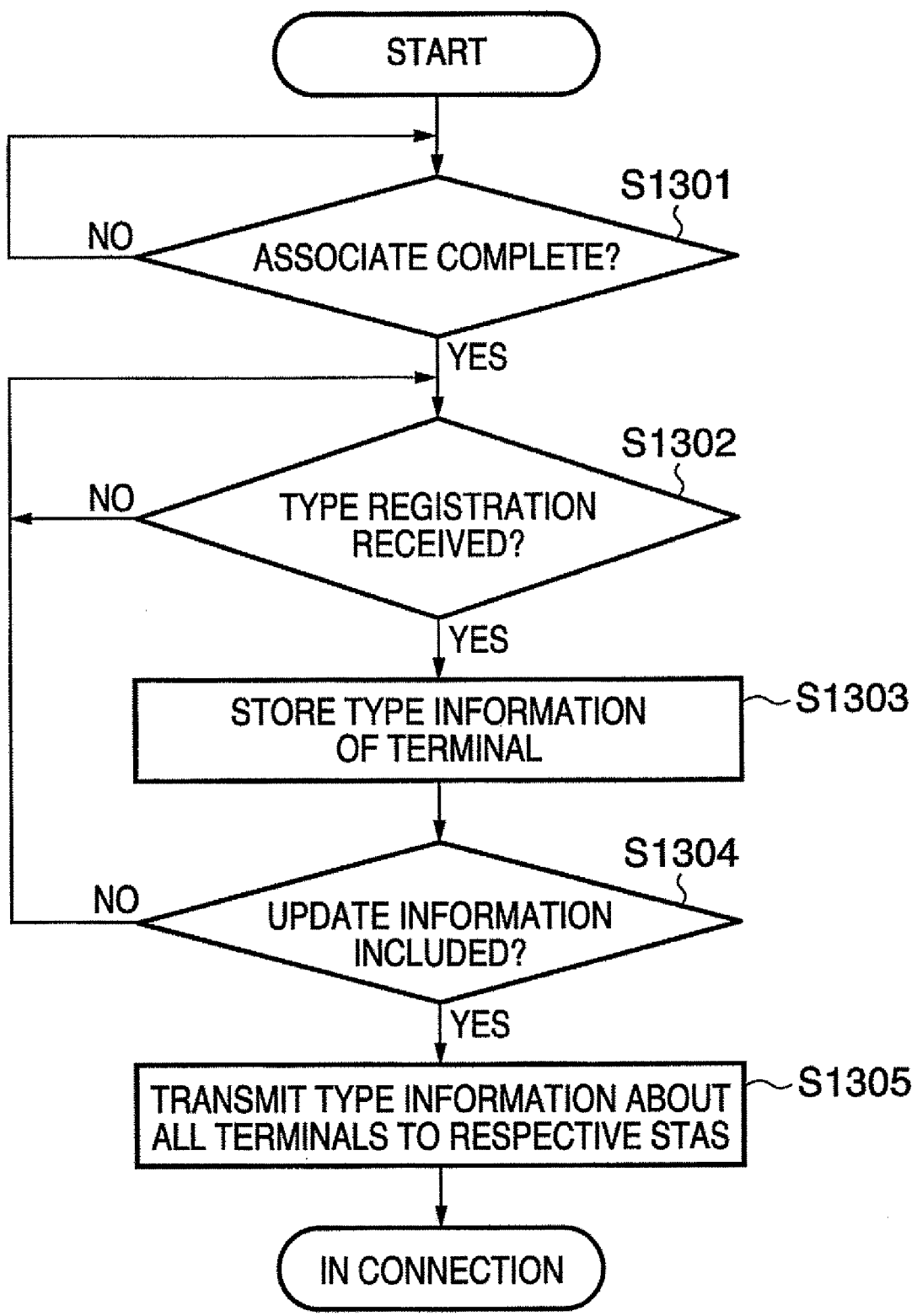
FIG. 13 is a flowchart showing the processing of a QAP 106 according to the first embodiment.
Figure 14:
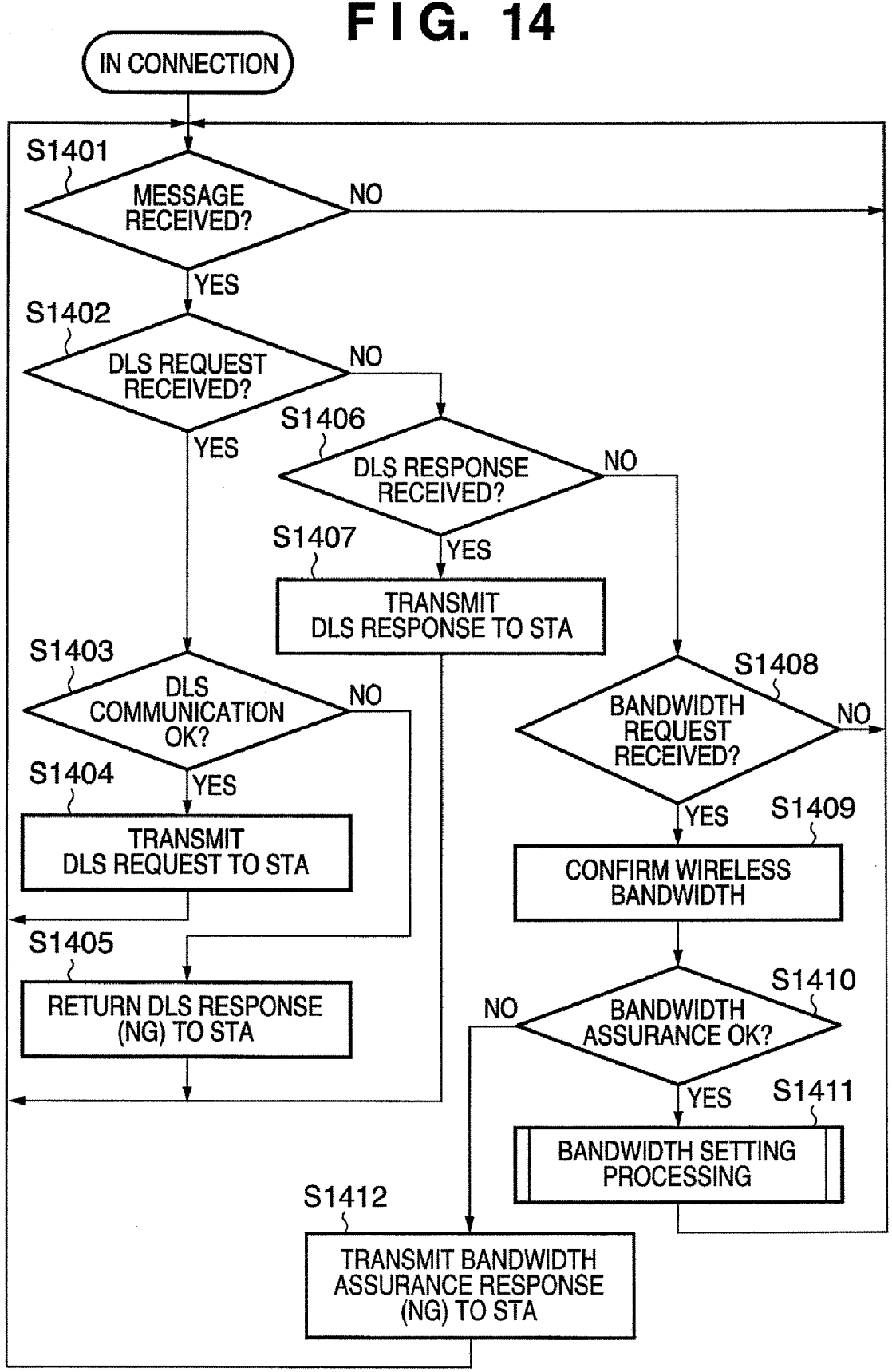
FIG. 14 is a flowchart showing the processing of the QAP 106 according to the first embodiment.

FIGS. 9A and 9B are flowcharts showing the processing of the input/output device according to the first embodiment. The input/output device includes the tuner 107 and liquid crystal television 110. FIG. 10 is a flowchart showing the common processing to the STAs according to the first embodiment. FIGS. 11A and 11B are flowcharts showing the processing of the transmitting STA 101 according to the first embodiment. FIG. 12 is a flowchart showing the processing of the receiving STA 104 according to the first embodiment. FIGS. 13 and 14 are flowcharts showing the processing of the QAP 106 according to the first embodiment.

FIG. 15 is a table showing the relationship between the implementation states of RTP processing and wireless data formats according to the first embodiment. In this table, "RTP function" indicates support of the RTP protocol in the input/output device. Also, "implemented" signifies appending the RTP header to DV data exchanged between the STAs, and the data format is expressed by [RTP+DV data]. Furthermore, "none" indicates that support of the RTP protocol is not carried out.

"RTP header processing" indicates support of the RTP protocol in the STA, and "-" means that support of the RTP protocol is not available. "Add" signifies appending the RTP header to DV data exchanged between the devices, and the data format is expressed by (RTP) + [DV data] "Delete" signifies appending the RTP header from the DV data exchanged between the devices, and the data format is expressed by [DV data].

In the sequence shown in FIG. 4, the STA 101 of the transmitting device side executes association processing (M401) with the QAP 106 when it is installed in the service area of the QAP 106 or the power switch of the STA 101 is turned on. Upon completion of the association processing (M401) of the STA 101 in step S1001, the process advances to step S1002, and the STA 101 checks if IEEE 1394 connection sequence processing (M403) to the tuner 107 is complete.

On the other hand, in the tuner 107 as the transmitting device, the connection operation to the STA 101, power-ON of the device main body, or the like is performed. Upon completion of the IEEE 1394 connection sequence processing (M403) with the STA 101 in step S901, the process advances to step S902 to receive, from the STA 101, update information of all the STAs accommodated in the system.

Upon completion of the IEEE 1394 connection sequence processing (M403) of the STA 101, the process advances to step S1003 to transmit a type registration message (M406) including information about the connected device as terminal type information to the QAP 106. Note that the information about the connected device includes a device name, interface type "IEEE 1394", transfer mode "isochronous", and the support state "YES" of the RTP/RTCP protocol. In step S1004, the STA 101 waits for reception of the update information of all the terminals accommodated in the system from the QAP 106.

On the other hand, upon completion of the association processing (M401) with the STA 101 in step S1301, the process advances to step S1302, and the QAP 106 waits for reception of the type registration message (M406) including information about the tuner 107. Upon reception of the type registration message (M406) from the STA 101, the process advances to step S1303, and the QAP 106 stores the terminal type information in the form of, e.g., a device management table shown in FIG. 16 in the memory. The QAP 106 then checks in step S1304 if update information is included. If it is determined that a new STA is registered by the association processing, or if it is determined that the information of the type registration message from the STA of interest has changed due to connection of a device different from the previous device, the process advances to step S1305. In step S1305, the QAP 106 transmits a type information message (M409) including, e.g., device information of the device management table shown in FIG. 16 as the latest information to the STA 101, thus making transition to an in-connection state.

On the other hand, if the STA 101 receives the type information message (M409) from the QAP 106, the process advances to step S1005, and the STA 101 stores the received message in the form of the device management table shown in, e.g., FIG. 16 in the storage area unit 208. In step S1006, the STA 101 transmits a system terminal information message (M410) to the tuner 107, thus making transition to an in-connection state.

Upon reception of the system terminal message (M410) from the STA 101, the process advances to step S903, and the tuner 107 stores the information about a connected device that allows communications in the form of the device management table shown in FIG. 16. The tuner 107 displays the device accommodation states, performances, and conditions of the devices in the system on a display unit, such as an LCD or the like. The process then advances to step S904, and the tuner 107 enters an in-connection state. The information about the connected device includes a device name, interface type "IEEE 1394", transfer mode "isochronous", and the support state "YES" of the RTP/RTCP protocol.

Note that the same processing as that on the aforementioned transmitting side is done among the liquid crystal television 110 as the receiving device, the receiving STA 104, and QAP 106 in FIG. 4. Different processes between the tuner 107 on the transmitting side and the liquid crystal television 110 on the receiving side will be explained below.

In step S903, the tuner 107 displays the accommodation states, performances, and conditions of the devices in the system. Alternatively, the liquid crystal television 110 adopts, for example, icons and the like, and visually recognizably displays devices with which data can be exchanged. That is, the liquid crystal television 110 displays the accommodation states, performances, and conditions of the devices which are connected and accommodated in the system and with which data can be exchanged on a part of a large liquid crystal screen or by switching a connected device display dedicated screen.

In FIG. 4, upon selection of the icon of the tuner 107 on the screen of the liquid crystal television 110, the process advances to step S905, and the liquid crystal television 110 transmits a connection request message (M411) including information that specifies the tuner 107 to the STA 104.

On the other hand, if the STA 104 in a message reception waiting state receives the message from the liquid crystal television 110 in step S1201, the process advances to step S1202. The STA 104 checks in step S1202 if the received message is a connection request message (M411). If YES in step S1202, the process advances to step S1211. The STA 104 checks in step S1211 if a direct communication can be made with another STA under the direct link service control of the QAP 106. If a direct communication cannot be made, the process jumps to step S1213.

In step S1213, the STA 104 transmits a connection response message including information indicating that a communication cannot be made to the liquid crystal television 110, and the process returns to step S1201. On the other hand, if it is determined in step S1211 that a direct communication can be made, the process advances to step S1212, and the STA 104 transmits a direct link service setup request (DLS request) message (M412) to the QAP 106. The process then returns to step S1201.

On the other hand, if the QAP 106 receives a message from the STA 104 in step S1401, the process advances to step S1402, and the QAP 106 checks if the received message is the DLS request message (M412). If YES in step S1402, the process advances to step S1403 to check if a direct communication can be made with another STA under the direct link service control of the QAP 106. If a direct communication cannot be made, the process jumps to step S1405. In step S1405, the QAP 106 transmits a DLS response message including information indicating that a communication cannot be made to the STA 104, and the process returns to step S1401.

If it is determined in step S1403 that a direct communication can be made, the process advances to step S1404, and the QAP 106 transmits a DLS request message (M413) to the STA 101. The process then returns to step S1401.

If the STA 101 in connection receives the message from the QAP 106 in step S1101, the process advances to step S1102 to check if the received message is a DLS connection request message (M413). If YES in step S1102, the process advances to step S1103 to check if a direct communication can be made with another STA under the direct link service control of the QAP 106. If a direct communication cannot be made, the process advances to step S1115. In step S1115, the STA 101 transmits a DLS response message (M414) including information indicating that a communication cannot be made to the QAP 106, and the process returns to step S1101.

If it is determined in step S1103 that a direct communication can be made, the process advances to step S1104 to check if a match of the communication information, i.e., transfer mode, etc., is detected. Note that the transfer mode is checked based on, e.g., a transfer mode correspondence table shown in FIG. 17. FIG. 17 shows a relation table between the device transfer modes and use protocols. That is, FIG. 17 is a table showing the (top-level) use protocol selected based on the relationship between the transfer modes of an interface between input-system device and adapter, and an interface between an output (display)-system device and adapter.

For example, in case of pattern number 7, i.e., interface: IEEE 1394, transfer mode: isochronous, QoS: RTP, the RTP as the QoS protocol is confirmed as the communication protocol of the top-level layer. In case of pattern number 6, i.e., interface: IEEE 1394, transfer mode: asynchronous, QoS: TCP, other than a video stream, the TCP is confirmed as the communication protocol of the top-level layer. Also, based on the device management table shown in FIG. 16, consistency between device management information 1604 associated with the liquid crystal television 110 and device management information 1601 of the tuner 107, especially the support states of the RTP/RTCP protocol associated with the QoS control, is verified.

Note that this verification is made based on identification information of the request source, i.e., the receiving device side STA 104 included in the DLS connection request message (M413).

If it is determined that a communication of a moving image stream cannot be made, the process advances to step S1115 to transmit a DLS response message (M414) including information indicating that a communication cannot be made to the QAP 106. The process then returns to step S1101.

If it is determined in step S1104 that a communication of a moving image stream can be made, the process advances to step S1105 to transmit a DLS response message (M414), including information indicating that a communication can be made to the QAP 106. The STA 101 also transmits a connection request message (M417) to the tuner 107.

Upon reception of a connection response message (M418) to the connection request message (M417) from the tuner 107 in step S1106, the process advances to step S1107 to check if a transmission timing is delayed. At this time, since the STA 101 does not receive any transmission data from the tuner 107 as the transmitting device (selected side), it makes a transition to a data reception waiting state in step S1110. Note that the case of the delayed transmission timing will be described later.

On the other hand, if the QAP 106 receives the DLS response message (M414) from the STA 101, the process advances to step S1407 via steps S1401, S1402, and S1406. In step S1407, the QAP 106 transmits a DLS response message (M415), including information indicating that a communication can be made to the STA 104, and the process returns to step S1401. As a result, if the STA 104 receives the DLS response message (M415), the process advances to step S1204, and the STA 104 transmits a connection response message (M416) as a response to the connection request message (M411) to the liquid crystal television 110. The process then advances to step S1205, to make transition to a data reception waiting state.

If the liquid crystal television 110 as the receiving device (selecting side) receives the connection response message (M416) in step S906, the process advances to step S910. The liquid crystal television 110 checks if the tuner 107 is an input or output device. Since the tuner 107 is an output device, the process advances to step S911 to confirm the RTP/RTCP protocol support function implemented in the liquid crystal television 110. If the RTP/RTCP protocol can be supported, the process advances to step S912, to set control processing so as to launch the RTP protocol header removal processing at the time of subsequent execution of the reception processing of communication data (M421) from the STA 104. That is, the liquid crystal television 110 executes the RTP header processing, and the STA 104 does not execute any processing. The process then advances to data reception processing in step S913. On the other hand, if the liquid crystal television 110 confirms the RTP/RTCP protocol support function and does not support the RTP/RTCP protocol, the process jumps to the data reception processing in step S913. In such a circumstance, the RTP header processing of the liquid crystal television 110 is not supported, and the STA 104 executes RTP processing.

If the tuner 107 receives the connection request message (M417) from the STA 101 in step S907, the process advances to step S908 to transmit a connection response message (M418) to the STA 101. Upon completion of the connection to the STA 101 in step S909, the process advances to step S910 to check if the liquid crystal television 110 is an input or an output device. In such a circumstance, given that the liquid crystal television 110 is an input device, the process advances to step S914 to confirm the RTP/RTCP protocol support function. If the RTP/RTCP protocol is supported, the process advances to step S915, wherein the tuner 107 sets the control processing so as to the launch RTP protocol header appending processing at the time of the subsequent execution of the transmission processing of communication data (M419) to be transmitted to the STA 101. That is, the tuner 107 executes the RTP header processing, and the STA 101 does not execute any processing. The process then advances to data transmission processing in step S916. If the tuner 107 confirms the RTP/RTCP protocol support function, and does not support the RTP/RTCP protocol, the process jumps to the data transmission processing in step S916. In such a circumstance, the RTP header processing of the tuner 107 is not supported, and the STA 101 executes the RTP processing.

The control processing that is executed when the tuner 107 as the transmitting device (selected side) and the liquid crystal television 110 as the receiving device (selecting side) respectively make the transition from the in-connection state to the data communication state has been described.

The QoS protocol control processing and reservation processing of a wireless band in a moving image stream communication based on the data exchange state between the STA 101 to which the tuner 107 is connected, and the STA 104 to which the liquid crystal television 110 is connected, will be described below.

If the STA 101 in the data reception waiting state receives digital moving image data (M419) with the RTP header appended by the data transmission processing of the tuner 107 in step S1110, the process advances to step S1111, wherein the STA 101 checks the RTP/RTCP protocol support state implemented in the tuner 107. The checking step is attained by referring to the device management table that stores information obtained by the setup messages exchanged between the devices.

If the RTP/RTCP protocol is not supported, the process advances to step S1112 to set the control processing so as to launch the RTP protocol header appending processing upon subsequent execution of the transmission processing of communication data (M420) to be transmitted to the STA 104. The STA 101 then executes data transmission processing in step S1113. In such a circumstance, the RTP header processing of the tuner 107 is not supported, and the STA 101 executes RTP processing. If the RTP/RTCP protocol is supported, the process jumps to step S1113 to execute data transmission processing. The STA 101 confirms in step S1114 if a communication is complete. If a communication is complete, the STA 101 makes transition to the in-connection state. If a communication continues, the process returns to step S1117.

The STA 101 compares the time required to execute reception processing of, e.g., immediately preceding moving image data (M419) received from the tuner 107, with the time required to execute transmission processing of transmission data (M420) to be transmitted to the STA 104. As a result, if "reception processing time $\geq$ transmission processing time", the STA repeats the reception processing of moving image data (M422) to be received from the tuner 107, and the control processing of transmission data (M423) (steps S1107 to S1114).

If it is determined in step S1107 that "reception processing time < transmission processing time", i.e., if the danger of reception data overflow is predicted, the process advances to step S1108. In step S1108, the STA 101 launches a bandwidth reservation sequence (M428) specified by the IEEE 802.11e standard together with the QAP 106. Upon completion of the bandwidth reservation sequence (M428) in step S1109, the process advances to step S1110 to repeat the data reception processing and data transmission processing.

Therefore, the processing timings of the subsequent reception processing of reception data (M425), and the transmission processing of radio data (M426) to be transmitted to the STA 104, can be adjusted.

The reception processing of the STA 104, which receives radio data (M420, M423, M426) to be transmitted from the STA 101 to the STA 104, will be described below.

If the STA 104 receives radio data (M420, M423, M426) that is transmitted from the STA 101 in step S1205, the process advances to step S1206 to confirm the RTP/RTCP protocol support function implemented in the liquid crystal television 110. If the RTP/RTCP protocol is not supported, the process advances to step S1207 to set the control processing in order to launch the RTP protocol header removal processing upon subsequent execution of transmission processing of moving image data (M421, M424, M427) to be transmitted to the liquid crystal television 110. That is, the liquid crystal television 110 does not support the RTP header processing, and the STA 104 executes the RTP processing.

The STA 104 executes the data reception processing in step S1208, and executes the data transmission processing to the liquid crystal television 110 in step S1209. The STA 104 checks in step S1210 if a communication is complete. If a communication is not complete, the process returns to step S1205 to repeat the aforementioned processes. If it is determined in step S1206 that the RTP/RTCP protocol can be supported, the process skips step S1207 and advances to step S1208, to execute the processing.

As described above, the STA can analyze the support state of the QoS-related protocol (RTP/RTCP) associated with the communication data between the transmitting device (selected side) and the receiving device (selecting side), and can avoid the QoS-related protocol appending processing. Hence, the appropriate QoS-related protocol processing can be provided, especially for input/output data that requires real-time delivery.

Second Embodiment

The second embodiment of the present invention will be described in detail hereinafter with reference to the accompanying drawings. In the second embodiment protocol header information of data to be actually transmitted is analyzed, and the QoS-related protocol processing is controlled in accordance with the analysis result. More specifically, the STA 101 checks if an RTP header is appended to DV data received from the tuner 107. If an RTP header is not appended, the STA 101 appends the RTP header to the DV data, and transmits that DV data to the STA 104.

Figure 18:
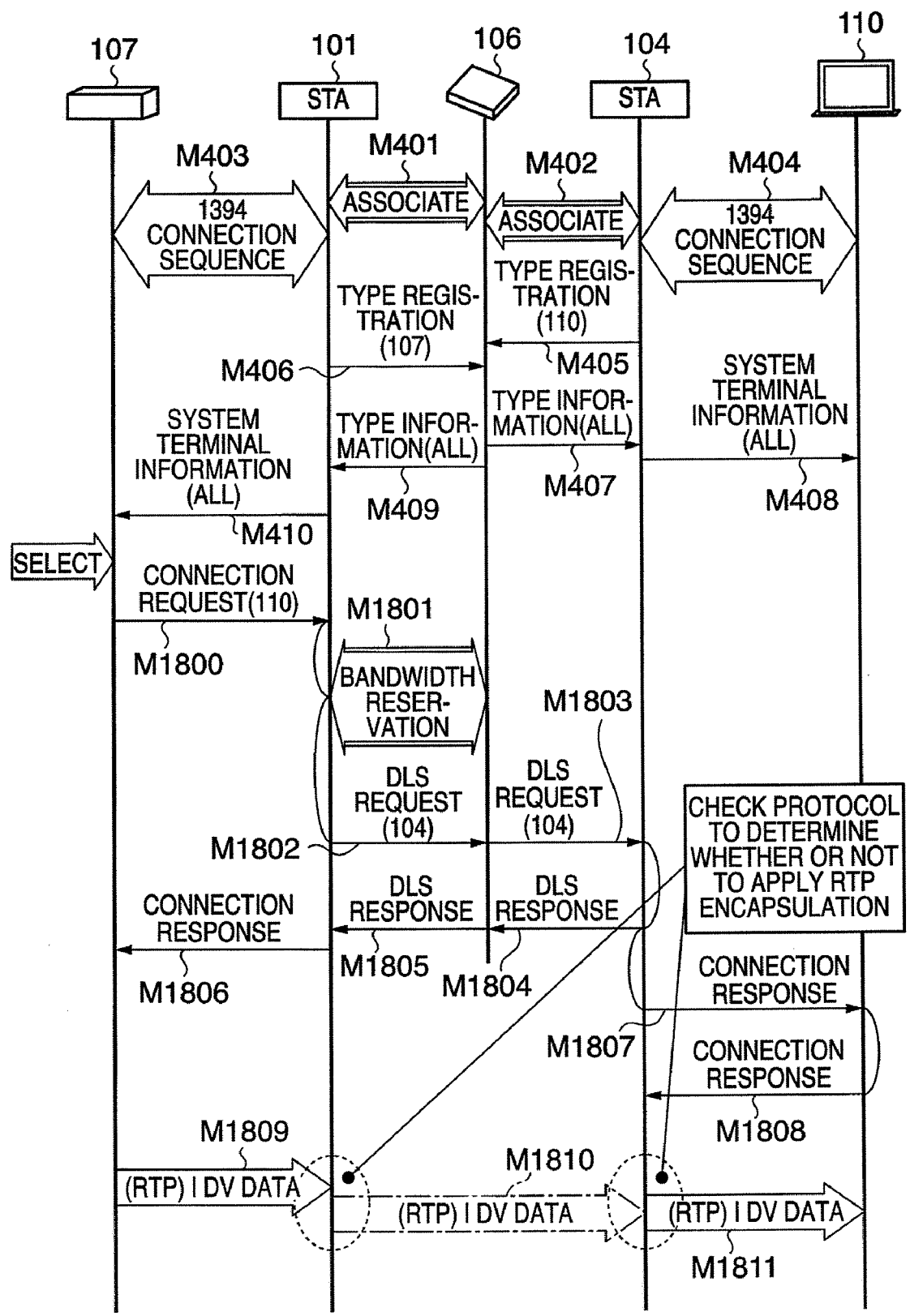
FIG. 18 is a chart showing the sequence of messages exchanged in streaming according to a second embodiment.
Figure 19:
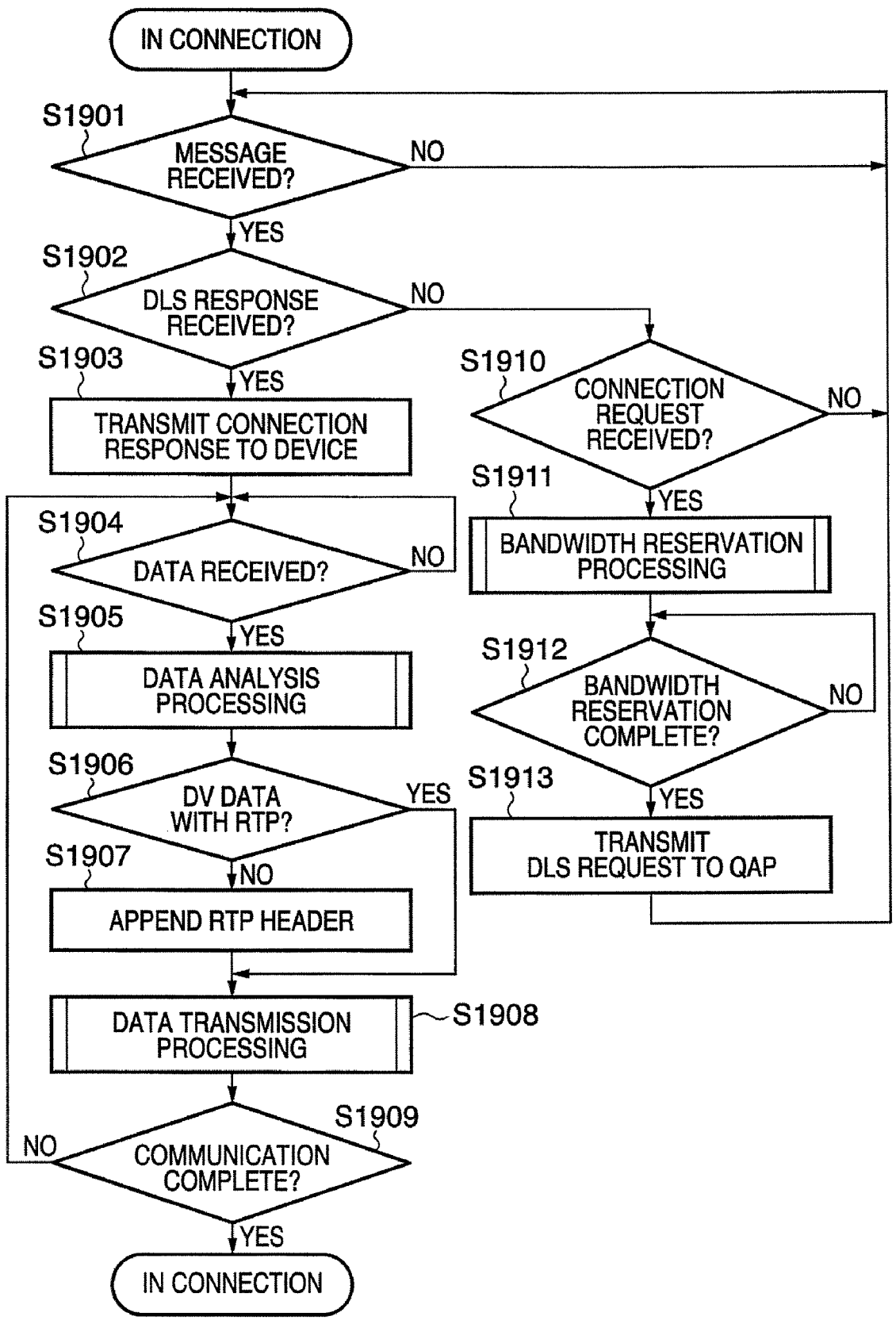
FIG. 19 is a flowchart showing the processing of the transmitting STA 101 according to the second embodiment.
Figure 20A:
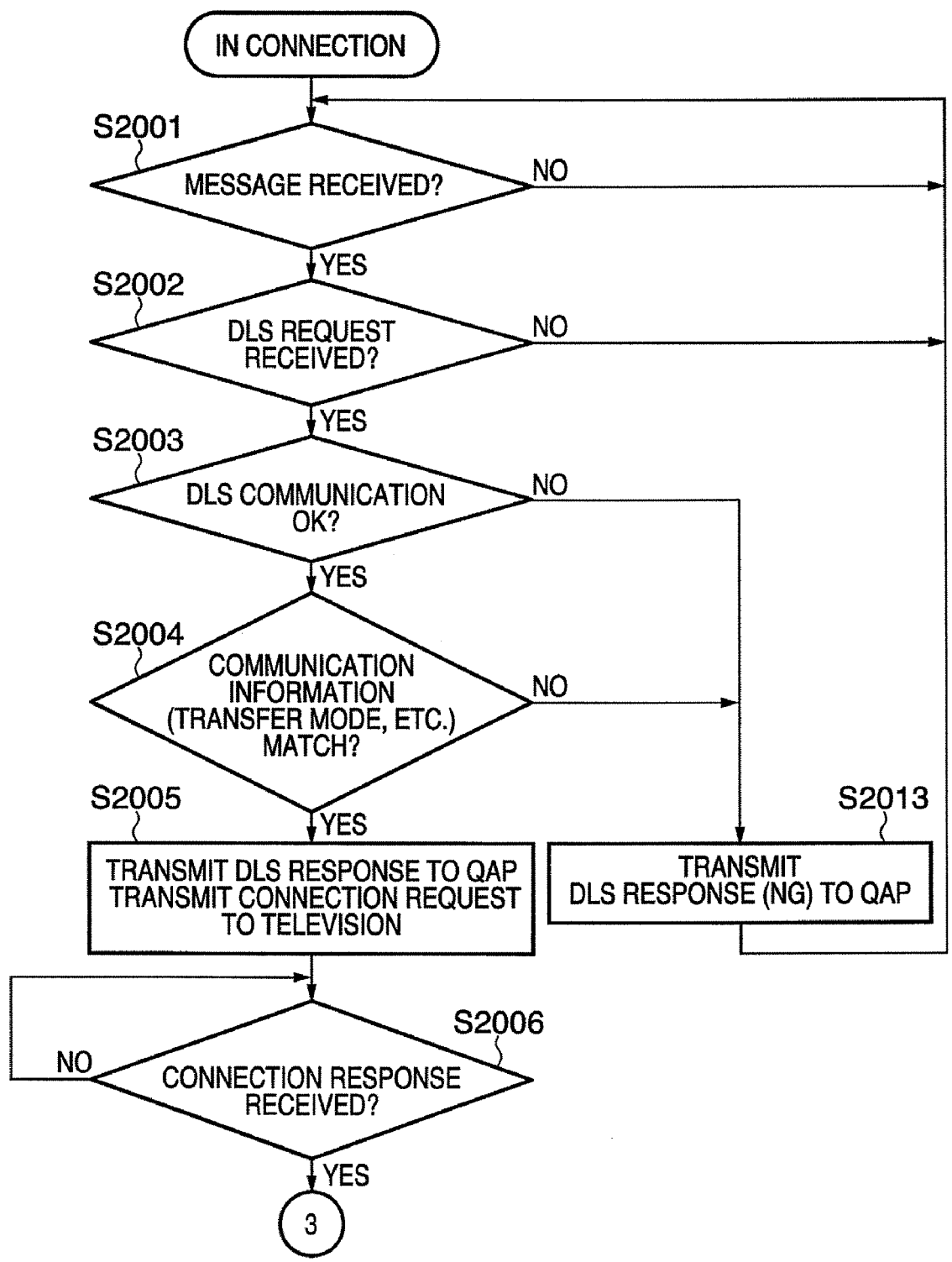
FIGS. 20A and 20B are flowcharts showing the processing of the receiving STA 104 according to the second embodiment.
Figure 20B:
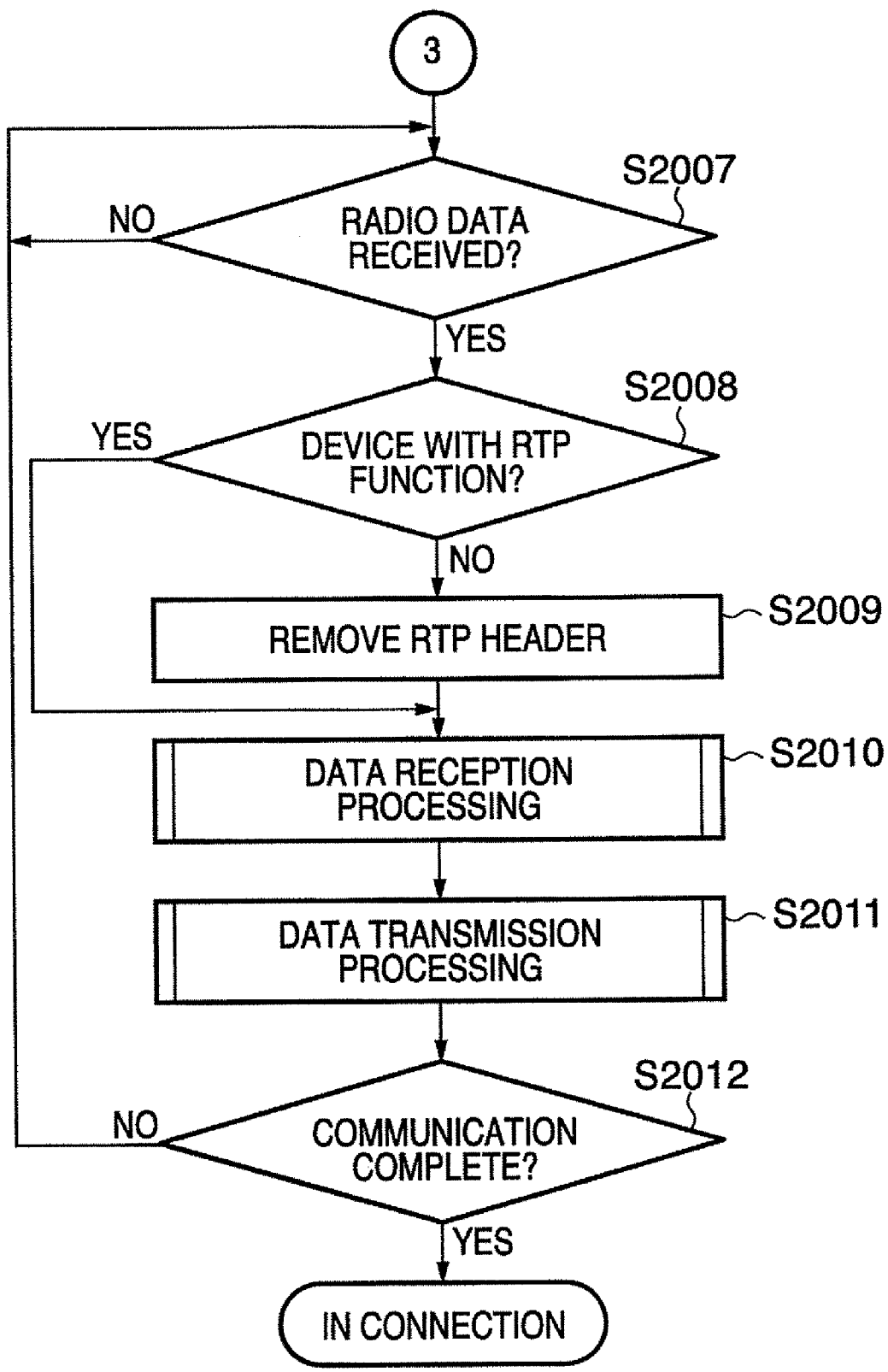

FIG. 18 is a chart showing the sequence of messages exchanged in streaming according to the second embodiment. FIG. 19 is a flowchart showing the processing of the transmitting STA 101 according to the second embodiment. FIGS. 20A and 20B are flowcharts showing the processing of the receiving STA 104 according to the second embodiment.

Note that the processing to be executed until the STAs 101 and 104 are in communication and the processing of the QAP 106 will be described using FIGS. 9, 10, and 14 of the first embodiment.

In the sequence shown in FIG. 18, messages (M401 to M410) and processing related to message exchange are the same as those in the first embodiment, and a description thereof will be omitted.

If the user makes a remote-controller operation or the like that designates the liquid crystal television 110 from the tuner 107 in step S904, the process advances to step S905 to transmit a connection request message (Ml800) including information that specifies the liquid crystal television 110 to the STA 101.

On the other hand, if the STA 101 in the in-connection state receives the connection request message (M1800) from the tuner 107, the process advances from step S1901 in turn to steps S1902, 1910, and S1911. In step S1911, the STA 101 launches a bandwidth reservation sequence (M1801) specified by the IEEE 802.11e standard together with the QAP 106. Upon completion of the bandwidth reservation sequence (M1801) in step S1912, the process advances to step S1913 to transmit a direct link service setup request (DLS request) message (M1802) to the QAP 106, and the process then returns to step S1901.

If the QAP 106 in the in-connection state receives the DLS request message (M1802) from the STA 101 in step S1401, the process advances from step S1402 to step S1403. The QAP 106 checks in step S1403 if a direct communication can be made with another STA under the direct link service control of the QAP 106. If a direct communication cannot be made, the process jumps to step S1405. In step S1405, the QAP 106 transmits a DLS response message including information indicating that a communication cannot be made to the STA 101, and the process returns to step S1401. If a direct communication can be made, the process advances to step S1404, and the QAP 106 transmits a DLS request message (M1803) to the STA 104. The process returns to step S1401.

On the other hand, if the STA 104 receives the DLS request message (M1803) from the QAP 106 in step S2001, the process advances from step S2002 to step S2003. The STA 104 checks in step S2003 if a direct communication can be made with another STA under the direct link service control of the QAP 106. If a direct communication cannot be made, the process advances to step S2013. In step S2013, the STA 104 transmits a DLS response message (M1804) including information indicating that a communication cannot be made to the QAP 106, and the process then returns to step S2001.

If it is determined in step S2003 that a direct communication can be made, the process advances to step S2004 to check if a match of the communication information (transfer mode, etc.) is detected as in the first embodiment. In this case, consistency of inter-communications is verified, and if it is determined that a communication of a moving image stream can be made, the process advances to step S2005 to transmit a DLS response message (M1804) including information indicating that a communication can be made to the QAP 106. Also, the STA 104 transmits a connection request message (M1807) to the liquid crystal television 110. In step S2006, the STA 104 waits for reception of a connection response message (M1808) from the liquid crystal television 110. Upon reception of the connection response message, the process advances to step S2007 to make transition to a data reception waiting state.

If the QAP 106 receives the DLS response message (M1804) from the STA 104 in step S1401, the process advances from step S1402 to "YES" in step S1406. In step S1407, the QAP 106 transmits a DLS response message (M1805) including information indicating that a communication can be made to the STA 101. The process then returns to step S1401.

On the other hand, if the STA 101 receives the DLS response message (M1805) in step S1901, the process advances from step S1902 to step S1903. In step S1903, the STA 101 transmits a connection response message (M1806) to the tuner 107, and the process advances to step S1904 to make transition to a data reception waiting state.

As a result, if the tuner 107 receives the connection response message (M1806) in step S906, the process advances to step S910. Since it is determined that the liquid crystal television 110 is an input device, the process advances to step S914. The tuner 107 confirms the RTP/RTCP protocol support function in step S914. If the RTP/RTCP protocol can be supported, the process advances to step S915 to execute the RTP header appending processing as in the first embodiment. If the RTP/RTCP protocol is not supported, the process jumps to step S916 to execute the data transmission processing.

If the STA 101 in the data reception waiting state receives data (M1809) from the tuner 107 in step S1904, the process advances to step S1905 to execute data analysis processing. In step S1906, the STA 101 confirms RTP/RTCP protocol header information of the received data. If an RTP header is not appended, the process advances to step S1907. The STA 101 appends the RTP header in step S1907, and executes data transmission processing to the STA 104 in step S1908. If it is determined in step S1906 that the RTP header is appended, the process jumps to step S1908 to execute the data transmission processing to the STA 104. The process returns to step S1904 until completion of transmission of all data, thus repeating the aforementioned processing.

On the other hand, if the STA 104 in the data reception waiting state receives data (M1810) from the STA 101 in step S2007, the process advances to step S2008 to check the protocol to see if the data is RTP-encapsulated. The subsequent processes (S2008 to S2012) are the same as those in steps S1206 to S1210 in FIG. 12 described in the first embodiment, and a description thereof will be omitted.

According to the second embodiment, unwanted QoS-related protocol appending processing can be avoided, and appropriate QoS-related protocol processing especially for input/output data that requires realtimeness can be provided.

Third Embodiment

The third embodiment of the present invention will be described in detail hereinafter with reference to the accompanying drawings. In the third embodiment, the priority of packet data included in a protocol header field is analyzed, and QoS-related protocol processing is controlled according to the analysis result. The first and second embodiments have explained streaming between the tuner 107 and liquid crystal television 110. The third embodiment will explain streaming between the HDR 108 and notebook type PC 111.

FIG. 21 is a diagram showing a state for directly streaming video data from the HDR 108 to the notebook type PC 111. As shown in FIG. 21, the HDR 108 is connected to the STA 102 via the wired LAN cable 115, and the notebook type PC 111 is connected to the STA 105 via the wired LAN cable 115.

Figure 22:
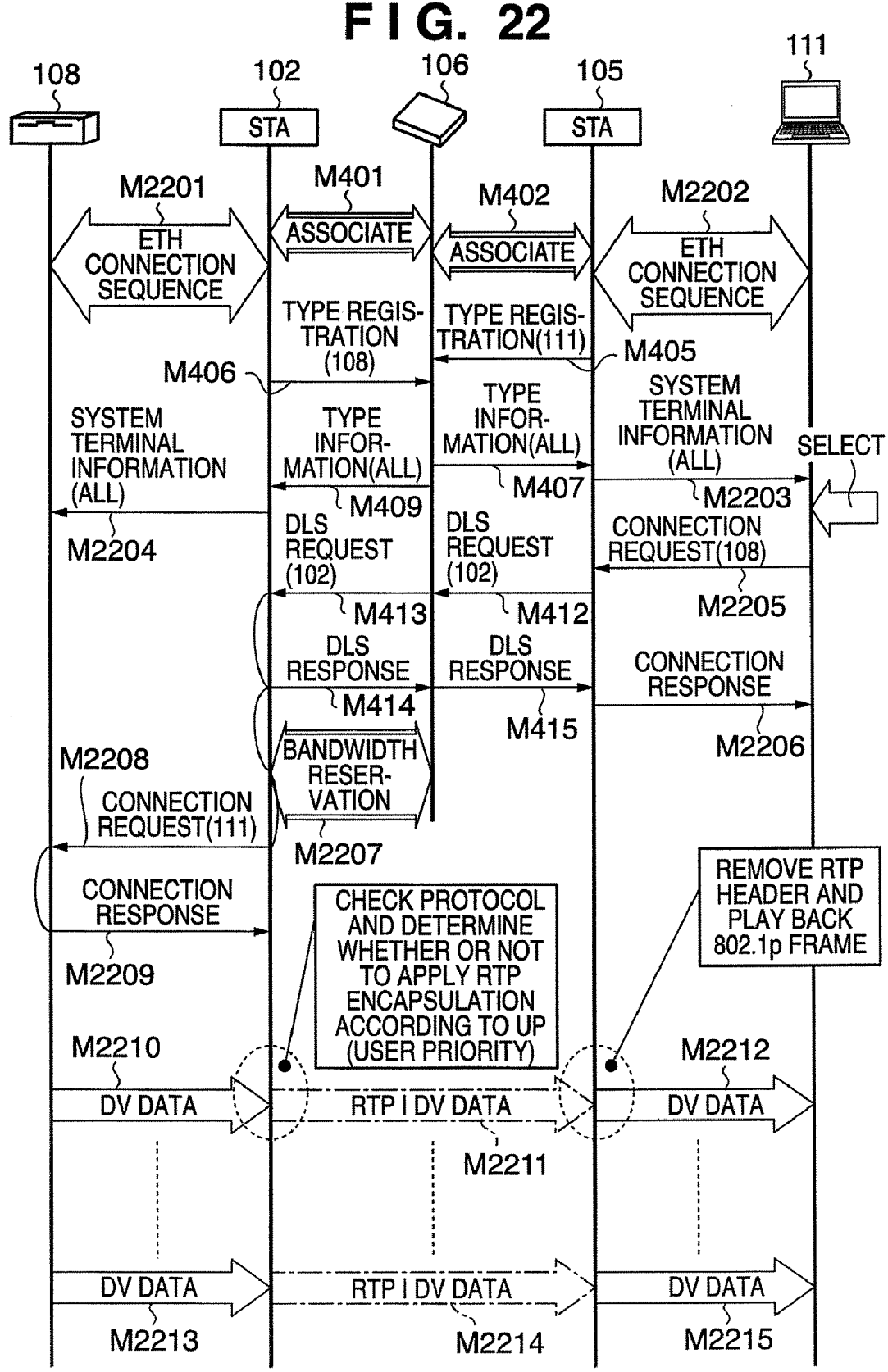
FIG. 22 is a chart showing the sequence of messages exchanged in streaming shown in FIG. 21.

FIG. 22 is a chart showing the sequence of messages exchanged in streaming shown in FIG. 21. The sequence shown in FIG. 22 specifies principal messages associated with the third embodiment, and some messages are omitted.

Figure 23:
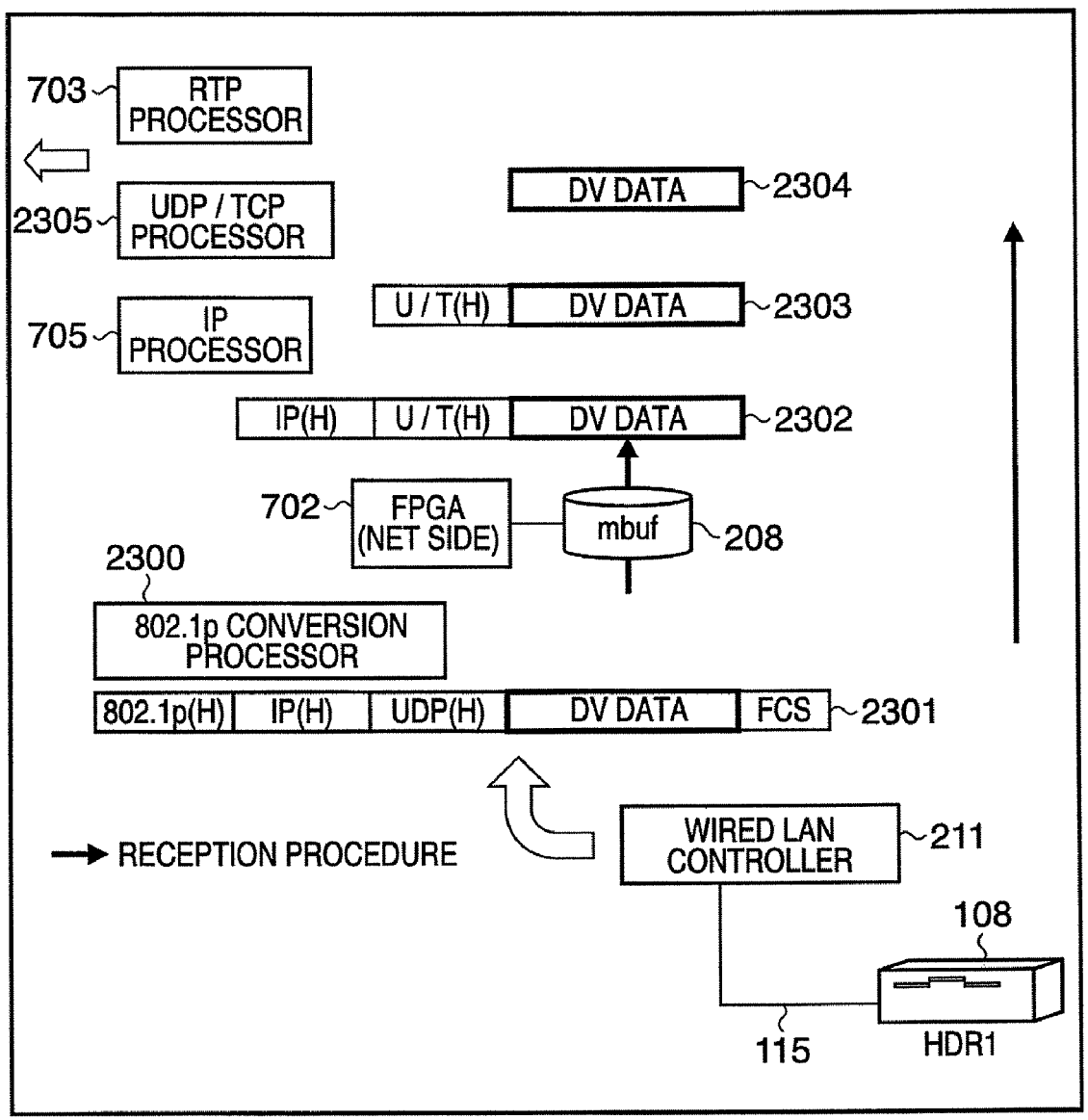
FIG. 23 is a chart showing the processing procedure of a reception frame in an input-side STA 102, connected to the HDR 108.

FIG. 23 is a chart showing the processing procedure of a reception frame in the input-side (connected to the HDR 108) STA 102. An example shown in FIG. 23 is the case wherein the HDR 108 does not support QoS protocol processing.

Referring to FIG. 23, reference numeral 2301 denotes an IEEE 802.1Q VLAN tag header (VLAN tag packet) reception frame having a user priority field which is received from the wired LAN controller 211 and is compliant to IEEE 802.1p. Reference numeral 2302 denotes an IP reception processing frame from which the VLAN tag header of the VLAN tag packet reception processing frame 2301 stored in a reception buffer memory (mbuf) is removed by an IEEE 802.3 ⇔ IEEE 802.1p mutual conversion processor 2300. Reference numeral 2303 denotes a UDP/TCP reception processing frame from which an IP header of the IP reception processing frame 2302 is removed by the IP processor 705. Reference numeral 2304 denotes a moving image frame from which a UDP/TCP header of the UDP/TCP reception processing frame 2303 is removed by a UDP/TCP processor 2305.

Reference numeral 2305 denotes a UDP/TCP processor which executes network protocol processing of a UDP or TCP transport layer. The memory control processing (on the network side) 702 executes write control of the VLAN tag packet reception processing frame to the reception buffer memory (mbuf) assured on the storage area unit 208.

Figure 24:
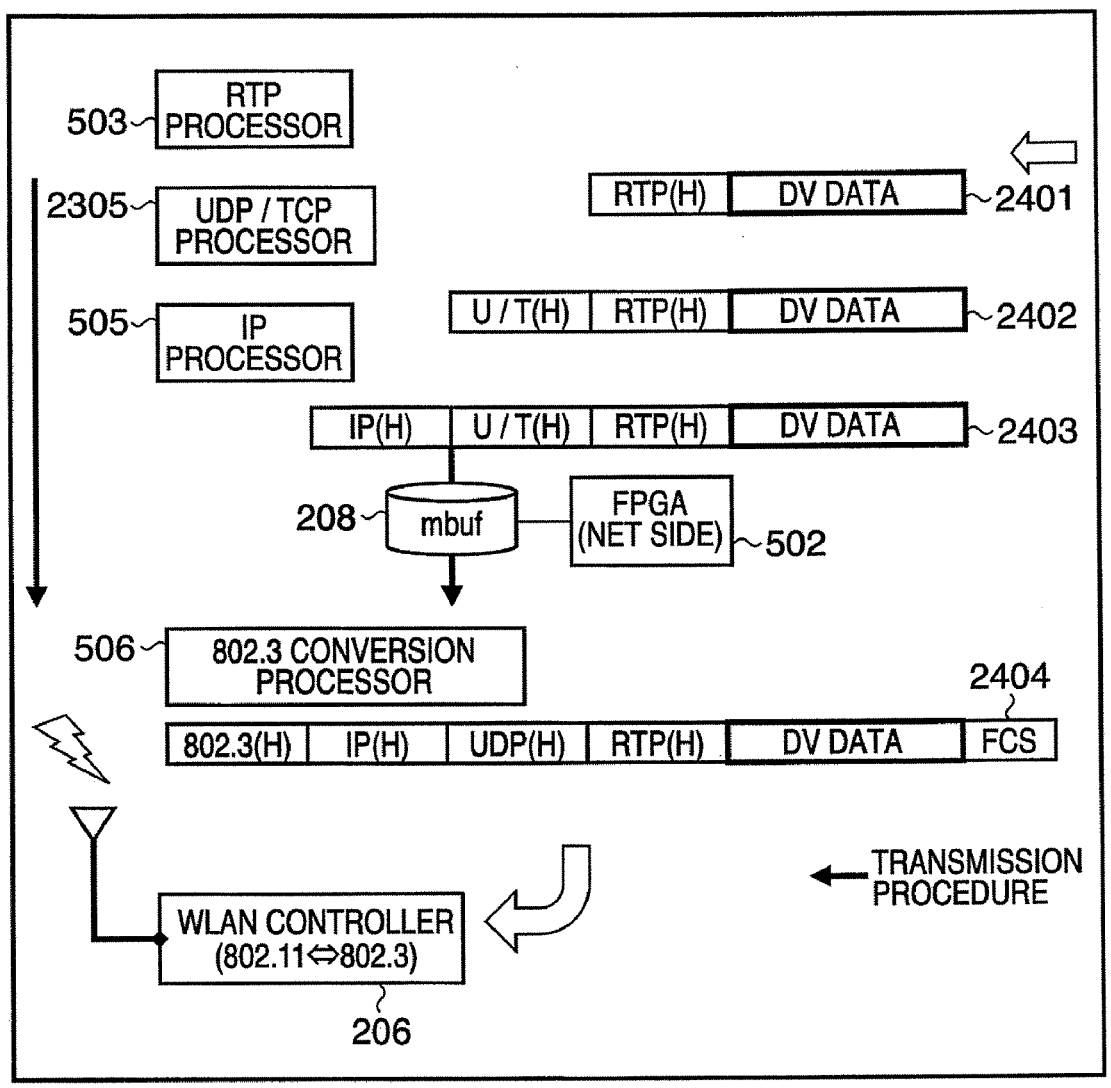
FIG. 24 is a chart showing the processing procedure of a transmission frame in the input-side STA 102, connected to the HDR 108.

FIG. 24 is a chart showing the processing procedure of a transmission frame in the input-side (connected to the HDR 108) STA 102. This example shows the case wherein the STA 102 supports QoS protocol processing.

Referring to FIG. 24, reference numeral 2401 denotes an RTP transmission processing frame, which is obtained by appending an RTP header as the QoS protocol to a moving image frame when use of RTP as the QoS protocol is detected for the moving image frame, and it is determined that the RTP is not used. Reference numeral 2402 denotes a UDP transmission processing frame to which a UDP header is appended by the UDP/TCP processor 2305. Reference numeral 2403 denotes an IP transmission processing frame which is obtained by appending an IP header to the UDP transmission processing frame 2402 by the IP processor 505. Reference numeral 2404 denotes an IEEE 802.3 transmission processing frame which is obtained by appending an 802.3 header to the IP transmission processing frame 2403 by the IEEE 802.3 conversion processor 506.

Figure 25:
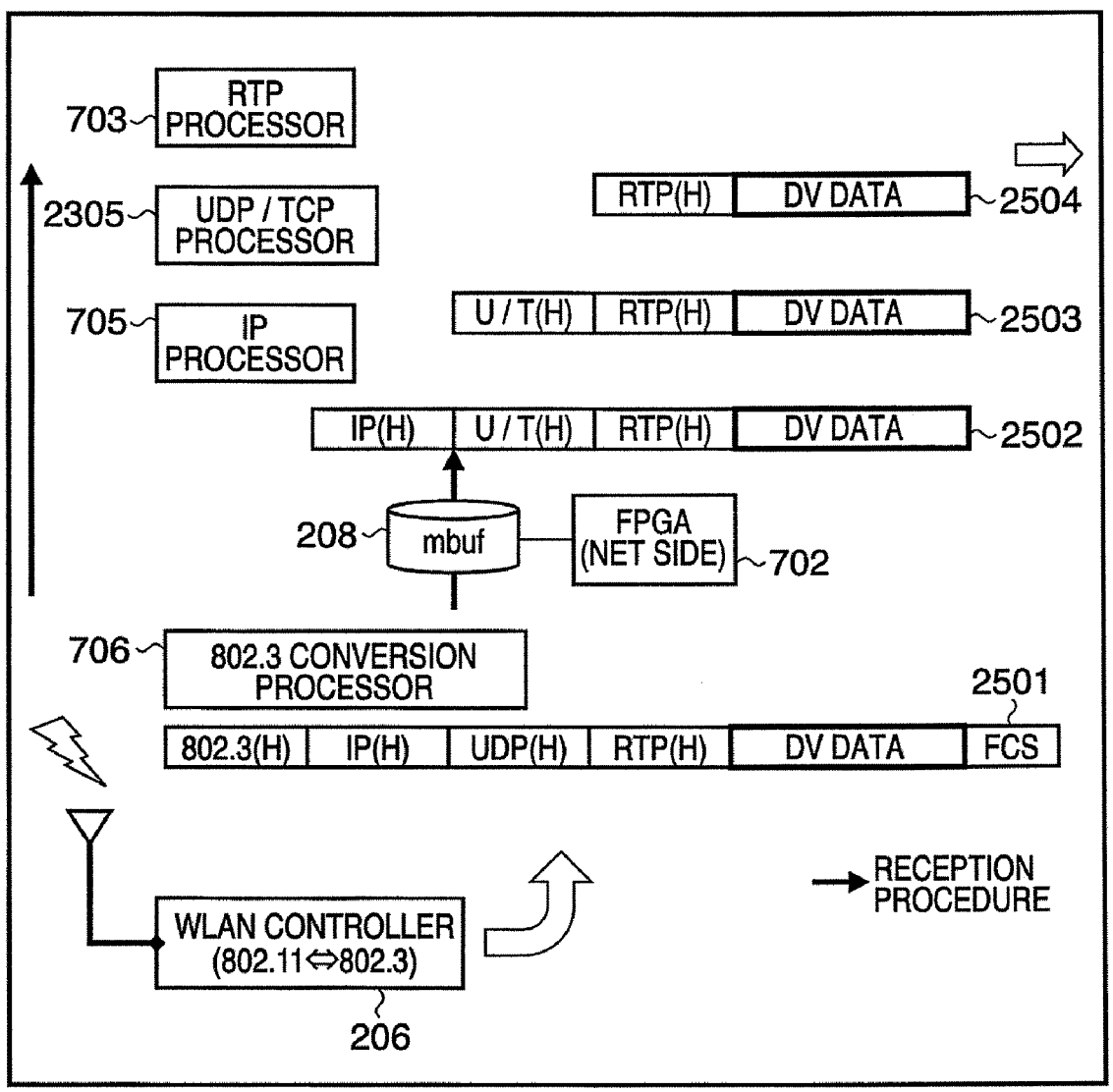
FIG. 25 is a chart showing the processing procedure of a reception frame in an output-side STA 105, connected to the notebook type PC 111.

FIG. 25 is a chart showing the processing procedure of a reception frame in the output-side (connected to the notebook type PC 111) STA 105. This example shows the case wherein the STA 105 supports QoS protocol processing.

Referring to FIG. 25, reference numeral 2501 denotes an IEEE 802.3 reception processing frame which is obtained by converting IEEE 802.11 radio data received from the wireless LAN controller 206 into an 802.3 header by the IEEE 802.3 conversion processor 706. The memory control processing (on the network side) 702 executes write control of the IEEE 802.3 reception processing frame in a reception buffer memory (mbuf) assured on the storage area unit 208. Reference numeral 2502 denotes an IP reception processing frame from which the 802.3 header of the IEEE 802.3 reception processing frame 2501 is removed by the IEEE 802.3 conversion processor 706. Reference numeral 2503 denotes a UDP/TCP reception processing frame from which the IP header of the IP reception processing frame 2502 is removed by the IP processor 705. Reference numeral 2504 denotes an RTP reception processing frame (including moving image data in its payload) from which the UDP header of the UDP/TCP reception processing frame 2503 is removed by the UDP/TCP processor 2305.

Figure 26:
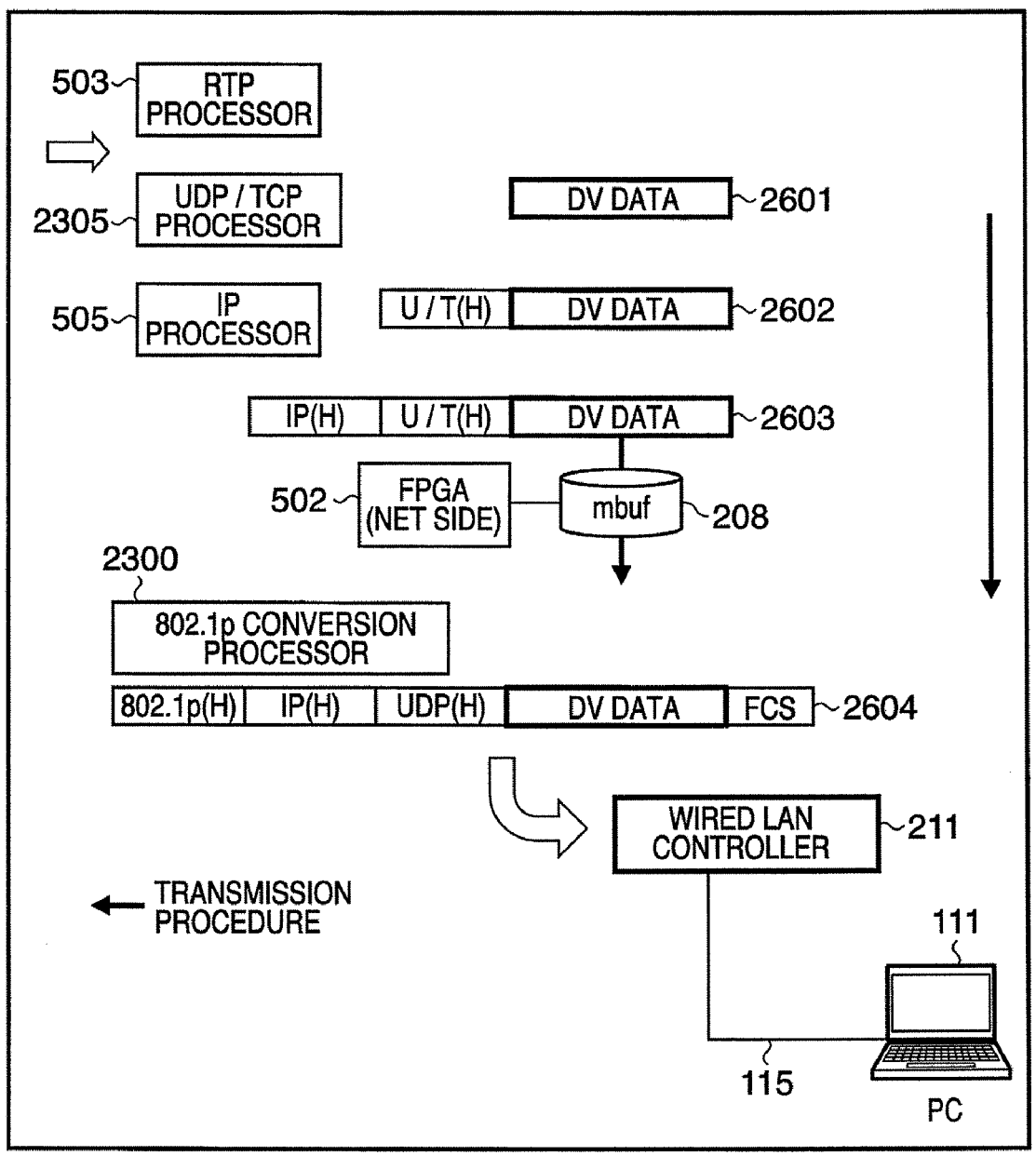
FIG. 26 is a chart showing the processing procedure of a transmission frame in the output-side STA 105, connected to the notebook type PC 111.

FIG. 26 is a chart showing the processing procedure of a transmission frame in the output-side (connected to the notebook type PC 111) STA 105. This example shows the case wherein the notebook type PC 111 does not support QoS protocol processing.

Referring to FIG. 26, the RTP processor 503 detects whether or not the notebook type PC 111 as a device connected at the data transmission destination supports the RTP as the QoS protocol. As a result, if the notebook type PC 111 does not support the RTP, an RTP header as the QoS protocol is removed from a moving image frame 2604 written and stored in the storage area unit 208. Reference numeral 2601 denotes a moving image frame from which the RTP header as the QoS protocol is removed. Reference numeral 2602 denotes a UDP transmission processing frame which is obtained by appending a UDP header to the moving image frame 2601 by the UDP/TCP processor 2305. Reference numeral 2603 denotes an IP transmission processing frame which is obtained by appending an IP header to the UDP transmission processing frame 2602. Reference numeral 2604 denotes an IEEE 802.1p transmission processing frame which is obtained by appending an 802.1p header to the IP transmission processing frame 2603 by the IEEE 802.1p conversion processor 2300.

Figure 27:
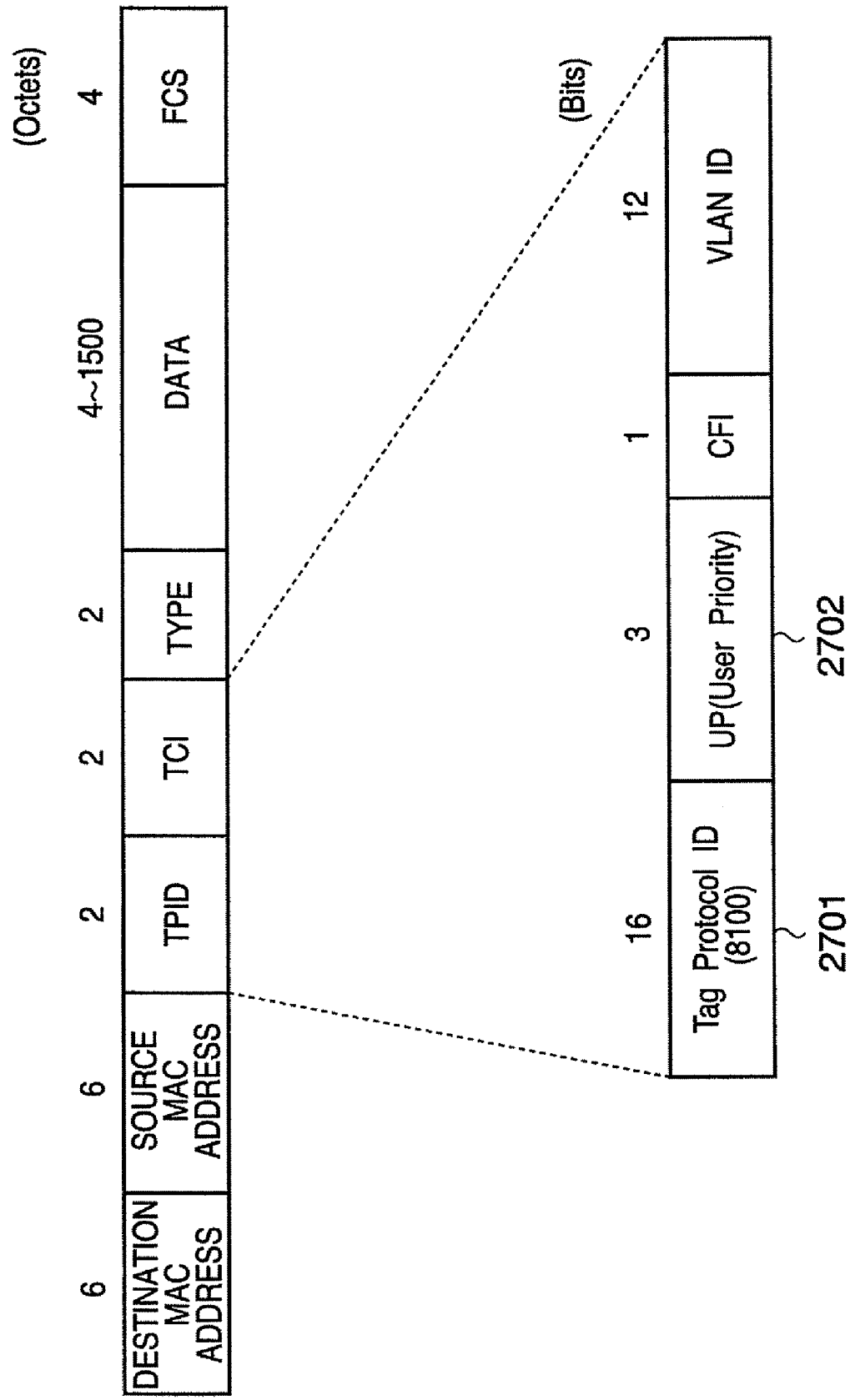
FIG. 27 shows the configuration of an IEEE 802.1Q VLAN tag header transmission frame having a user priority field compliant to IEEE 802.1p.

FIG. 27 shows the configuration of an IEEE 802.1Q VLAN tag header transmission frame (IEEE 802.1p) having a user priority frame compliant to IEEE 802.1p. Referring to FIG. 27, reference numeral 2701 denotes a TPID (TagProtocolID (0x8100)) field used to identify a VLAN tag header frame. Reference numeral 2702 denotes a UP (User Priority) field as priority level information of the frame. The priority is expressed by eight levels (0 to 7).

FIG. 28 shows a management table showing the relationship between the UP and QoS protocol processing. Referring to FIG. 28, a column 2801 stores information indicating support/non-support of RTP/RTCP processing. A column 2802 stores user priority levels compliant to IEEE 802.1p. A column 2803 stores 802.1D symbols corresponding to the user priority levels. A column 2804 stores the names of the symbols in the column 2803.

FIG. 29 shows the configuration of a wireless MAC transmission frame (802.3). Referring to FIG. 29, "destination MAC address" is the MAC address of a destination device, and has a length of 6 bytes. "Source MAC address" is the MAC address of a source device, and has a length of 6 bytes. "Length" indicates the length of a data part which follows. A protocol ID is identifiable when a value larger than 0x5DC (1500) is used. "DSAP" means a Destination SAP. This is a field which is used to identify the protocol of a network layer of the destination and has a length of 1 byte (WLAN: 0xAA). "SSAP" means a Source SAP, and is used to identify the protocol of a network layer of the source. The SSAP field has a length of 1 byte as in the DSAP field. Also, since the destination and source normally use the same protocol, the DSAP and SSAP fields store the same value (WLAN: 0xAA). "Control" is a field used to establish connection and to execute flow control on the data link level. This field also has a size of 1 byte (WLAN: 0x03). "Organization ID" is the same as that of the upper 3 bytes of the MAC address. IEEE assigns organization IDs for respective vendors, and this field has a length of 3 bytes. "Type" is the same as that of the ETH (Ethernet™) Ver2 frame format. Since this field can assure compatibility with ETHver2, and has a length of 2 bytes, it suffices when a unique protocol is created for each vendor (WLAN: 0x0800).

Details of the processing for streaming a moving image from the HDR 108 to the notebook type PC 111 in accordance with the sequence shown in FIG. 22 will be described below.

Figure 30A:
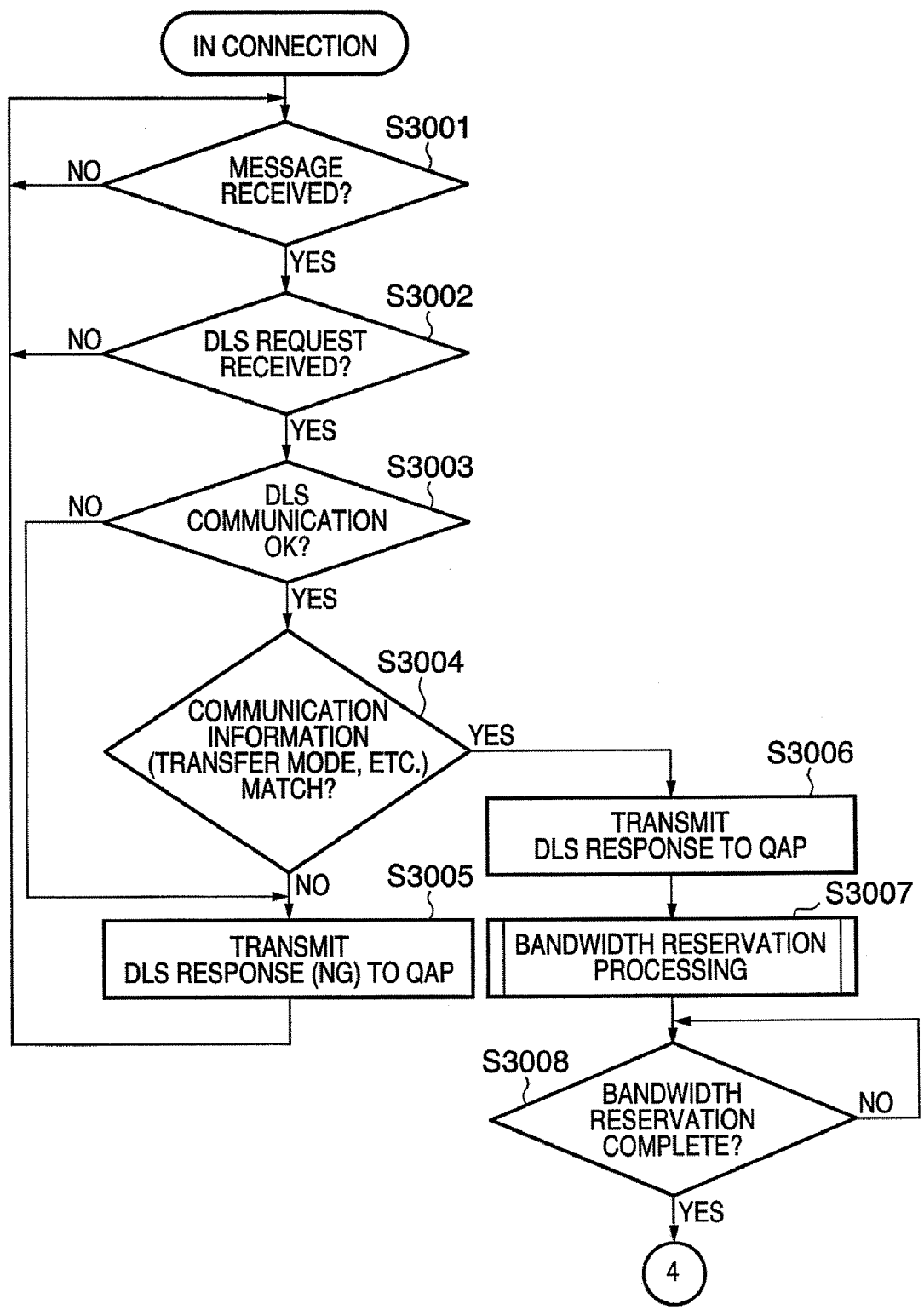
Figure 31:
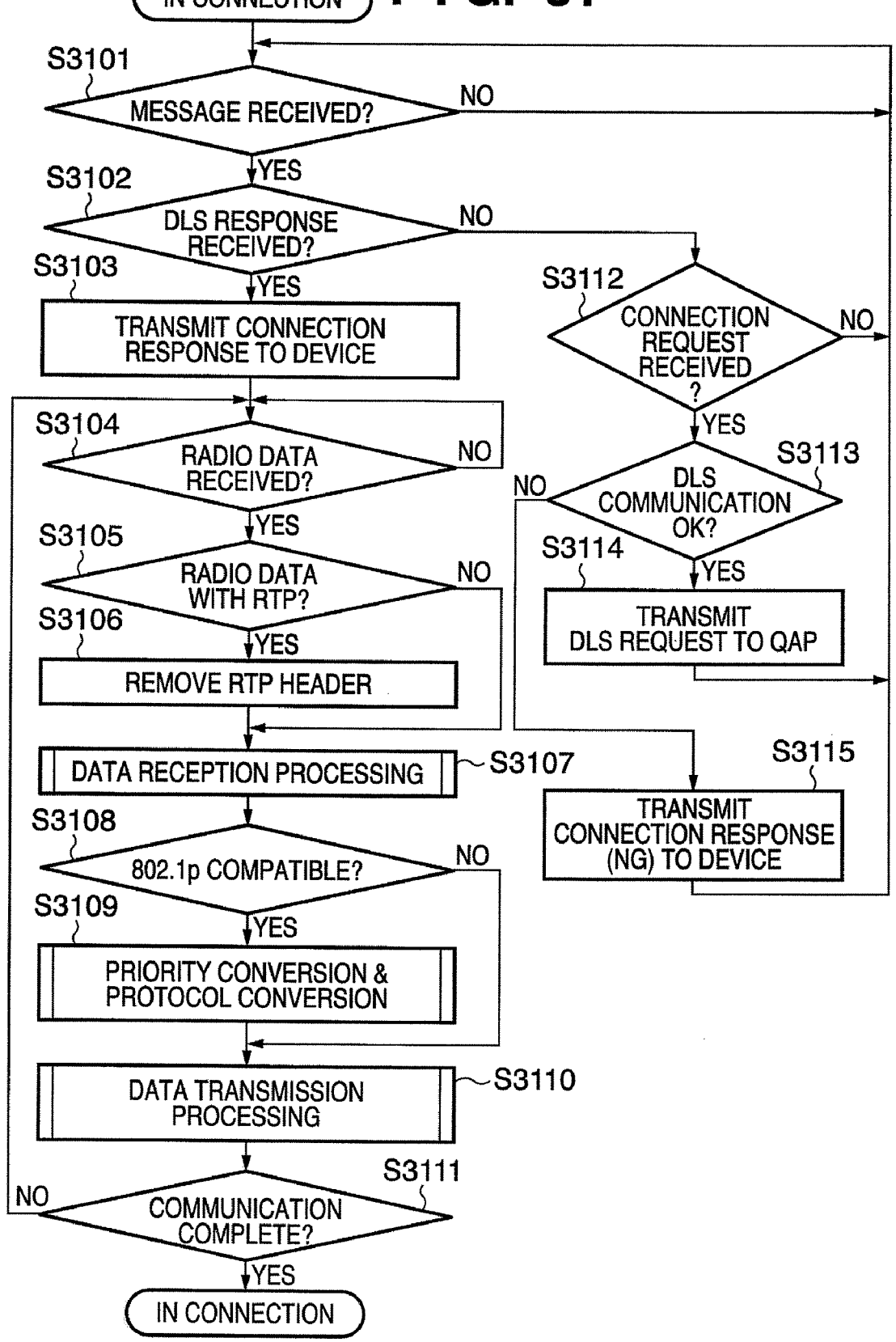
FIG. 31 is a flowchart showing the processing of the receiving STA 105 according to the third embodiment.

FIGS. 30A and 30B are flowcharts showing the processing of the transmitting STA 102 according to the third embodiment. FIG. 31 is a flowchart showing the processing of the receiving STA 105 according to the third embodiment.

Note that the processing to be executed until the STAs 102 and 105 are in communication and the processing of the QAP 106 will be described using FIGS. 9, 10, 13, and 14 used in the first embodiment.

In the sequence shown in FIG. 22, the STA 102 of the transmitting device side executes association processing (M401) with the QAP 106 when it is installed in the service area of the QAP 106 or the power switch of the STA 102 is turned on. Upon completion of the association processing (M401) of the STA 102 in step S1001, the process advances to step S1002. In step S1002, the STA 102 is connected to the HDR 108 using the wired LAN cable 115, and executes ETH connection sequence processing (M2201) associated with the transfer rate and the support state of the RTP as the QoS protocol of the HDR 108.

On the other hand, in the HDR 108 as the transmitting device, the connection operation to the STA 102, power-ON of the device main body, and the like are performed. Upon completion of the ETH connection sequence processing (M2201) with the STA 102 in step S901, the process advances to step S902 to receive, from the STA 102, update information of all the terminals accommodated in the system.

Upon completion of the ETH connection sequence processing (M2201) of the STA 102, the process advances to step S1003 to transmit a type registration message (M406) including information about the connected device as terminal type information to the QAP 106. Note that the information about the connected device includes a device name, interface type "wired LAN", transfer mode "802.1p compatible", and the support state "YES" of the RTP/RTCP protocol. In step S1004, the STA 102 waits for reception of the update information of all the terminals accommodated in the system from the QAP 106.

On the other hand, upon completion of the association processing (M401) with the STA 102 in step S1301, the process advances to step S1302, and the QAP 106 waits for reception of the type registration message (M406) including information about the HDR 108. Upon reception of the type registration message (M406) from the STA 102, the process advances to step S1303, and the QAP 106 stores the terminal type information in the form of, e.g., a device management table in the memory. The QAP 106 then checks in step S1304 if update information is included. If it is determined that a new STA is registered by the association processing, or if it is determined that the information of the type registration message from the STA of interest has changed due to connection of a device different from the previous device, the process advances to step S1305. In step S1305, the QAP 106 transmits a type information message (M409) including, e.g., device information of the device management table as the latest information to the STA 102, thus making transition to an in-connection state.

On the other hand, if the STA 102 receives the type information message (M409) from the QAP 106, the process advances to step S1005, and the STA 101 stores the received message in the form of, e.g., the device management table in the storage area unit 208. In step S1006, the STA 101 transmits a system terminal information message (M410) to the HDR 108, thus making transition to an in-connection state.

Upon reception of the system terminal message (M410) from the STA 102, the process advances to step S903, and the HDR 108 stores the information about a connected device that allows communications in the form of the device management table. The HDR 108 displays the device accommodation states, performances, and conditions of the devices in the system on an LCD or the like. The process then advances to step S904, and the HDR 108 enters an in-connection state. The information about the connected device includes a device name, interface type "wired LAN", transfer mode "802.1p compatible", and the support state "YES" of the RTP/RTCP protocol.

Note that the same processing as that on the aforementioned transmitting side is done among the notebook type PC 111 as the receiving device, the receiving STA 105, and QAP 106. Different processes between the HDR 108 on the transmitting side and the notebook type PC 111 on the receiving side will be explained below.

In step S903, the HDR 108 displays the accommodation state, performance, and status of the devices in the system. Alternatively, the notebook type PC 111 comprises a liquid crystal display. Therefore, the notebook type PC 111 adopts, for example, icons and the like, and visually recognizably displays the accommodation states, performances, and conditions of devices, which are accommodated in the system and with which data can be exchanged, on a part of the liquid crystal display or by switching a dedicated window using its application software.

In FIG. 22, upon selection of the icon of the HDR 108 on the screen of the notebook type PC 111, the process advances to step S905, and the notebook type PC 111 transmits a connection request message (M2205) including information that specifies the HDR 108 to the STA 105 via the wired LAN cable 115.

On the other hand, if the STA 105 in a message reception waiting state receives the message from the notebook type PC 111 in step S3101, the process advances to step S3102. If the received message is a connection request message (M2205), the process advances to step S3113 to check if a direct communication can be made with another STA under the direct link service control of the QAP 106. As a result, if a direct communication cannot be made, the process jumps to step S3115, and the STA 105 transmits a connection response message including information indicating that a communication cannot be made to the notebook type PC 111.

On the other hand, if a direct communication can be made, the process advances to step S3114, and the STA 105 transmits a direct link service setup request (DLS request) message (M412) to the QAP 106. The process then returns to step S3101.

On the other hand, if the QAP 106 receives a message from the STA 105 in step S1401, the process advances to step S1402, and the QAP 106 checks if the received message is the DLS request message (M412). If YES in step S1402, the process advances to step S1403 to check if a direct communication can be made with another STA under the direct link service control of the QAP 106. If a direct communication cannot be made, the process jumps to step S1405. In step S1405, the QAP 106 transmits a DLS response message (M415) including information indicating that a communication cannot be made to the STA 105, and the process returns to step S1401.

If it is determined in step S1403 that a direct communication can be made, the process advances to step S1404, and the QAP 106 transmits a DLS request message (M413) to the STA 102. The process then returns to step S1401.

If the STA 102 in the in-connection state receives a message from the QAP 106 in step S3001, the process advances to step S3002 to check if the received message is a DLS connection request message (M413). If YES in step S3002, the process advances to step S3003 to check if a direct communication can be made with another STA under the direct link service control of the QAP 106. If a direct communication cannot be made, the process jumps to step S3005. In step S3005, the QAP 106 transmits a DLS response message (M414) including information indicating that a communication cannot be made, and the process returns to step S3001.

If it is determined in step S3003 that a direct communication can be made, the process advances to step S3004 to check if a match of the communication information (transfer mode, etc.) is detected. This checking processing is implemented based on the identification information of the STA 105 as the connection request source (receiving device side) included in the DLS connection request message (M413) as in the first embodiment. That is, the transfer mode is checked based on the transfer mode correspondence table, and consistency of the QoS support states is verified based on the device management table, as in the first embodiment.

If it is determined that a communication of a moving image stream cannot be made, the process jumps to step S3005, and the STA 102 transmits a DLS response message (M414) including information indicating that a communication cannot be made to the QAP 106. The process then returns to step S3001.

If it is determined in step S3004 that a communication of a moving image stream can be made, the process advances to step S3006 to transmit a DLS response message (M414) including information indicating that a communication can be made to the QAP 106. In step S3007, the STA 102 launches a bandwidth reservation sequence (M2207) specified by IEEE 802.11e together with the QAP 106. After that, upon completion of the bandwidth reservation sequence (M2207) in step S3008, the process advances to step S3009, and the STA 102 transmits a connection request message (M2208) to the HDR 108.

If the STA 102 receives a connection response message (M2209) to the connection request message (M2208) from the HDR 108 in step S3010, the process advances to step S3011, and the STA 102 enters a data reception waiting state.

On the other hand, if the QAP 106 receives the DLS response message (M414) from the STA 102, the process advances to step S1407. In step S1407, the QAP 106 transmits a DLS response message (M415) including information indicating that a communication can be made to the STA 105, and the process returns to step S1401. As a result, if the STA 105 receives the DLS response message (M415), the process advances to step S3103, and the STA 105 transmits a connection response message (M2206) as a response to the connection request message (M42205) to the notebook type PC 111. The process then advances to step S3104 to make transition to a data reception waiting state.

If the notebook type PC 111 as the receiving device (selecting side) receives the connection response message (M2206) in step S906, the process advances to step S910. The notebook type PC 111 checks if the HDR 108 is an input or output device. Since the HDR 108 is an output device, the process advances to step S911 to confirm the RTP/RTCP protocol support function implemented in the notebook type PC 111. In this case, since the RTP/RTCP protocol is not supported, the process jumps to step S913 to execute normal data reception processing (the device 111 does not support RTP header processing: the STA 105 executes RTP processing).

If the HDR 108 receives the connection request message (M2208) from the STA 102 in step S907, the process advances to step S908 to transmit a connection response message (M2209) to the STA 102. Upon completion of connection to the STA 102 in step S909, the process advances to step S910 to check if the notebook type PC 111 is an input or output device. In this case, since the notebook type PC 111 is an input device, the process advances to step S914 to confirm the RTP/RTCP protocol support function. Since the RTP/RTCP protocol is not supported, the process jumps to step S916. In step S916, the HDR 108 executes normal data transmission processing. In this case, the HDR 108 does not support RTP header processing, and the STA 102 executes RTP processing.

The control processing executed when the HDR 108 as the transmitting device (selected side) and the notebook type PC 111 as the receiving device (selecting side) respectively make transition from the in-connection state to the data communication state has been described.

The QoS protocol control processing and a moving image stream communication in the data exchange state between the STA 102 to which the HDR 108 is connected and the STA 105 to which the notebook type PC 111 is connected will be described below.

If the STA 102 in the data reception waiting state receives digital moving image data (M2210, M2213) by the data transmission processing of the HDR 108 in step S3011, the process advances to step S3012. In step S3012, the STA 102 analyzes the header of data packets received from the HDR 108 to confirm the value of the user priority field 2702 in step S3013. At this time, if the value of the user priority field 2702 is "5" (stream-based data such as video data) or "6" (audio-based data such as audio data, telephone data, or the like) shown in the QoS correspondence management table for respective user priority levels, the process advances to step S3014. In step S3014, the STA 102 sets control processing so as to launch the RTP protocol header appending processing upon subsequent execution of the transmission processing of communication data (M2210). In step S3015, the STA 102 executes data transmission processing. In this case, the STA 102 executes RTP processing.

If the value of the user priority field 2702 is other than stream-based or audio-based data in step S3012, i.e., one of values "1" to "4" shown in the QoS correspondence management table for respective user priority levels, the process jumps to step S3015. In step S3015, the STA 102 executes data transmission processing using the TCP/UDP without using the RTP.

The STA 102 confirms in step S3016 if a communication is complete. Upon completion of the communication, the STA 102 enters an in-connection state. If the communication continues, the process returns to step S3001 to repeat the aforementioned processes.

The reception processing of the STA 105 which receives radio data (M2211, M2214) to be transmitted from the STA 102 to the STA 105 will be described below.

If the STA 105 receives radio data (M2211, M2214) transmitted from the STA 102 in step S3104, the process advances to step S3105 to analyze data. If RTP/RTCP protocol header information is not appended, the process jumps to step S3107 to execute data transmission processing using the TCP/UDP without using the RTP. If RTP/RTCP protocol header information is appended, the process advances to step S3106 to set in data reception processing (step S3107) to execute RTP protocol header removal processing. In step S3107, the STA 105 executes data reception processing from the STA 102.

In step S3108, the STA 105 checks the transfer mode of the device information about the notebook type PC 111 with reference to the device management table. If the transfer mode is "802.1p compatible", the process advances to step S3109. In step S3109, the STA 105 analyzes an RTP payload of data received from the HDR 108 to execute priority conversion and protocol conversion. For example, the STA 105 performs protocol conversion of the value indicated by the QoS correspondence management table for respective user priority levels such as "5" for stream-based data (e.g., video data) or "6" for audio-based data (e.g., audio data, telephone data). Then, the STA 105 encodes the converted value as the value of the user priority field 2702 in the header field of an IEEE 802.1p data frame (see FIG. 27).

On the other hand, if the transfer mode is not "802.1p compatible" in step S3108, the process jumps to step S3110 to execute data transmission processing to the notebook type PC 111. In this case, the STA 105 transmits protocol-converted data to the notebook type PC 111. The STA 105 confirms in step S3111 if a communication is complete. Upon completion of the communication, the STA 105 enters an in-connection state. If the communication continues, the process returns to step S3104 to repeat the aforementioned data reception processing sequence.

As described above, when the STAs 102 and 105 analyze the priority levels for data packets exchanged between the HDR 108 and notebook type PC 111, effective QoS-related protocol appending processing to the data packets can be executed. Therefore, appropriate QoS-related protocol processing especially for input/output data that requires real-timeness can be provided.

Fourth Embodiment

The fourth embodiment of the present invention will be described in detail hereinafter with reference to the accompanying drawings. In the fourth embodiment, the transmitting STA selects a QoS protocol in accordance with an application type requested from the receiving STA and executes data transmission based on the selected QoS protocol.

FIG. 32 shows the configuration of a correspondence table between the application types and QoS protocol processing according to the fourth embodiment. In the application type management table shown in FIG. 32, reference numeral 3201 denotes an application type entry number (ID). Reference numeral 3202 denotes an application type. Reference numeral 3203 denotes protocol processing upon launching (to use the RTP/RTCP) or canceling (to use the TCP) of the QoS-related protocol.

The fourth embodiment will explain a case wherein the HDR 108 issues a file transfer request to the notebook type PC 111 in addition to the direct streaming request of a video described in the third embodiment.

Figure 33A:
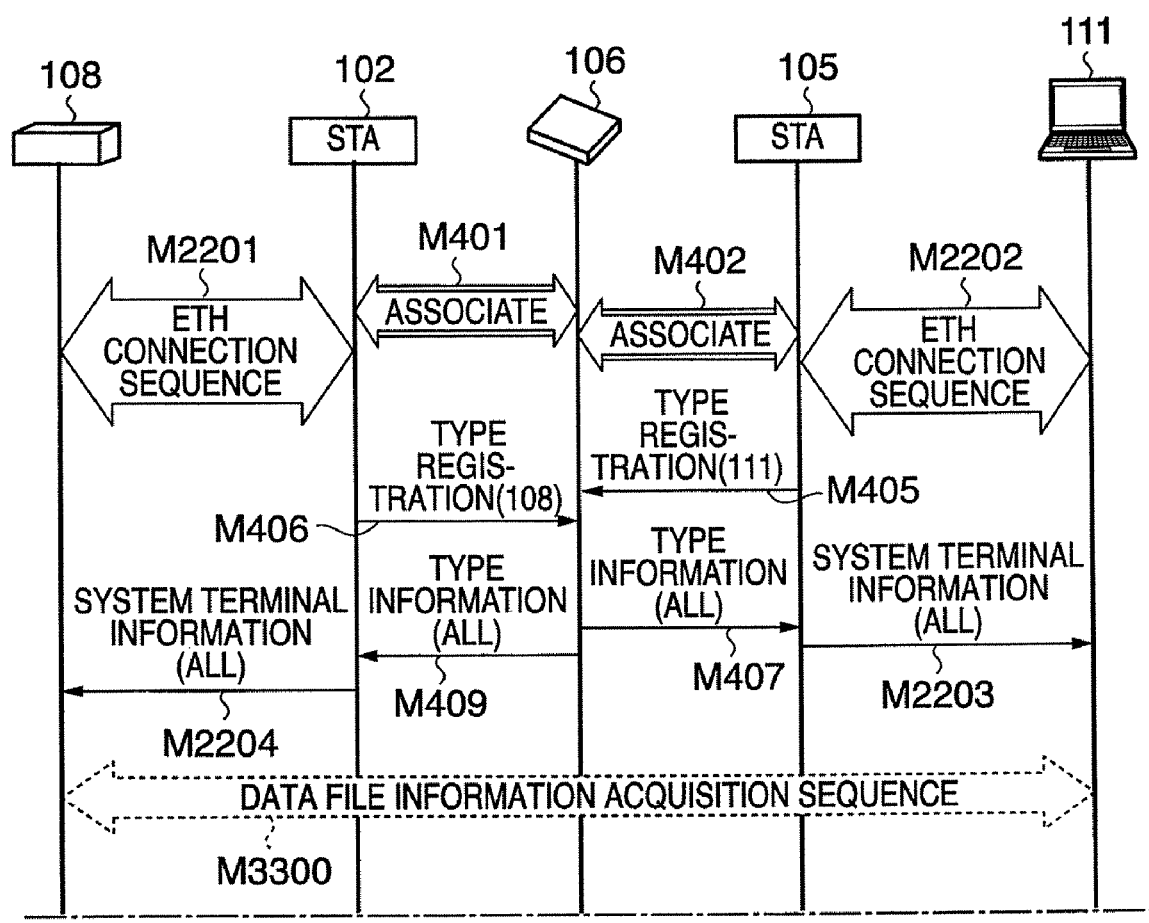
FIGS. 33A and 33B are charts showing the sequence of messages according to the fourth embodiment.
Figure 33B:
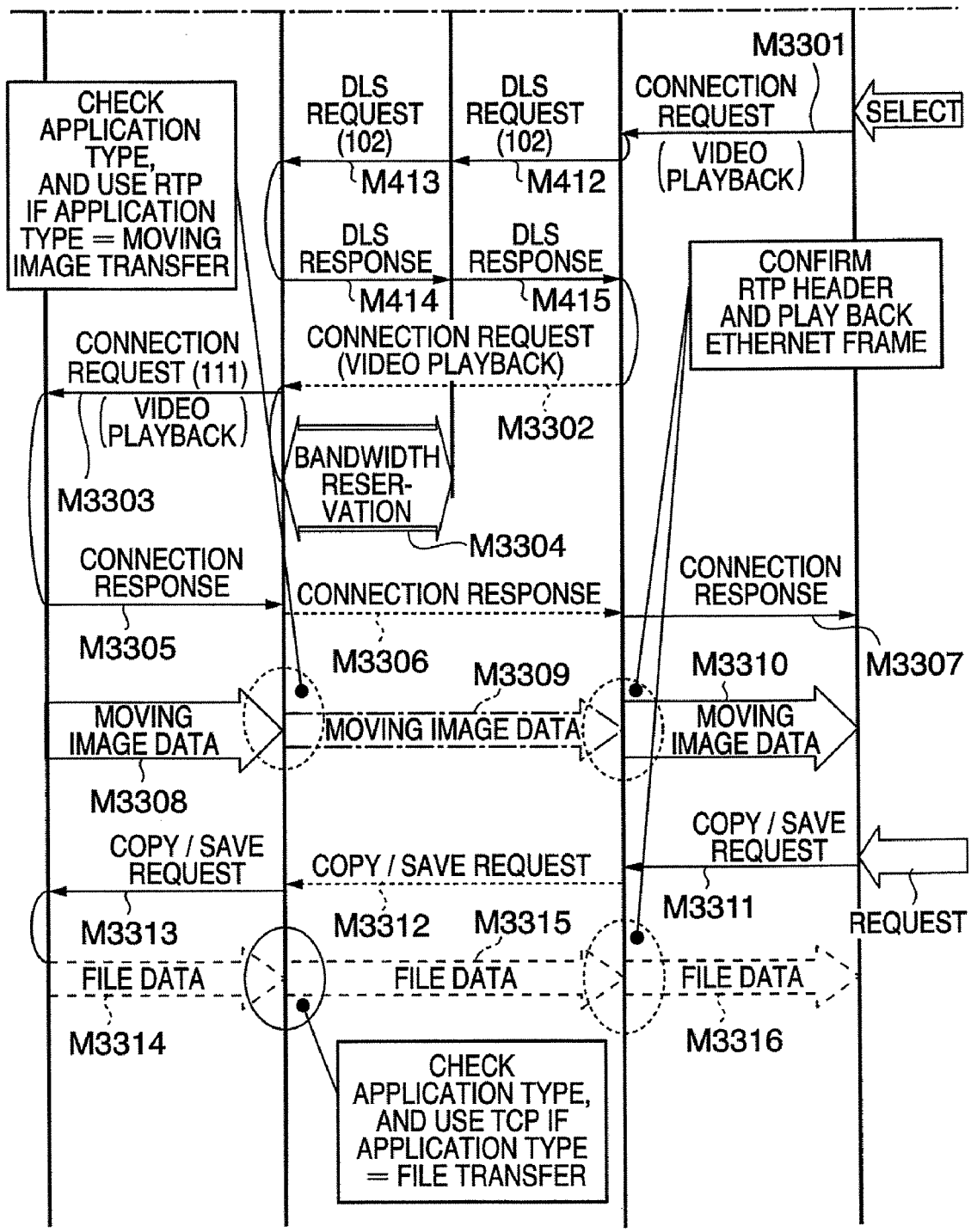

FIGS. 33A and 33B are charts showing the sequence of messages according to the fourth embodiment. The sequence shown in FIGS. 33A and 33B specifies principal messages associated with the fourth embodiment, and some messages are omitted.

Figure 34:
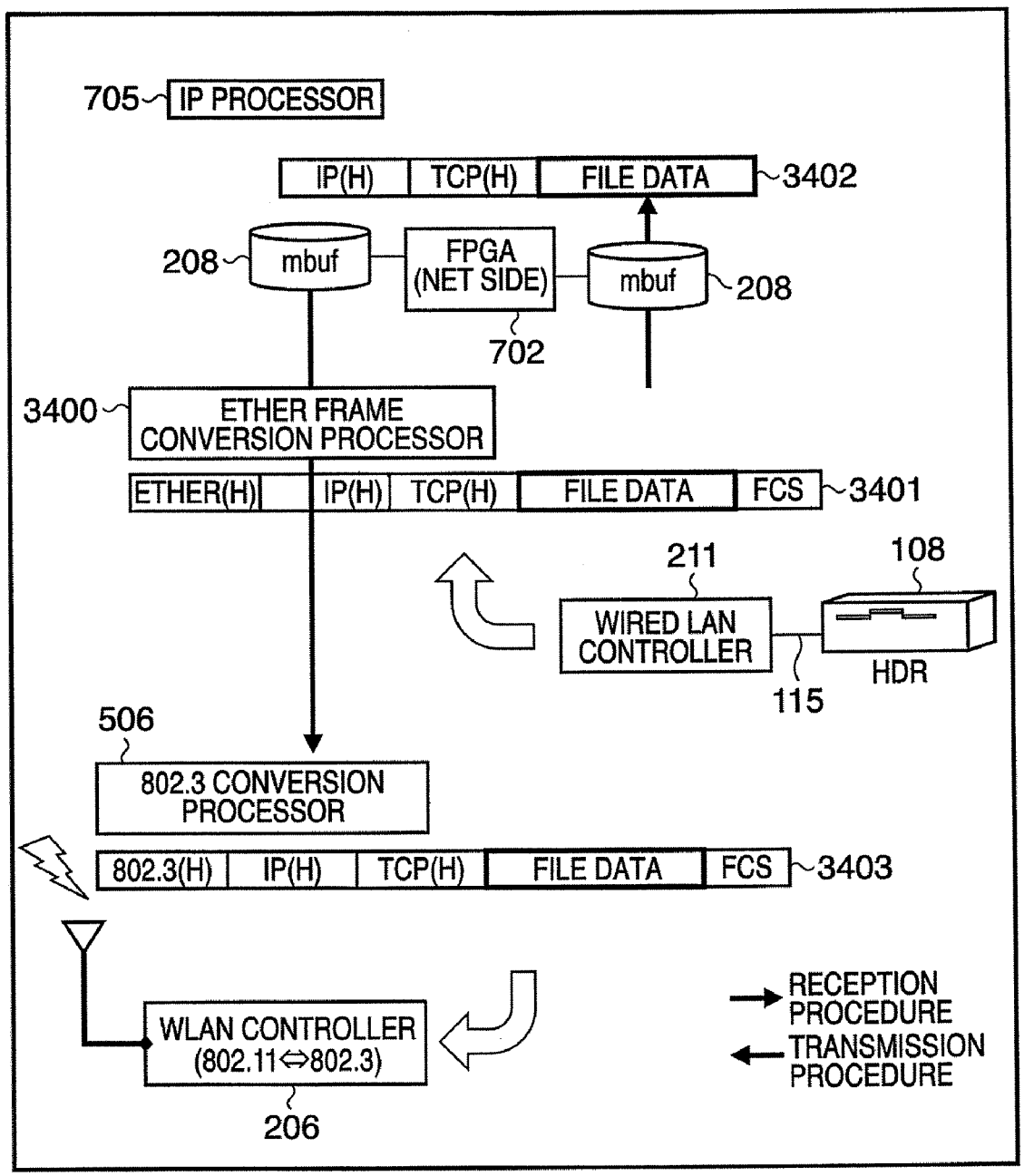
FIG. 34 is a chart showing the processing procedure of a transmission/reception frame in the input-side STA 102, connected to the HDR 108.

FIG. 34 is a chart showing the processing procedure of a transmission/reception frame in the input-side (connected to the HDR 108) STA 102. FIG. 34 shows a case wherein the STA 102 transfers image file data.

Referring to FIG. 34, reference numeral 3400 denotes an Ether frame header conversion processor, which processes data packets received from the wired LAN interface. Reference numeral 3401 denotes an ETH reception processing frame received from the wired LAN controller 211. Reference numeral 3402 denotes an IP transmission/reception processing frame from which an ETH header of the ETH reception processing frame 3401 stored in a reception buffer memory (mbuf) is removed by the Ether frame header conversion processor 3400. Reference numeral 3403 denotes an IEEE 802.3 transmission processing frame which is obtained by appending an 802.3 header to the IP transmission/reception processing frame 3402 by the IEEE 802.3 conversion processor 506.

Figure 35:
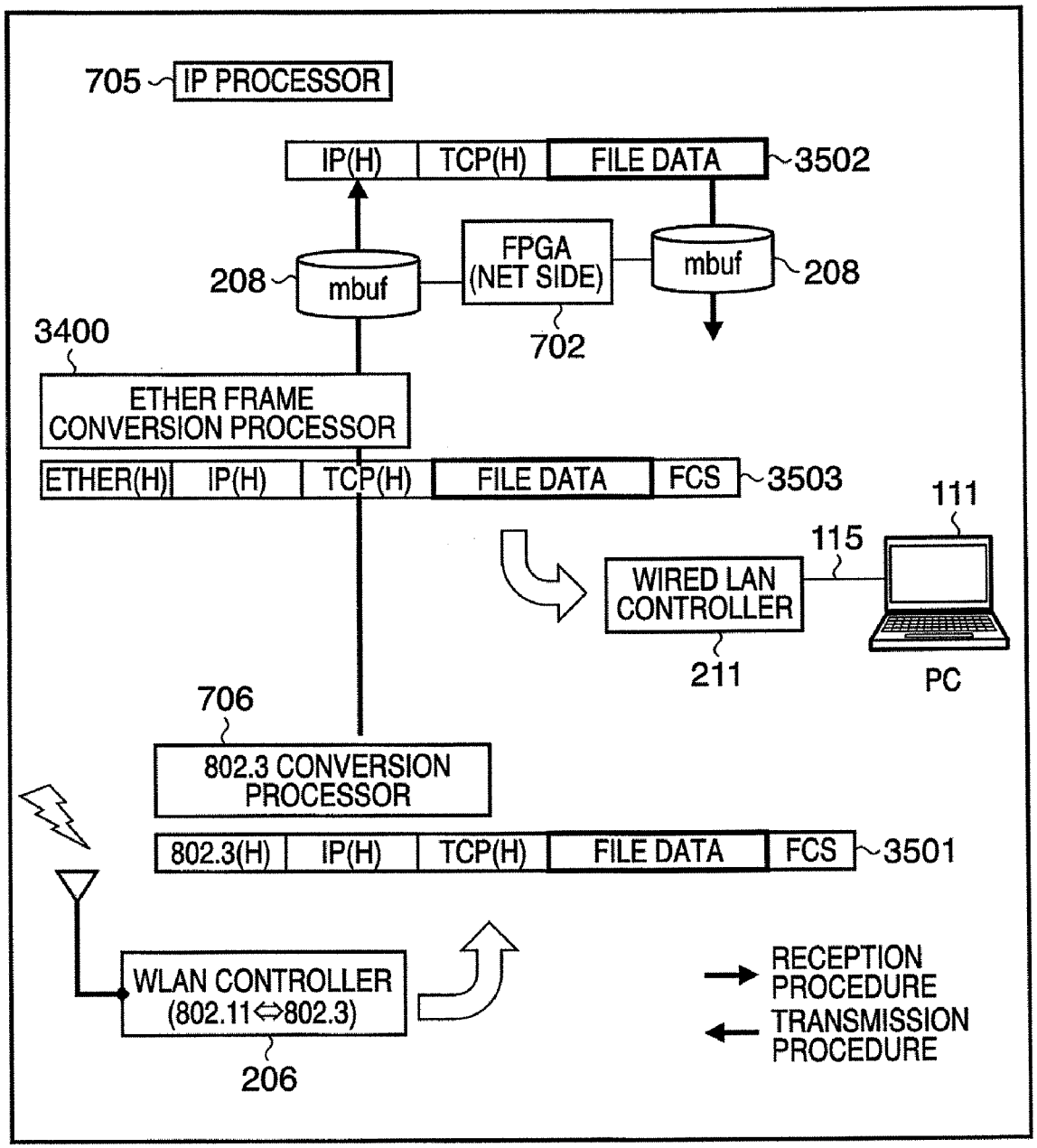
FIG. 35 is a chart showing the processing procedure of a reception frame in the output-side STA 105, connected to notebook type PC 111.

FIG. 35 is a chart showing the processing procedure of a reception frame in the output-side (connected to the notebook type PC 111) STA 105. FIG. 35 shows a case wherein the STA 105 transfers file data.

Referring to FIG. 35, reference numeral 3501 denotes an IEEE 802.3 reception processing frame, which is obtained by converting IEEE 802.11 radio data received from the wireless LAN controller 206 into an 802.3 header by the IEEE 802.3 conversion processor 706. The memory control processing (on the network side) 702 executes write control of the IEEE 802.3 reception processing frame in the reception buffer memory (mbuf) assured on the storage area unit 208. Reference numeral 3502 denotes an IP transmission/reception frame from which the 802.3 header of the IEEE 802.3 reception processing frame 3501 stored in the reception buffer memory (mbuf) is removed by the IEEE 802.3 conversion processor 706. Reference numeral 3503 denotes an ETH transmission processing frame which is obtained by appending an ETH header to the IP transmission processing frame 3501 by the Ether frame header conversion processor 3400.

Details of the processing for executing data transmission using the RTP when the application type is a moving image or using the TCP when it is file transfer in accordance with the sequence shown in FIGS. 33A and 33B will be described below.

Figure 36A:
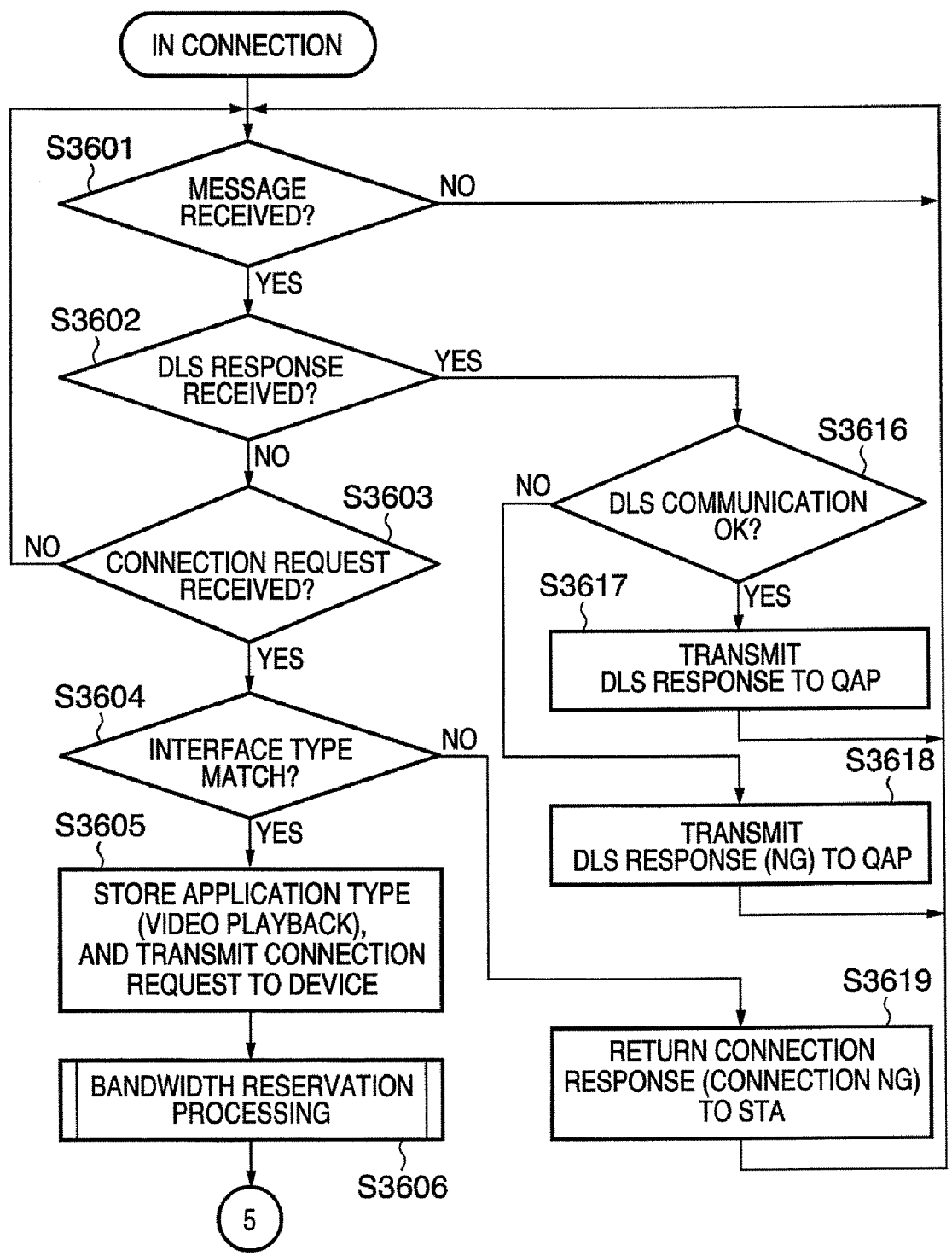
FIGS. 36A and 36B are flowcharts showing the processing of the transmitting STA 102 according to the fourth embodiment.
Figure 36B:
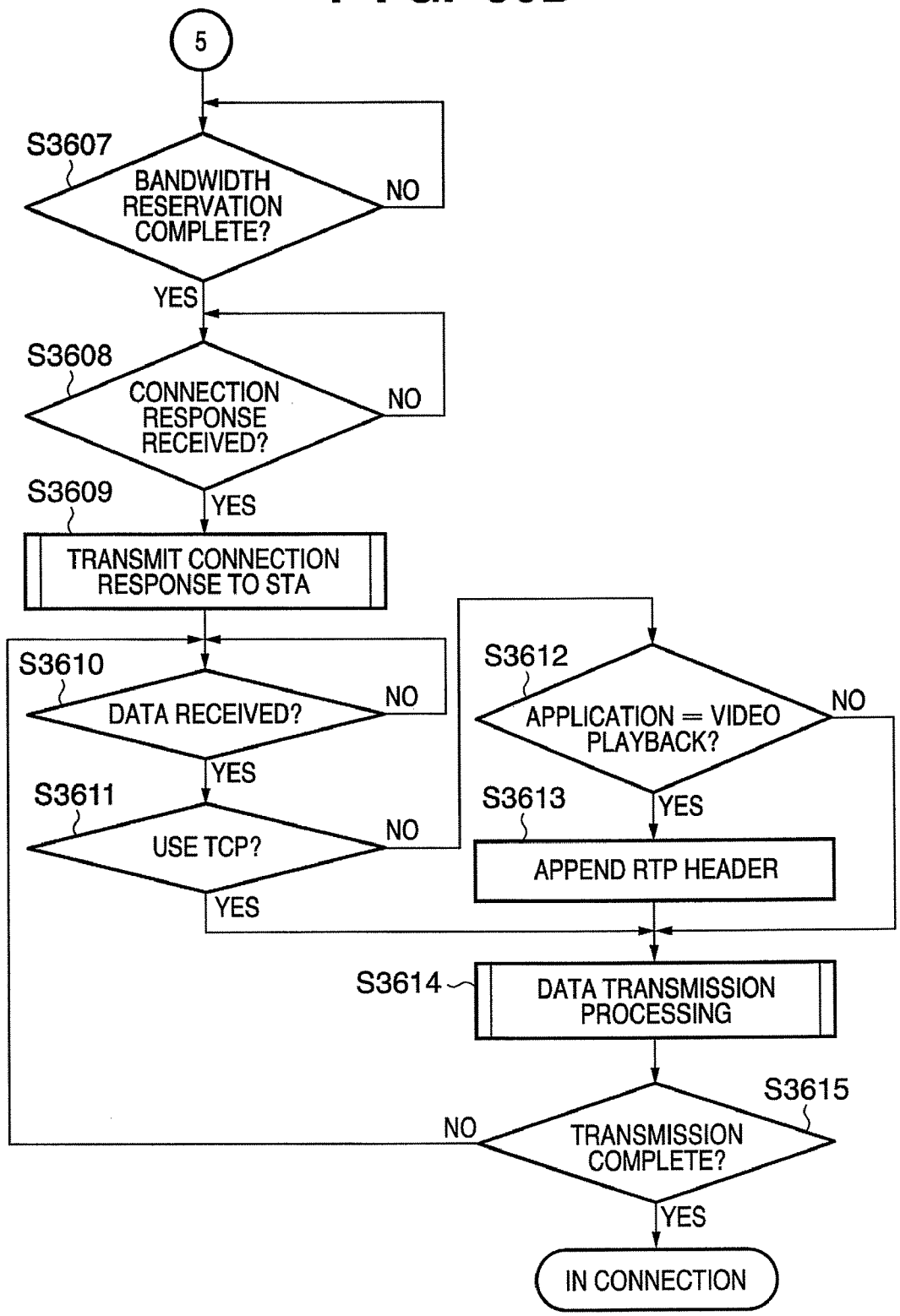
Figure 37A:
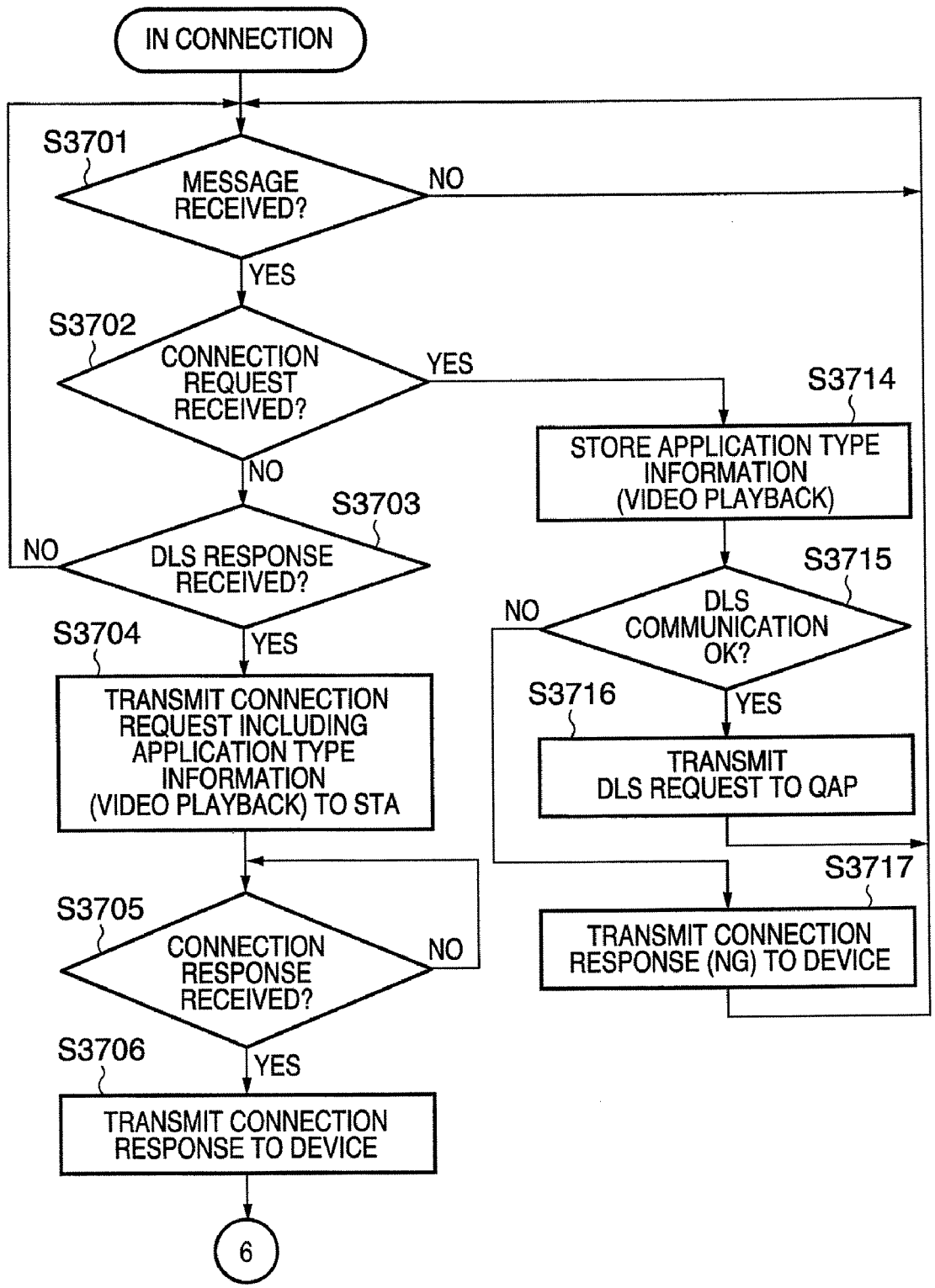
FIGS. 37A and 37B are flowcharts showing the processing of the receiving STA 105 according to the fourth embodiment.
Figure 37B:
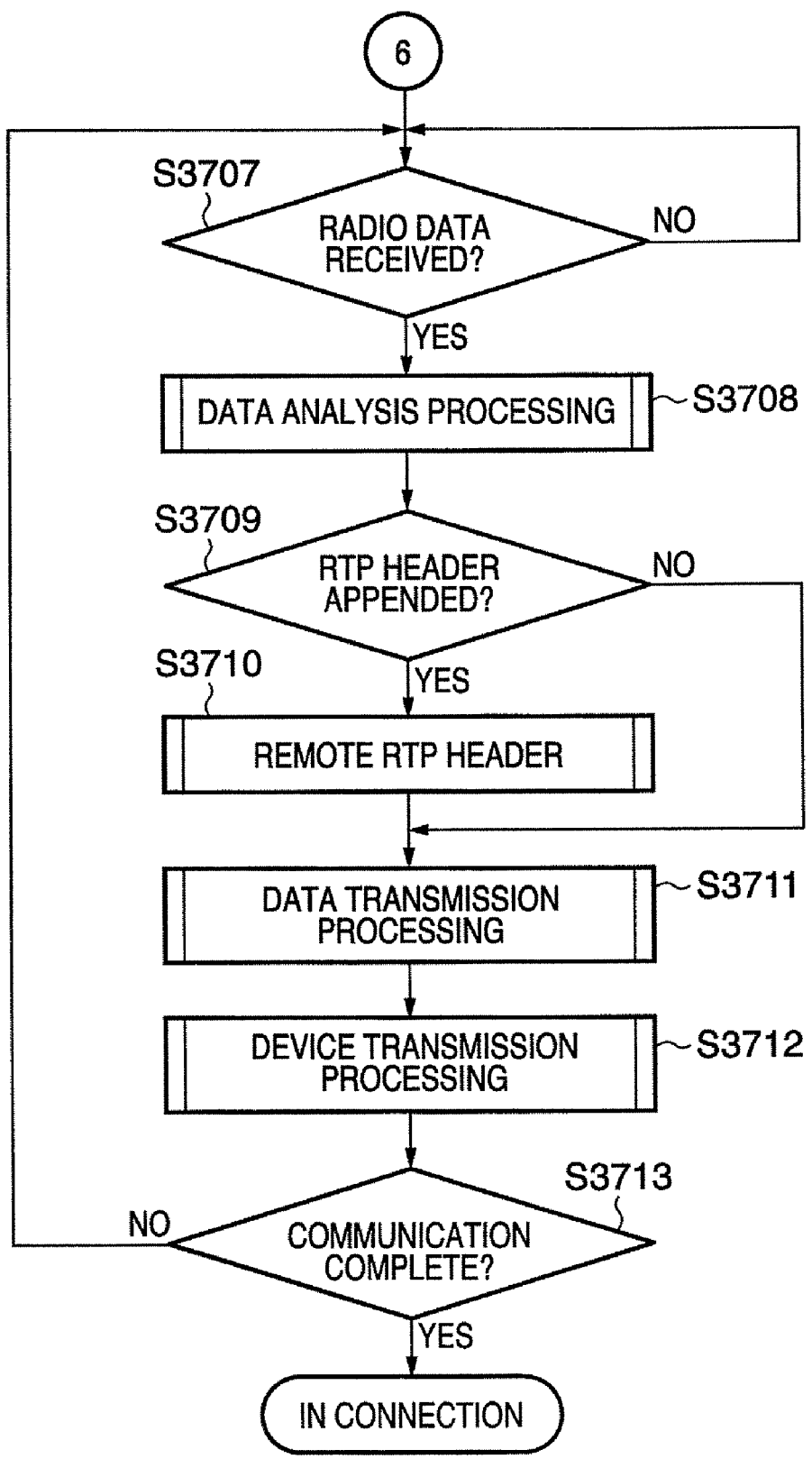

FIGS. 36A and 36B are flowcharts showing the processing of the transmitting STA 102 according to the fourth embodiment. FIGS. 37A and 37B are flowcharts showing the processing of the receiving STA 105 according to the fourth embodiment.

In FIGS. 33A and 33B, a series of messages (M401 to M409, M2201 to M2203) and control processing related to message exchange are the same as those in the third embodiment (FIG. 22), and a description thereof will be omitted.

The notebook type PC 111 is connected to the HDR 108 on the IP network. Upon accessing internal data of the HDR 108, for example, a WEB viewer application on the notebook type PC 111 is used. Also, an HTTP server function which is running inside the HDR 108 is used. The user can select internal data of the HDR 108 in a menu format, and can make copy and save operations for the purpose of confirmation and playback of recorded programs and backup of recorded data. In this way, a list of data files stored in the HDR 108 can be referred to (corresponding to a data file acquisition sequence (M3300)) on the screen of the notebook type PC 111 as the receiving device.

At this time, services to be executed for moving image files stored in the HDR 108 include, for example, "video playback", "copy/save", and the like, as shown in FIG. 32. In case of the "video playback" service, entry number 4 of the application type management table shown in FIG. 32 is selected. That is, in this case, "video stream" is used as the application 3202, and "RTP/RTCP" is used as the protocol processing. In case of the "copy/save" service, entry number 3 is selected, "file transfer" is used as the application 3202, and "TCP" is used as the protocol processing.

When the user refers to a list of playback files stored in the HDR 108 on the screen of the notebook type PC 111 by the data file acquisition sequence (M3300), and selects "video playback" as a service for a desired video file, the process advances to step S905. In step S905, the notebook type PC 111 transmits a connection request message (M3301) including information used to specify the HDR 108 and application type information "stream data" to the STA 105 via the wired LAN cable 115.

If the STA 105 receives a message from the notebook type PC 111 in step S3701 and that message is the connection request message (M3301), the process advances to step S3714. In step S3714, the STA 105 stores the application type "stream data", which is included in the connection request message (M3301) and is designated by the notebook type PC 111, in the storage area unit 208. The STA 105 checks in step S3715 if a direct communication can be made with another STA under the direct link service control of the QAP 106. As a result, if a direct communication cannot be made, the process jumps to step S3717. In step S3717, the STA 105 transmits a connection response message (M3307) including information indicating that a communication cannot be made to the notebook type PC 111, and the process returns to step S3701. On the other hand, if a direct communication can be made, the process advances to step S3716, and the STA 105 transmits a direct link service setup request (DLS request) message (M412) to the QAP 106. The process then returns to step S3701.

The processes of the QAP 106 from when the QAP 106 receives this message (M412) until it transmits the message (M415) are the same as those in the third embodiment, and a description thereof will be omitted.

If the STA 105 receives a message from the QAP 106 in step S3701 and that message is the DLS response message (M415), the process advances to step S3704. In step S3704, the STA 105 transmits a connection request message (M3302) including the application type "stream data" stored in the storage area unit 208 to the STA 102. In step S3705, the STA 105 enters a waiting state of a response message to that connection request message (M3302).

If the STA 102 receives the connection request message (M3302) from the STA 105 in step S3601, the process advances to step S3604. The STA 102 checks in step S3604 based on the device management information in the device management table if the interface types match. If the interface types are different, the process advances to step S3619 to transmit a connection response message including information indicating that a communication cannot be made to the STA 105. The process then returns to step S3601. Also, consistency is verified, and if both the transmitting and receiving devices have the same interface type, the process advances to step S3605.

In step S3605, the STA 102 stores the application type "stream data" included in the connection request message (M3302) in the storage area unit 208, and transmits a connection request message (M3303) including application type information "stream data" to the HDR 108. In step S3606, the STA 102 executes bandwidth reservation processing (M3304) specified by IEEE 802.11e together with the QAP 106. Upon completion of the bandwidth reservation processing (M3304) in step S3607, the process advances to step S3608, and the STA 102 enters a reception confirmation waiting state of a connection response message (M3305) from the HDR 108.

Note that the processing of the HDR 108 is the same as the third embodiment, and a description thereof will be omitted. If the STA 102 receives the connection response message (M3305) from the HDR 108 in step S3608, the process advances to step S3609 to transmit a connection response message (M3306) to the STA 105. In step S3610, the STA 102 enters a data reception waiting state from the HDR 108.

If the STA 105 receives the connection response message (M3306) from the STA 102 in step S3705, the process advances to step S3706. In step S3706, the STA 105 transmits a connection response message (M3307) as a response to the connection request message (M3301) to the notebook type PC 111. The STA 105 then makes transition to a data reception waiting state from the STA 102. Note that the processing of the notebook type PC 111 is the same as the third embodiment, and a description thereof will be omitted.

If the STA 102 in the data reception waiting state receives digital video data (M3308) from the HDR 108 in step S3610, the process advances to step S3611 to confirm the application type stored in the storage area unit 208. If the application type is "stream data", since the RTP is used as a communication protocol, the process advances from "YES" in step S3612 to step S3613. In step S3613, the STA 102 sets control processing so as to launch RTP protocol header appending processing at the time of subsequent execution of transmission processing of moving image data (M3309) to be transmitted to the STA 105. In step S3614, the STA 102 executes data transmission processing. Also, when a monitoring system of a monitor camera or the like indicated by entry number "7" uses the UDP as a communication protocol, the application type is "monitoring" and the RTP is used. However, in this case, the process jumps from step S3612 to step S3614 to execute data transmission processing while skipping the launch control of the RTP protocol header appending processing. The STA 102 confirms in step S3615 if a communication is complete. Upon completion of the communication, the STA 102 enters an in-connection state. If the communication continues, the process returns to step S3610 to repeat the data transmission processing.

On the other hand, the processing of the STA 105 which receives the moving image data (M3309) from the STA 102 is the same as the third embodiment, and a description thereof will be omitted.

Processing for application type information "file transfer" upon selection of "copy/save" for a service of a moving image file will be described below.

The user stops playback of moving image data (M3310) on the notebook type PC 111, and refers to a list of playback files stored in the HDR 108 on the screen of the notebook type PC 111 as in the data file acquisition sequence (M3300). When the user selects "save" of a desired video file, the notebook type PC 111 transmits a copy/save request message (M3311) including application type information "file transfer" and the designated file information to the STA 105.

On the other hand, if the STA 105 receives the copy/save request message (M3311) from the notebook type PC 111, it stores the application type "file transfer" included in the message in the storage area unit 208. The STA 105 then transmits a copy/save request message (M3312) including the application type information "file transfer" and the designated file information to the STA 102 to which the HDR 108 is connected.

If the STA 102 receives the copy/save request message (M3312) from the STA 105, it stores the application type "file transfer" included in the message in the storage area unit 208. Then, the STA 102 transmits a copy/save request message (M3313) including the application type information "file transfer" and the designated file information to the HDR 108.

If the HDR 108 receives the copy/save request message (M3313) including the application type information "file transfer" and the designated file information to, it transmits corresponding moving image file data (M3314) based on the designated file information to the STA 102.

On the other hand, as in the case of moving image data, if the STA 102 receives the moving image file data (M3314) from the HDR 108, it confirms the application type stored in the storage area unit 208. If the application type is "file transfer", since the TCP is used as a communication protocol, the process advances to "YES" in step S3611, and the STA transmits moving image file data (M3315) to the STA 105 by the data transmission processing in step S3614. The subsequent processes are the same as those in the aforementioned case of the moving image data.

On the other hand, if the STA 105 receives the moving image file data (M3315), it analyzes the data in step S3708. In this case, since the received data is not appended with RTP/RTCP protocol header information, the process advances to step S3711, and the STA 105 executes data reception processing using the TCP without using the RTP. In step S3712, the STA 105 transmits moving image file data (M3316) to the notebook type PC 111. The STA 105 confirms in step S3713 if a communication is complete. Upon completion of the communication, the STA 105 enters an in-connection state. On the other hand, if the communication continues, the process returns to step S3707 to repeat data reception processing.

As described above, the STAs 102 and 105 control the protocol processing to be used in accordance with the type of an application launched between the HDR 108 and notebook type PC 111. In this way, unwanted QoS-related protocol appending processing to transmission/reception data that requires certainty can be avoided. Therefore, appropriate QoS-related protocol processing especially for input/output data that requires realtimeness can be provided.

Fifth Embodiment

The fifth embodiment of the present invention will be described in detail hereinafter with reference to the accompanying drawings. The fifth embodiment will explain a case wherein devices are connected to the STAs via different interfaces like the DVC 109 and liquid crystal television 110.

Figure 38:
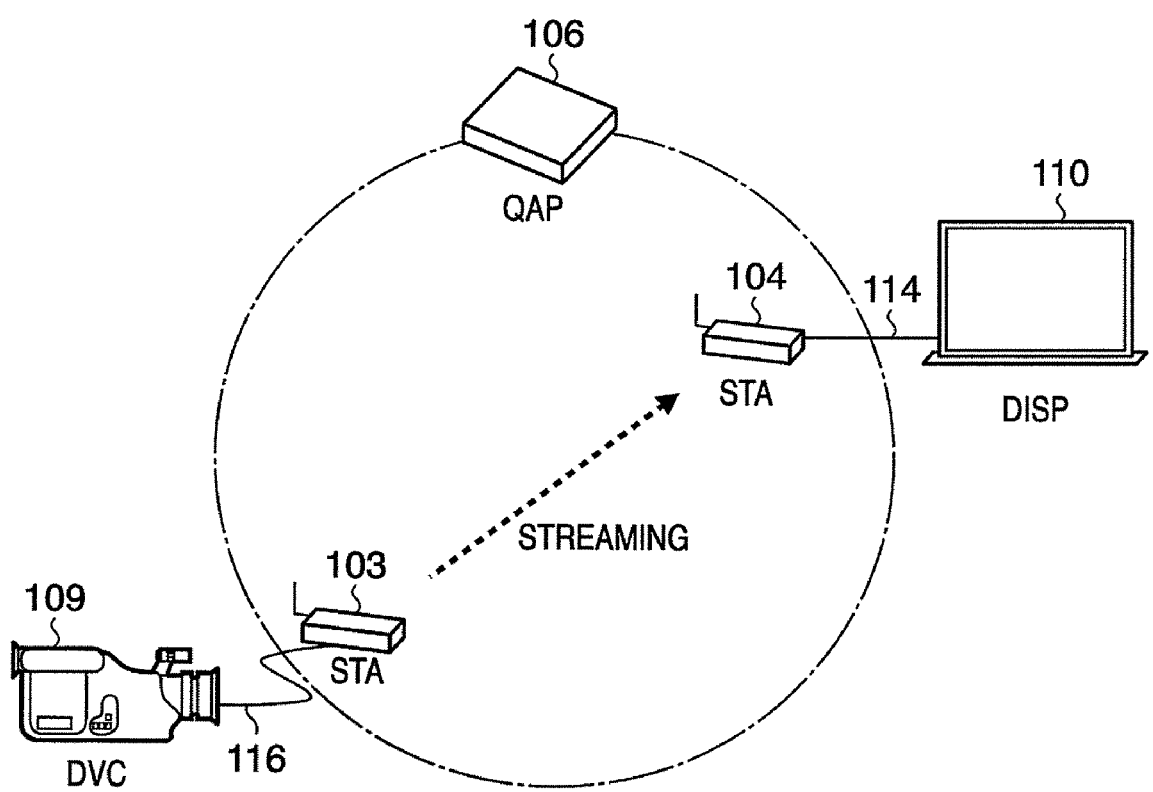
FIG. 38 is a diagram showing a state of directly streaming video data from a DVC 109 to the liquid crystal television 110.

FIG. 38 is a diagram showing a state upon directly streaming video data from the DVC 109 to the liquid crystal television 110. As shown in FIG. 38, the DVC 109 is connected to the STA 103 via the USB cable 116, and the liquid crystal television 110 is connected to the STA 104 via the IEEE1394 cable 114.

Figure 39:
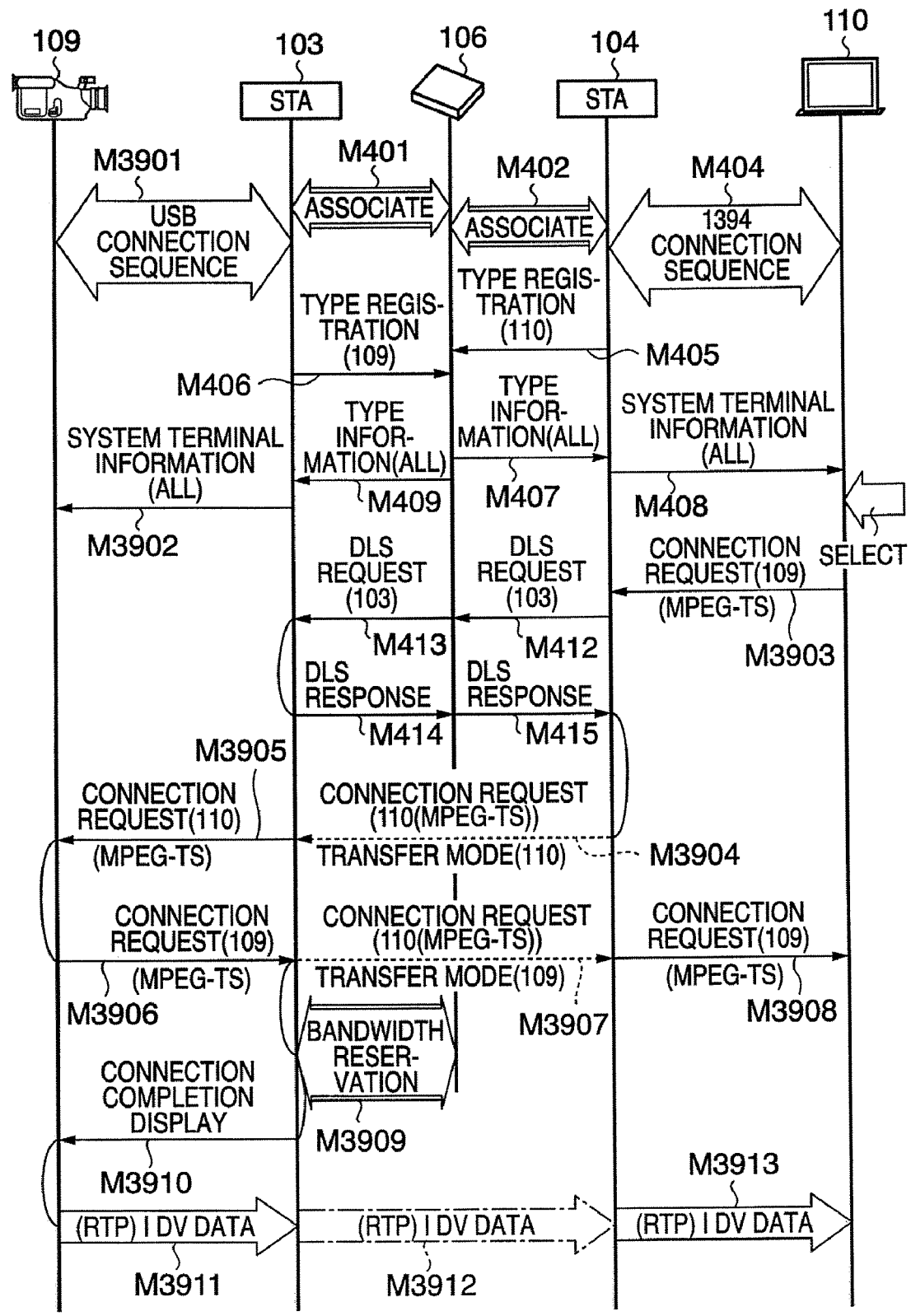
FIG. 39 is a chart showing the sequence of messages exchanged in streaming shown in FIG. 38.

FIG. 39 is a chart showing the sequence of messages exchanged in streaming shown in FIG. 38. The sequence shown in FIG. 39 specifies principal messages associated with the fifth embodiment, and some messages are omitted.

Figure 40:
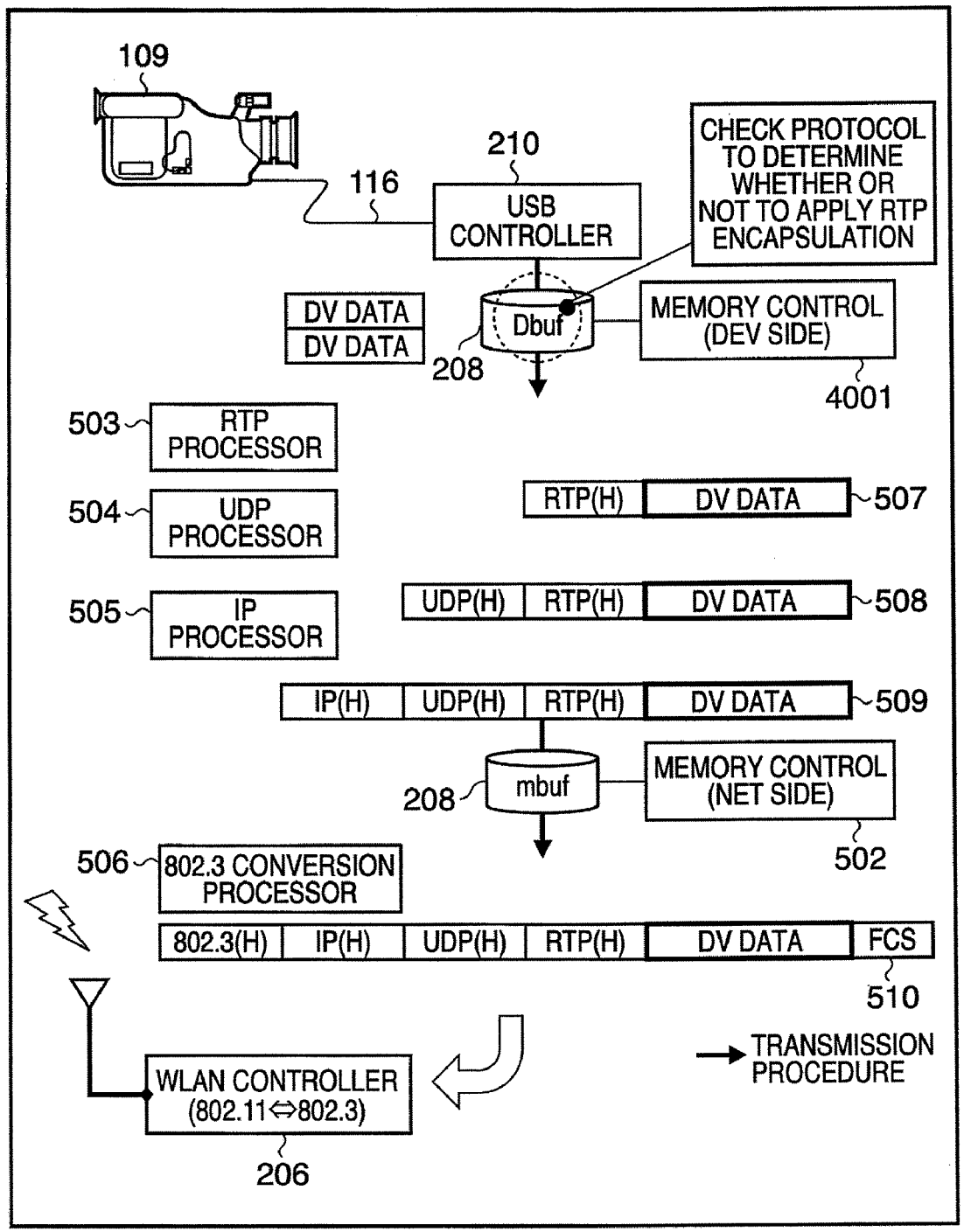
FIG. 40 is a chart showing the processing procedure of a transmission frame in a transmitting STA 103 shown in FIG. 39.

FIG. 40 is a chart showing the processing procedure of a transmission frame in the transmitting STA 103 shown in FIG. 39. An example shown in FIG. 40 is the case wherein the DVC 109 does not support QoS protocol processing. Referring to FIG. 40, reference numeral 4001 denotes memory control processing on the device side, which writes moving image data received from the DVC 109 via the USB controller 210 in a decode buffer memory (Dbuf) in the storage area unit 208. The RTP processor 503 and subsequent components are the same as those in the first embodiment shown in FIG. 5, and a description thereof will be omitted.

Figure 41:
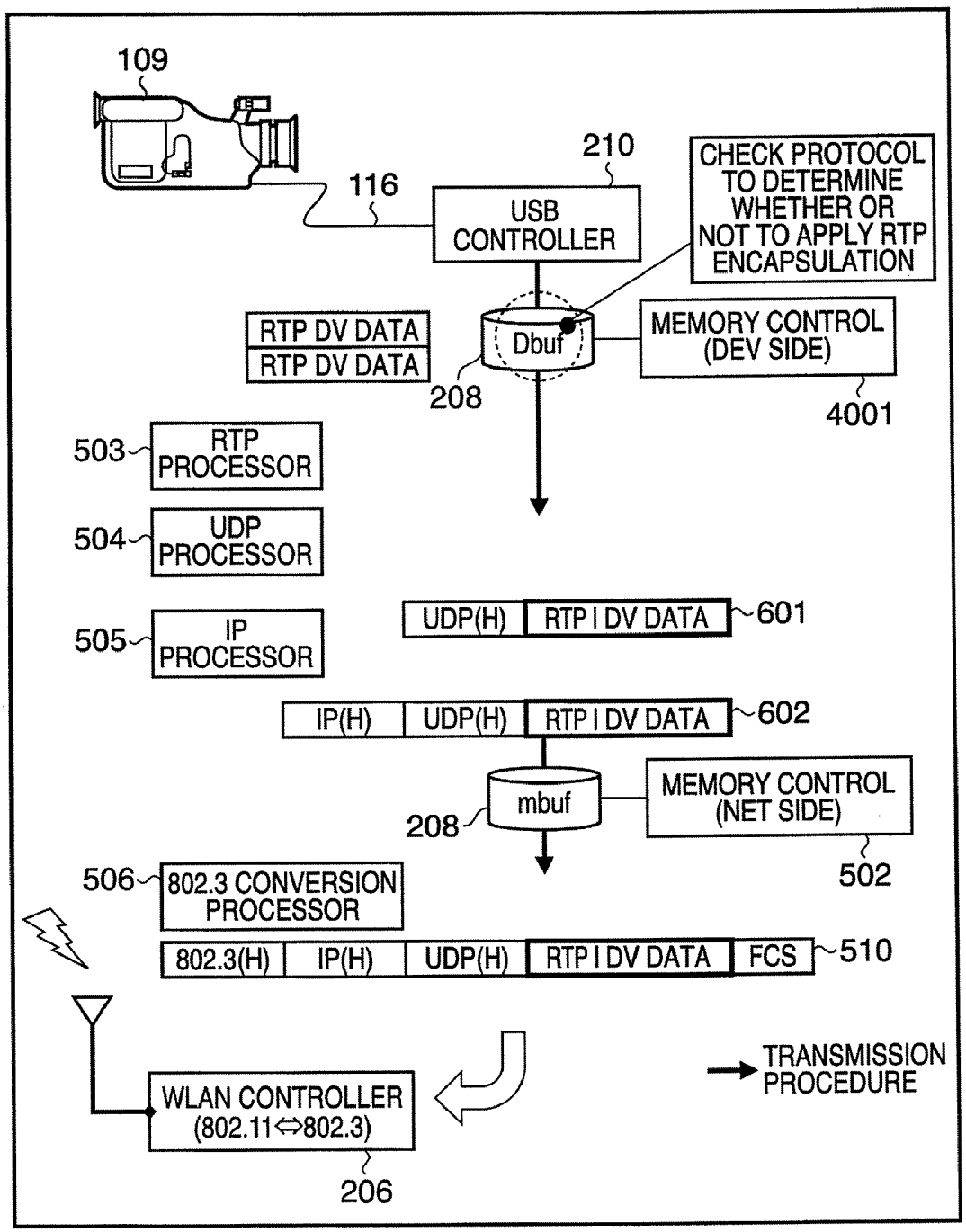
FIG. 41 is a chart showing the processing procedure of a transmission frame when the DVC 109 supports QoS protocol processing.

FIG. 41 is a chart showing the processing procedure of a transmission frame when the DVC 109 supports QoS protocol processing. Note that FIG. 41 is the same as the first embodiment shown in FIG. 6 except for the memory control processing on the device side, and a description thereof will be omitted.

The processing of a reception frame in the receiving STA 104 is the same as the first embodiment shown in FIGS. 7 and 8, and a description thereof will be omitted.

Details of the processing for streaming video data from the DVC 109 to the liquid crystal television 110 in accordance with the sequence shown in FIG. 39 will be described below.

Figure 42A:
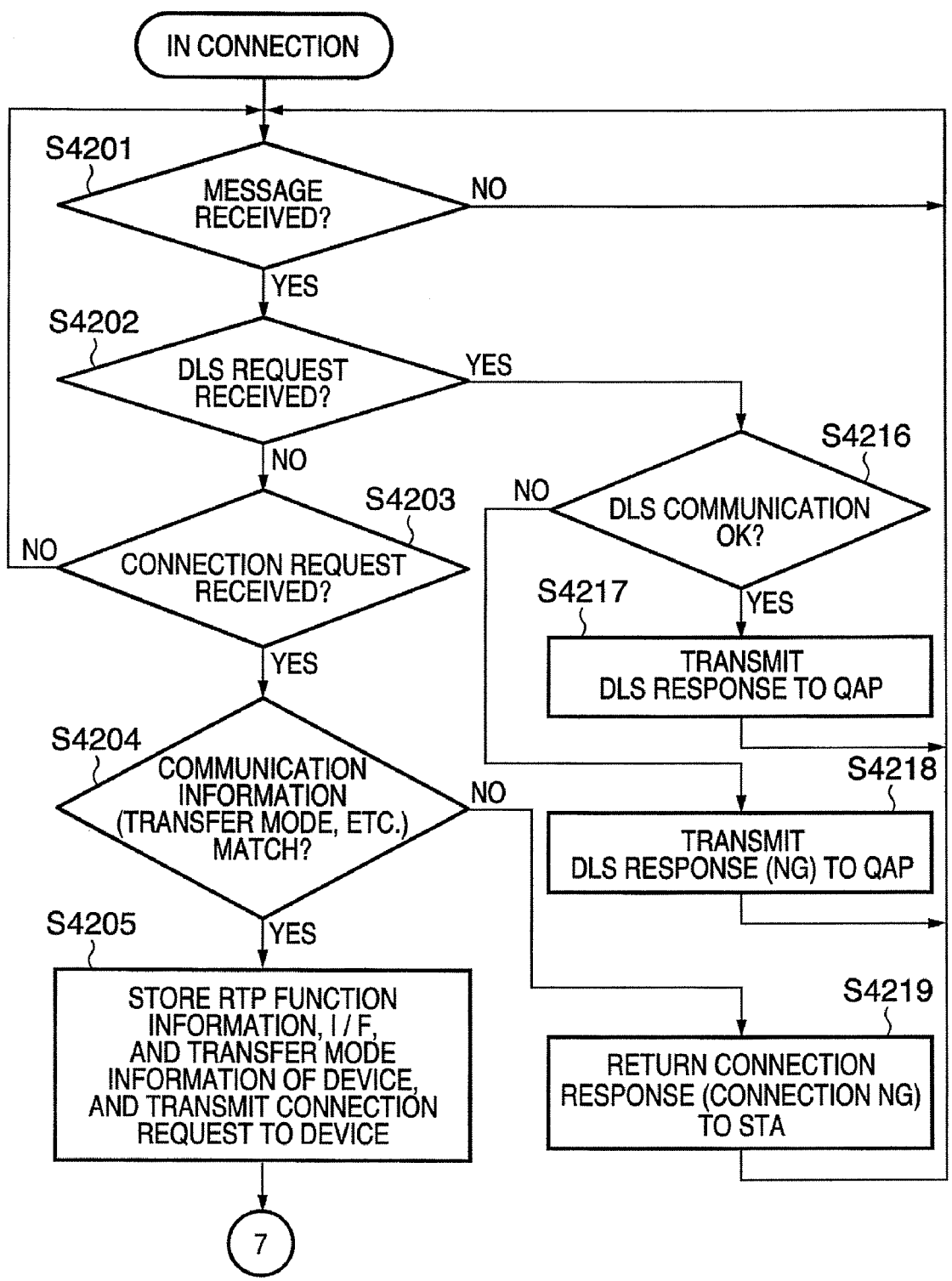
FIGS. 42A and 42B are flowcharts showing the processing of the transmitting STA 103 according to a fifth embodiment.
Figure 42B:
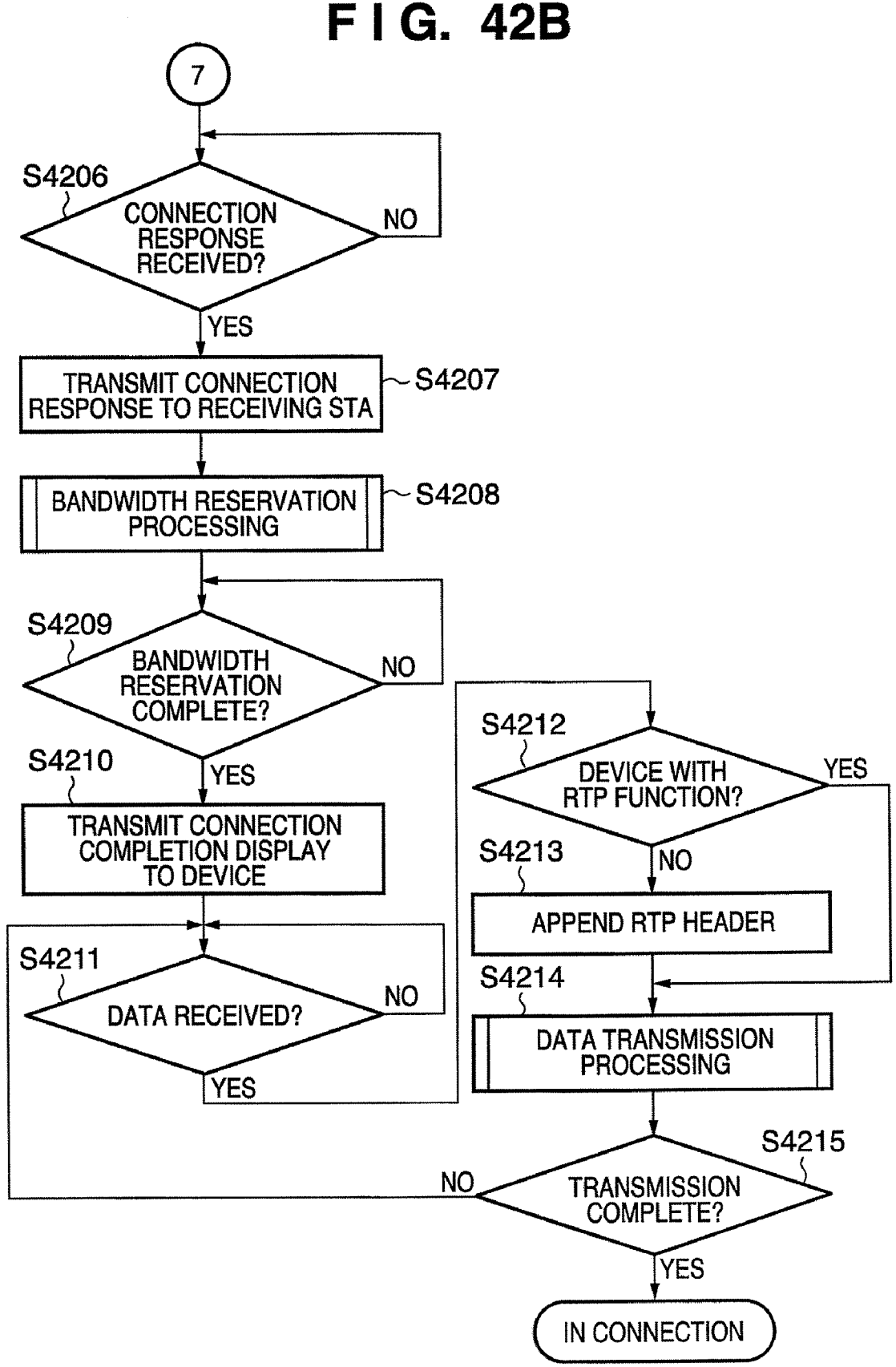
Figure 43A:
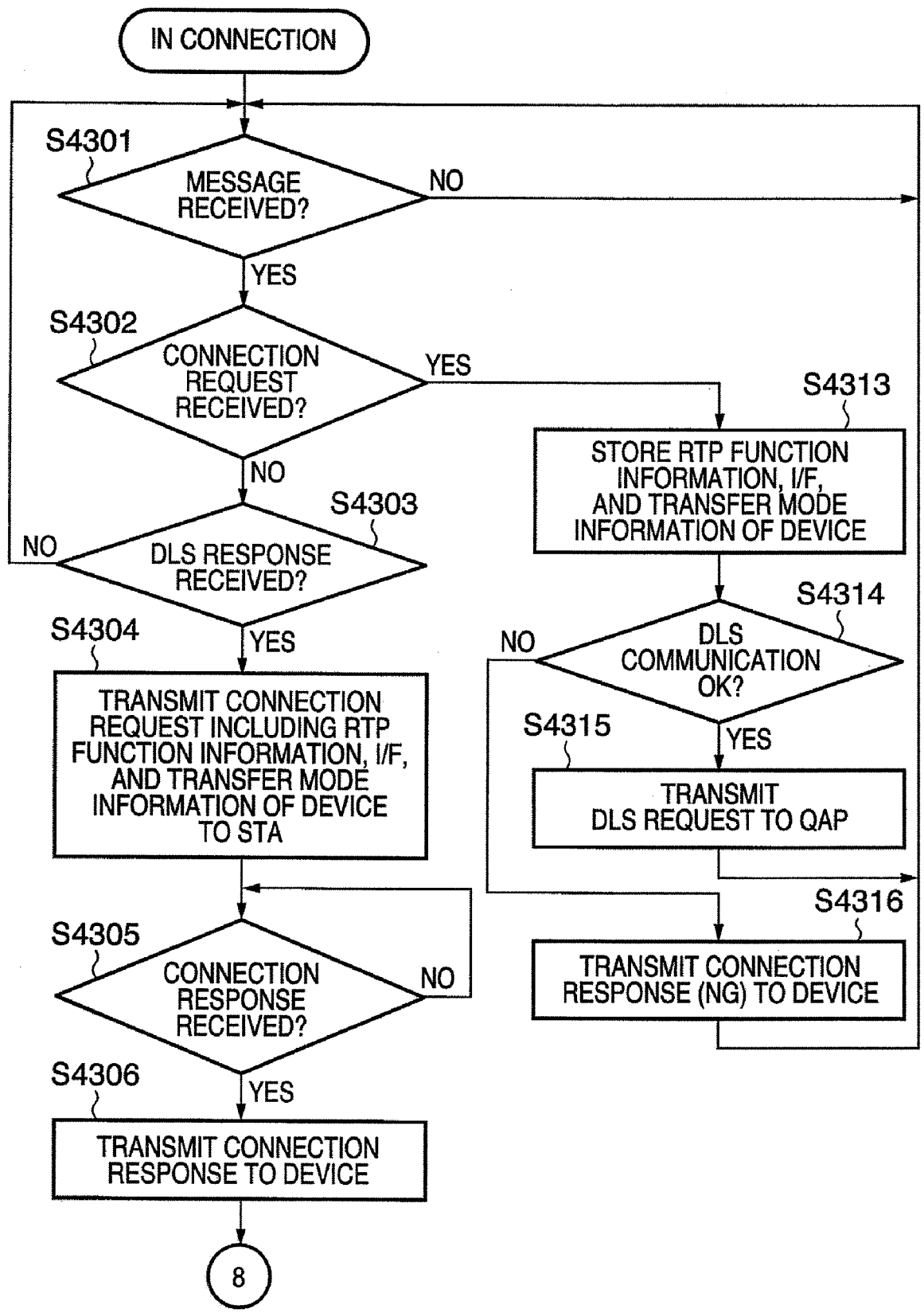
FIGS. 43A and 43B are flowcharts showing the processing of a receiving STA 104 according to the fifth embodiment.
Figure 43B:
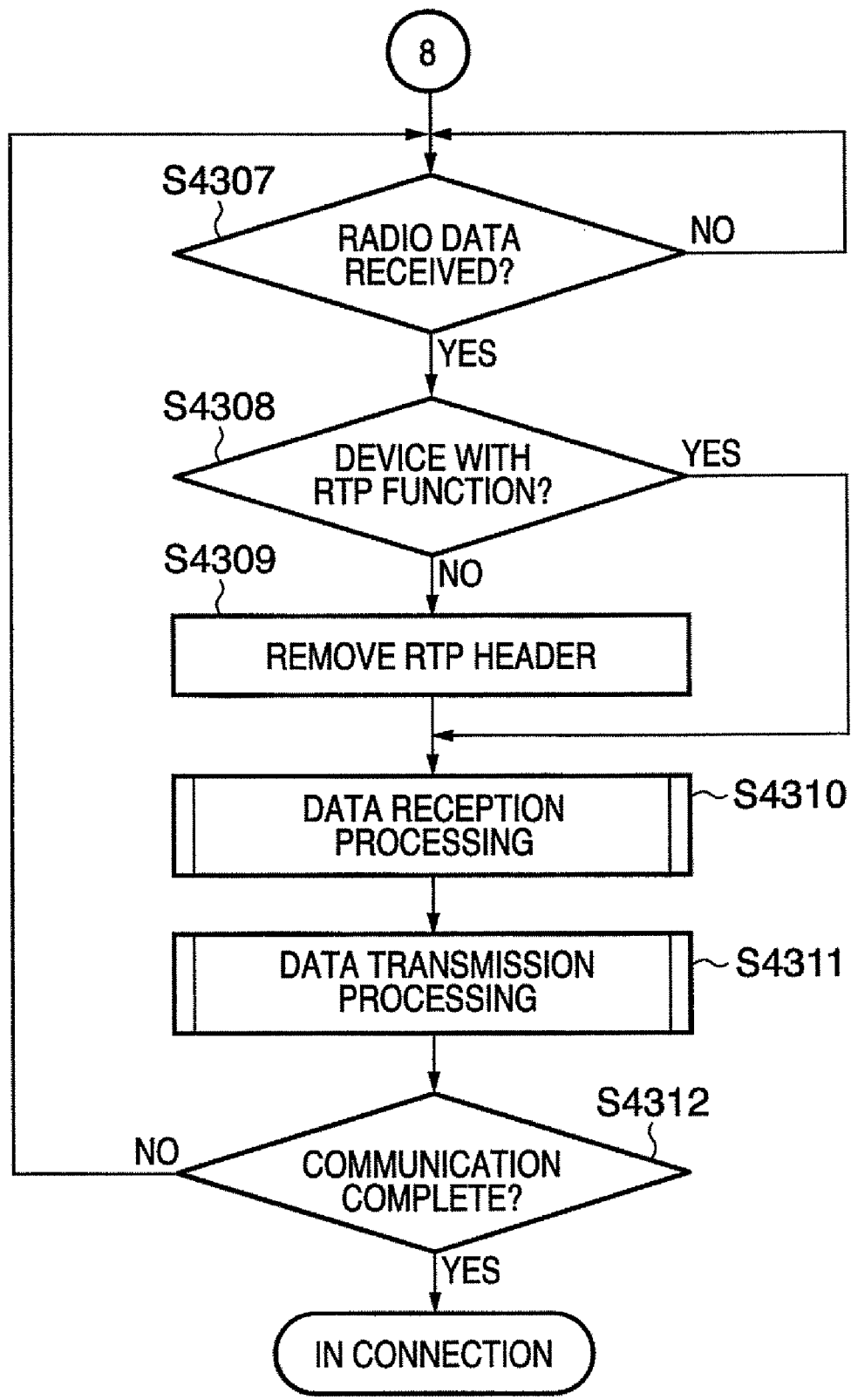

FIGS. 42A and 42B are flowcharts showing the processing of the transmitting STA 103 according to the fifth embodiment, and FIGS. 43A and 43B are flowcharts showing the processing of the receiving STA 104 according to the fifth embodiment.

In the sequence shown in FIG. 39, the STA 103 of the transmitting device side executes association processing (M401) with the QAP 106 when it is installed in the service area of the QAP 106 or the power switch of the STA 103 is turned on. Upon completion of the association processing (M401) of the STA 103 in step S1001, the process advances to step S1002, and the STA 103 checks if USB connection sequence processing (M3901) to the DVC 109 is complete.

On the other hand, in the DVC 109 as the transmitting device, the connection operation to the STA 103, power-ON of the device main body, or the like is performed. Upon completion of the USB connection sequence processing (M3901) with the STA 103 in step S901, the process advances to step S902 to receive, from the STA 103, update information of all the STAs accommodated in the system.

Next, the association processing (M402) in the STA 104, the IEEE1394 connection sequence processing (M404) in the liquid crystal television 110, and the type registration processing are executed as in the first embodiment.

Upon selection of the DVC 109 by means of one of icons that specify the accommodation states, performances, and conditions of devices, which are connected and accommodated in the system and can exchange data, on the screen of the liquid crystal television 110, the process advances to step S905. In step S905, the liquid crystal television 110 transmits, to the STA 104, a connection request message (M3903)

including information that specifies the DVC 109, and the format (MPEG-TS) of moving image data.

On the other hand, if the STA 104 receives the connection request message from the liquid crystal television 110 in step S4301, the process advances to step S4313 to store "format (MPEG-TS) information of moving image data", of the liquid crystal television 110 in the storage area unit 208. The STA 104 then checks in step S4314 if a direct communication can be made with another STA under the direct link service control of the QAP 106. If a direct communication cannot be made, the process jumps to step S4316. In step S4316, the STA 104 transmits a connection response message (M3908) including information indicating that a communication cannot be made to the liquid crystal television 110, and the process returns to step S4301. On the other hand, if a direct communication can be made, the process advances to step S4315, and the STA 104 transmits a direct link service setup request (DLS request) message (M412) to the QAP 106. The process then returns to step S4301.

In this case, the DLS processing is executed among the QAP 106, STA 103, and STA 104 in the same manner as in the first embodiment. If the STA 104 receives a DLS response message (M415), the process advances to step S4304. In step S4304, the STA 104 transmits, to the STA 103, a connection request message (M3904) including information used to specify the DVC 109, and the "format information (MPEG-TS) of moving image data", of the liquid crystal television 110 stored in the storage area unit 208. Then, in step S4305 the STA 104 enters a connection response message waiting state.

On the other hand, if the STA 103 receives the connection request message (M3904) from the STA 104, the process advances to step S4204 to check if a match of the communication information (transfer mode, etc.) is detected. This processing is executed based on identification information of the STA 104 as the request source (receiving device side), which is included in the connection request message. If it is determined that a communication of a moving image stream can be made, the process advances to step S4205 to store the format information (MPEG-TS) of moving image data in the storage area unit 208. The STA 103 then transmits a connection request message (M3905) including the format information (MPEG-TS) of moving image data to the DVC 109.

If the STA 103 receives a connection response message (M3906) including the format information (MPEG-TS) of moving image data from the DVC 109 in step S4206, the process advances to step S4207. In step S4207, the STA 103 transmits a connection request message (M3907) including the format information (MPEG-TS) of moving image data to the STA 104. In step S4208, the STA 103 executes a bandwidth reservation sequence (M3909) specified by the IEEE 802.11e standard together with the QAP 106.

Upon completion of the bandwidth reservation sequence (M3909) in step S4209, the process advances to step S4210 to transmit a connection completion display message (M3910) to the DVC 109. At this time, since the STA 103 does not receive any transmission data from the DVC 109, it enters a data reception waiting state in step S4211. After that, the STA 103 executes the reception processing of moving image data as in the first embodiment.

On the other hand, if the STA 104 receives the connection request message (M3907) including the format information (MPEG-TS) of moving image data in step S4305, the process advances to step S4306. In step S4306, the STA 104 transmits a connection response message (M3908) including the format information (MPEG-TS) of moving image data to the liquid crystal television 110, and makes transition to a data reception waiting state. After that, as in the first embodiment, moving image data is transmitted from the DVC 109 to the STA 103, and is then transmitted to the liquid crystal television 110 via the STA 104.

As described above, the STAs 103 and 104 verify the consistency of the transfer mode in the interfaces between the devices, thus implementing effective QoS-related protocol appending processing. Therefore, appropriate QoS-related protocol processing especially for input/output data that requires realtimeness can be provided.

Other Embodiments

In the description of the above embodiments, the STA recognizes the QoS support state of each device, and appends or removes the RTP header to or from moving image data, so as to support appropriate QoS-related protocol processing for input/output data that requires realtimeness. However, an RTP payload after the RTP header may be expanded to transmit, to the receiving STA, the use state of a buffer memory in the data reception processing from the input device of the transmitting STA, and to use it as memory buffer control information.

Figure 44:
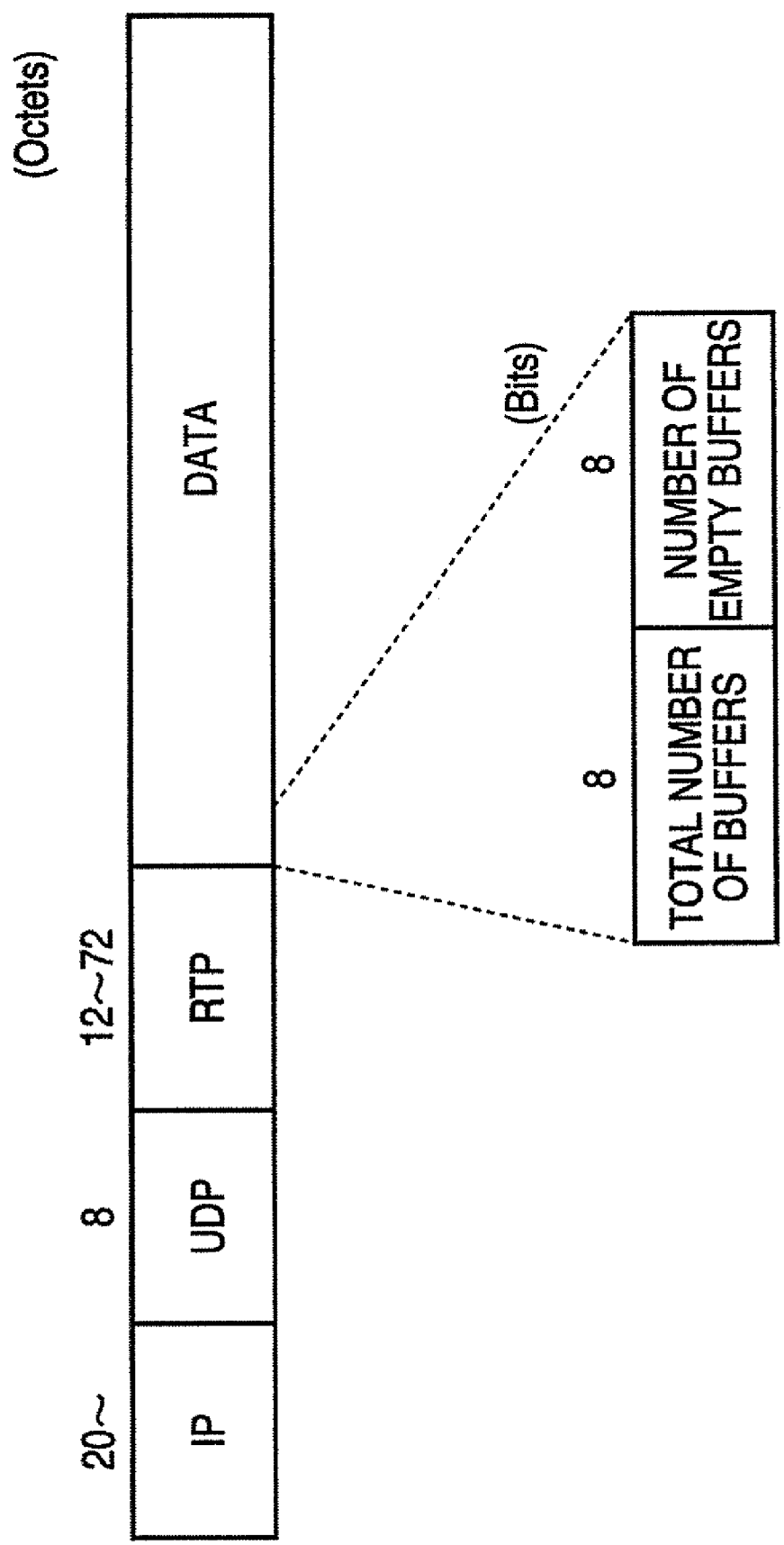
FIG. 44 shows an RTP transmission processing frame in another embodiment 1.

FIG. 44 shows an RTP transmission processing frame in another embodiment 1. As shown in FIG. 44, the RTP payload is expanded to transmit buffer information of the receiving STA. Note that "total number of buffers" is the total number of reception buffers of the receiving STA, and "number of empty buffers" is the number of empty buffers of the reception buffers of the receiving STA.

As described above, by transmitting the memory buffer state information, occurrences of buffer overrun and buffer underrun between the STAs which exchange data are suppressed, thus implementing memory buffer control processing. In this way, more appropriate QoS for input/output data that requires realtimeness can be implemented.

In the above embodiments, after the type registration processing, the type information as update information of all the terminals accommodated in the system is transmitted to the device. Alternatively, as shown in FIG. 45, this processing may be omitted.

Figure 45:
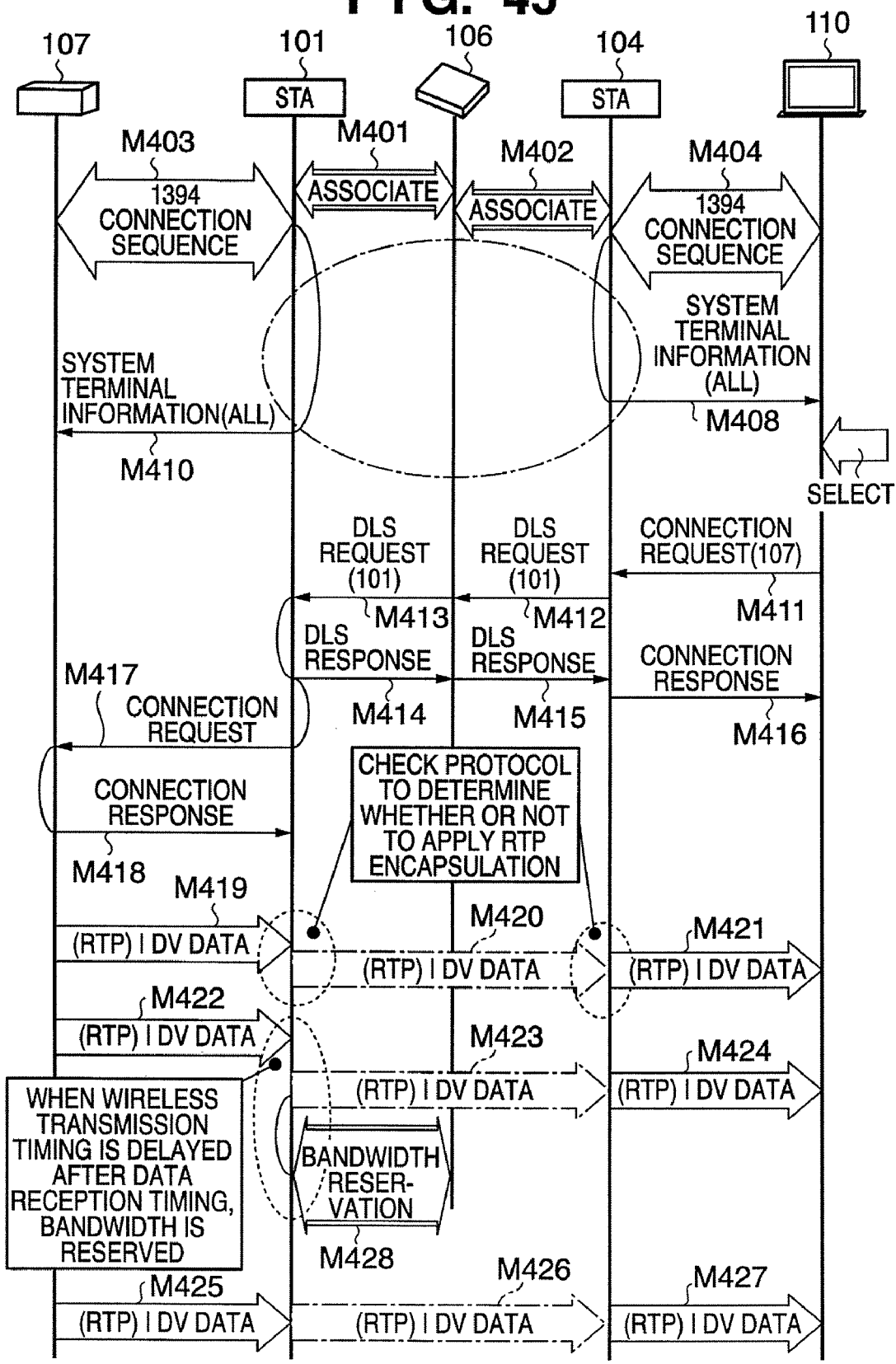
FIG. 45 is a chart showing the sequence of messages in another embodiment 2.

FIG. 45 is a chart showing the sequence of messages in another embodiment 2. As shown in FIG. 45, a specific device is identified using a bus ID and node ID upon connecting the STA and an arbitrary device using the IEEE1394 cable. In this way, some of the predetermined setting processes upon connection initialization can be omitted.

In this case, when the connection mode between an arbitrary input/output device and the STA is the IEEE1394 interface or USB interface, device identification information may be managed, as shown in FIG. 46.

FIG. 46 is a table showing correspondence between the identifiers for respective interfaces and the transfer mode upon connecting the STA and an arbitrary device using the IEEE1394 cable or USB cable. Referring to FIG. 46, a column 4601 stores information indicating the bus ID of the IEEE1394 interface. A column 4602 stores information indicating the node IDs of the IEEE1394 interface. A column 4603 stores information indicating the addresses of the USB interface. A column 4604 stores information indicating the QoS support states for respective IDs.

At the end of a communication, a log of the application type unique to the service used may be saved. Upon restarting a data communication, the log of the application type unique to the service used in the previous data communication may be read out to control the QoS-related protocol processing.

FIG. 47 is a diagram for identifying applications of the USB interface. Referring to FIG. 47, reference numeral 4701 denotes an end point group of application 1; and 4702, an end point group of application 2.

As shown in FIG. 47, the STA and device distinguish services for respective end points to control the corresponding QoS-related protocol processing.

In the third embodiment described above, the user priority is analyzed to control the QoS-related protocol processing. Alternatively, the QoS-related protocol processing may be controlled in accordance with use of RSVP, IntServ, and DiffServ, as shown in FIGS. 48A and 48B.

FIGS. 48A and 48B show the configurations of device management information in another embodiment. Reference numeral 4801 denotes a field that stores information indicating support of QoS processing (DiffServ) of the STA 102; and 4802, a field that stores information indicating support of QoS processing (DiffServ) of the STA 105. Also, reference numeral 4803 denotes a field that stores information indicating support of QoS processing (IntServ/RSVP) of the STA 102; and 4804, a field that stores information indicating support of QoS processing (IntServ/RSVP) of the STA 105.

Upon reception of the type information message from the QAP 106, it is stored in the storage area memory 208. Upon power-OFF of the device connected to the STA or disconnection of the interface, device information is deleted.

FIG. 49 is a table for explaining erasure of device management information. In FIG. 49, a table 4901 shows detection of management information of a disconnected device, and a table 4902 shows a deleted state of that management information.

A stream type moving image data communication based on the interface type "IEEE1394" and transfer mode "isochronous" between the device and STA has been explained. However, the present invention is not limited to this. For example, the present invention can be applied to a stream type moving image data communication based on the interface type "USB" and transfer mode "isochronous".

As the latest information of a device included in the system terminal information message, only a difference of newly registered device information may be transmitted in place of information of all accommodated devices and STAs. Furthermore, the system terminal information message may be transmitted to all the accommodated STAs every time a new connection accommodation sequence is executed.

According to the aforementioned embodiments, an adapter device used upon accommodating a device having an input/output function in an IP network environment can avoid redundancy of the QoS-related protocol for communication data exchanged between devices.

Also, the QoS-related protocol can be appropriately encapsulated or decapsulated for input/output data that requires realtimeness.

The objects of the present invention are also obviously achieved as follows. That is, a recording medium, which records a program code of a software program that can implement the functions of the aforementioned embodiments, is supplied to a system or apparatus, and a computer (or a CPU or MPU) of the system or apparatus reads out and executes the program code stored in the recording medium.

In this case, the program code itself read out from the recording medium implements the functions of the aforementioned embodiments, and the recording medium which stores the program code constitutes the present invention.

As the recording medium for supplying the program code, for example, a flexible disk, hard disk, optical disk, magneto-optical disk, CD-ROM, CD-R, magnetic tape, nonvolatile memory card, ROM, and the like can be used.

Not only the functions of the aforementioned embodiments are implemented when the computer executes the readout program code, but also the present invention obviously includes the following case. That is, the present invention includes a case wherein the functions of the aforementioned embodiments are implemented by some or all actual processes executed by an OS (operating system) running on the computer based on an instruction of the program code.

Furthermore, assume that the program code read out from the recording medium is written in a memory equipped on a function expansion board or a function expansion unit, which is inserted in or connected to the computer. The present invention also includes a case wherein the functions of the above-mentioned embodiments may be implemented when a CPU or the like arranged in the expansion board or unit then executes some or all of actual processes based on an instruction of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-128578, filed May 2, 2006, which is hereby incorporated by reference herein in its entirety.

What is claimed is:

1. A method of controlling a wireless communication adapter having a cable interface to which a terminal is connected and a wireless communication interface by which the terminal communicates via a wireless network, comprising:
   receiving a message of terminal information including information indicating whether or not a terminal supports a real-time transmission protocol;
   determining whether wireless communication by the real-time transmission protocol is directly performed, in accordance with the terminal information received in the receiving step;
   checking whether the terminal connected to the cable interface supports the real-time transmission protocol by analyzing the terminal information received in the receiving step; and
   converting communication data in a format of a non-real time transmission protocol received from the terminal into communication data in a format of the real-time transmission protocol in order to transfer the converted communication data to a communication partner via the wireless communication interface, in accordance with determining that wireless communication by the real-time transmission protocol is directly performed and the terminal connected to the cable interface supports the real-time transmission protocol.

2. The method according to claim 1, wherein checking whether the terminal supports the real-time transmission protocol is based on an interface type and a transfer mode between the terminal and the wireless communication adapter.

3. The method according to claim 1, wherein header information specified by the real-time transmission protocol is appended to the communication data received from the terminal.

4. The method according to claim 1, wherein checking whether the terminal supports the real-time transmission protocol includes analyzing communication data transferred between the terminal and the wireless communication adapter.

5. The method according to claim 1, wherein determining whether wireless communication by the real-time transmission protocol is performed utilizes priority information included in communication data transferred between the terminal and the wireless communication adapter.

6. The method according to claim 1, wherein determining whether wireless communication by the real-time transmission protocol is performed utilizes an application type of communication data transmitted by the terminal connected to the wireless communication adapter.

7. A wireless communication adapter having a cable interface to which a terminal is connected and a wireless communication interface by which the terminal communicates via a wireless network, comprising:
- a receiving unit for receiving a message of terminal information including information indicating whether or not a terminal supports a real-time transmission protocol;
- a determining unit for determining whether wireless communication by the real-time transmission protocol is directly performed, in accordance with the terminal information received by the receiving unit;
- a checking unit for checking whether the terminal connected to the cable interface supports a real-time transmission protocol by analyzing the terminal information received by the receiving unit; and
- a converting unit for converting communication data in a format of a non-real time transmission protocol received from the terminal into communication data in a format of the real-time transmission protocol in order to transfer the converted communication data to a communication partner via the wireless communication interface, in accordance with determining that wireless communication by the real-time transmission protocol is directly performed and the terminal connected to the cable interface supports the real-time transmission protocol.

8. The apparatus according to claim 7, wherein the checking unit checks based on an interface type and a transfer mode between the terminal and said wireless communication adapter whether the terminal supports the real-time transmission protocol.

9. The apparatus according to claim 7, wherein the converting unit appends header information specified by the real-time transmission protocol to the communication data received from the terminal.

10. The apparatus according to claim 7, wherein the checking unit checks whether the terminal supports the real-time transmission protocol by analyzing communication data transferred between the terminal and said wireless communication adapter.

11. The apparatus according to claim 7, wherein the determining unit determines whether wireless communication by a real-time transmission protocol is performed, in accordance with priority information included in communication data transferred between the terminal and said wireless communication adapter.

12. The apparatus according to claim 7, wherein the determining unit determines whether wireless communication by a real-time transmission protocol is performed, based on an application type of communication data transmitted by the terminal connected to said wireless communication adapter.

13. A non-transitory computer-readable recording medium recording a program for making a computer execute a method of controlling the wireless communication adapter according to claim 1.

* * * * *